US012580341B2

(12) United States Patent
Tamaki

(10) Patent No.: US 12,580,341 B2
(45) Date of Patent: Mar. 17, 2026

(54) CONNECTOR, CABLE AND CONNECTOR ASSEMBLY, AND CONNECTION STRUCTURE OF CONNECTORS

(71) Applicant: HOSIDEN CORPORATION, Yao (JP)

(72) Inventor: Fumitake Tamaki, Yao (JP)

(73) Assignee: HOSIDEN CORPORATION, Yao (JP)

( * ) Notice: Subject to any disclaimer, the term of this patent is extended or adjusted under 35 U.S.C. 154(b) by 363 days.

(21) Appl. No.: 18/533,498

(22) Filed: Dec. 8, 2023

(65) Prior Publication Data

US 2024/0243509 A1 Jul. 18, 2024

(30) Foreign Application Priority Data

Jan. 13, 2023 (JP) ................................ 2023-003502

(51) Int. Cl.
*H01R 13/502* (2006.01)
*H01R 13/10* (2006.01)
*H01R 13/42* (2006.01)

(52) U.S. Cl.
CPC ........... *H01R 13/502* (2013.01); *H01R 13/10* (2013.01); *H01R 13/42* (2013.01)

(58) Field of Classification Search
CPC ....... H01R 13/502; H01R 13/10; H01R 13/42
USPC ........................................................ 439/626
See application file for complete search history.

(56) References Cited

U.S. PATENT DOCUMENTS

| | | | | |
|---|---|---|---|---|
| 10,873,148 | B2 * | 12/2020 | Murakami | H01R 13/50 |
| 11,322,878 | B2 * | 5/2022 | Miyamoto | H01R 9/24 |
| 2016/0248190 | A1 * | 8/2016 | Matsuyama | H01R 13/6273 |
| 2022/0209459 | A1 * | 6/2022 | Obie | H01R 13/4362 |
| 2022/0320779 | A1 * | 10/2022 | Sakai | H01R 13/6271 |
| 2023/0006387 | A1 * | 1/2023 | Liao | H01R 4/48 |

FOREIGN PATENT DOCUMENTS

| | | |
|---|---|---|
| JP | 2018163891 A | 10/2018 |
| JP | 2020155206 A | 9/2020 |

* cited by examiner

*Primary Examiner* — Gary F Paumen
(74) *Attorney, Agent, or Firm* — Kilyk & Bowersox, P.L.L.C.

(57) ABSTRACT

A connector including a body and first to fourth terminals partly held therein. Connecting portions of the first and second terminals are arranged and spaced along a second direction; ditto for connecting portions of the third and fourth terminals. The connecting portions of the first and third terminals are arranged and spaced along a third direction; ditto for the connecting portions of the second and fourth terminals. Main portions of the first and second terminals each extend from the corresponding connecting portion in a direction including a component of one side in the third direction. Main portions of the third and fourth terminals each extend from the corresponding connecting portion in a direction including a component of the other side in the third direction. Distal portions of the first to fourth terminals each extend from the corresponding main portion and are arranged and spaced along the second direction.

18 Claims, 25 Drawing Sheets

A2

CONNECTOR, CABLE AND CONNECTOR ASSEMBLY, AND CONNECTION STRUCTURE OF CONNECTORS

CROSS-REFERENCE TO RELATED APPLICATIONS

The present application claims priority under 35 U.S.C. § 119 of Japanese Patent Application No. 2023-3502 filed on Jan. 13, 2023, the disclosure of which is expressly incorporated by reference herein in its entirety.

BACKGROUND OF THE INVENTION

Technical Field

The invention relates to connectors, cable and connector assemblies, and connection structures of connectors.

Background Art

JP 2020-155206 A describes a first conventional connector. JP 2018-163891 A discloses a second conventional connector.

Each of the first connector and the second connector is connectable to a cable including an outer insulator of tubular shape, an outer conductor of tubular shape, first, second, third, and fourth inner insulators of tubular shape, and first, second, third, and fourth electric wires (inner conductors). The outer conductor is disposed inside the outer insulator and includes an end portion in the longitudinal direction led out of the outer insulator. Each of the first, second, third, and fourth inner insulators includes a first portion inside the outer conductor and a second portion led out of the outer conductor to one side in a first direction. The first, second, third, and fourth electric wires include respective covered portions, which are respectively arranged in the first, second, third, and fourth inner insulators, and respective projecting portions, which project from the respective second portions of the first, second, third, and fourth inner insulators. The first, second, third, and fourth electric wires include respective first portions inside the outer conductor and respective second portion led out of the outer conductor to the one side in the first direction. The first portions of the first and second inner insulators and the first portions of the first and second electric wires are arranged in a second direction, and the first portions of the third and fourth inner insulators and the first portions of the third and fourth electric wires are arranged in the second direction. The first portions of the third and fourth inner insulators and the first portions of the third and fourth electric wires are arranged in a third direction relative to the first portions of the first and second inner insulators and the first portions of the first and second electric wires. That is, the first portions of the first, second, third, and fourth inner insulators and the first portions of the first, second, third, and fourth electric wires are arranged in two upper and lower rows. Likewise, the second portions of the first, second, third, and fourth inner insulators and the second portions of the first, second, third, and fourth electric wires are also arranged in two upper and lower rows. The second direction is substantially orthogonal to the first direction, and the third direction is substantially orthogonal to the first and second directions.

The first connector includes a body having an insulating property and first, second, third, and fourth terminals. The first, second, third, and fourth terminals are partly held in the body and are arranged in two upper and lower rows. Each of the first, second, third, and fourth terminals includes a main portion, a distal portion, and a connecting portion. The connecting portions of the first, second, third, and fourth terminals are arranged in two upper and lower rows similarly to the second portions of the first, second, third, and fourth electric wires. The connecting portions of the first and second terminals are connected to the projecting portions of the first and second electric wires, and the connecting portions of the third and fourth terminals are connected to the projecting portions of the third and fourth electric wires. The main portions of the first, second, third, and fourth terminals are plates extending in the first direction from the corresponding connecting portions of the first, second, third, and fourth terminals, are fixed to the body, and are arranged in two upper and lower rows. The distal portions of the first, second, third, and fourth terminals are plates extending in the first direction from the corresponding main portions of the first, second, third, and fourth terminals, and are arranged in two upper and lower rows.

The second connector includes a body having an insulating property and first, second, third, and fourth terminals. The first, second, third, and fourth terminals are arranged in a single row and held in the body. That is, the respective connecting portions, the respective main portions, and the respective distal portions of the first, second, third, and fourth terminals are arranged and spaced along the second direction. The connecting portions of the first, second, third, and fourth terminals are connectable to the corresponding projecting portions of the first, second, third, and fourth electric wires.

SUMMARY OF INVENTION

The connecting portions of the first, second, third, and fourth terminals of the first connector are arranged in two upper and lower rows in accordance with the arrangement of the projecting portions of the first, second, third, and fourth electric wires of the cable, but the distal portions of the first, second, third, and fourth terminals of the first connector are also arranged in two rows. On the other hand, the distal portions of the first, second, third, and fourth terminals of the second connector are arranged and spaced along the second direction, but the connecting portions of the first, second, third, and fourth terminals of the second connector are arranged and spaced along the second direction irrespective of the arrangement of the projecting portions of the first, second, third, and fourth electric wires of the cable.

The invention provides a novel connector, a novel cable and connector assembly, and a novel connection structure of connectors in which four terminals includes connecting portions arranged in two rows and distal portions arranged in a second direction.

A connector according to an aspect of the invention includes a body having an insulating property, a first terminal, a second terminal, a third terminal, and a fourth terminal. The first, second, third, and fourth terminals extend in a first direction and are partly held in the body. The first direction is an extending direction of the first to fourth terminals. The first terminal includes a first connecting portion, a first main portion, and a first distal portion. The second terminal includes a second connecting portion, a second main portion, and a second distal portion. The third terminal includes a third connecting portion, a third main portion, and a third distal portion. The fourth terminal includes a fourth connecting portion, a fourth main portion, and a fourth distal portion. The first connecting portion of the first terminal, the second connecting portion of the second terminal, the third connecting portion of the third terminal, and the fourth connecting portion of the fourth terminal are each exposed or projected from the body. The first connecting portion of the first terminal and the second connecting portion of the second terminal are arranged and spaced along a second direction. The third connecting portion of the third terminal and the fourth connecting portion of the fourth terminal are arranged and spaced along the second direction. The first connecting portion of the first terminal and the third connecting portion of the third terminal are arranged and spaced along a third direction. The second connecting portion of the second terminal and the fourth connecting portion of the fourth terminal are arranged and spaced along the third direction. The second direction is substantially orthogonal to the first direction. The third direction is substantially orthogonal to the first and second directions. The first main portion of the first terminal extends from the first connecting portion of the first terminal in a direction including a component of one side in the third direction. The second main portion of the second terminal extends from the second connecting portion of the second terminal in a direction including a component of the one side in the third direction. The third main portion of the third terminal extends from the third connecting portion of the third terminal in a direction including a component of the other side in the third direction. The fourth main portion of the fourth terminal extends from the fourth connecting portion of the fourth terminal in a direction including a component of the other side in the third direction. The first distal portion of the first terminal extends from the first main portion of the first terminal in a direction including a component of one side in the first direction and is exposed or projected from the body. The second distal portion of the second terminal extends from the second main portion of the second terminal in a direction including a component of the one side in the first direction and is exposed or projected from the body. The third distal portion of the third terminal extends from the third main portion of the third terminal in a direction including a component of the one side in the first direction and is exposed or projected from the body. The fourth distal portion of the fourth terminal extends from the fourth main portion of the fourth terminal in a direction including a component of the one side in the first direction and is exposed or projected from the body. The first distal portion, the second distal portion, the third distal portion, and the fourth distal portion are arranged and spaced along the second direction.

In the connector of this aspect, the first connecting portion of the first terminal and the second connecting portion of the second terminal, and the third connecting portion of the third terminal and the fourth connecting portion of the fourth terminal are arranged in two rows in the third direction. Also, the first distal portion of the first terminal, the second distal portion of the second terminal, the third distal portion of the third terminal, and the fourth distal portion of the fourth terminal are arranged in the second direction.

The first distal portion, the second distal portion, the third distal portion, and the fourth distal portion may be at substantially the same positions in the third direction. Alternatively, at least one of the first distal portion, the second distal portion, the third distal portion, and the fourth distal portion may be at a different position in the third direction from the position or positions in the third direction of the remaining distal portion or portions. Still alternatively, the first distal portion, the second distal portion, the third distal portion, and the fourth distal portion may be at mutually different positions in the third direction.

The first main portion, the second main portion, the third main portion, and the fourth main portion may be arranged and spaced along the second direction.

The second main portion, the fourth main portion, the first main portion, and the third main portion may be arranged in this order and spaced in the second direction. The second distal portion, the fourth distal portion, the first distal portion, and the third distal portion may be arranged in this order and spaced in the second direction.

Alternatively, the fourth main portion, the second main portion, the third main portion, and the first main portion may be arranged in this order and spaced in the second direction. The fourth distal portion, the second distal portion, the third distal portion, and the first distal portion may be arranged in this order and spaced in the second direction.

Still alternatively, the fourth main portion, the second main portion, the first main portion, and the third main portion may be arranged in this order and spaced in the second direction. The fourth distal portion, the second distal portion, the first distal portion, and the third distal portion may be arranged in this order and spaced in the second direction.

Still alternatively, the second main portion, the fourth main portion, the third main portion, and the first main portion may be arranged in this order and spaced in the second direction. The second distal portion, the fourth distal portion, the third distal portion, and the first distal portion may be arranged in this order and spaced in the second direction.

The first connecting portion of the first terminal may include a first end portion on one side in the second direction and a second end portion on the other side in the second direction. The second connecting portion of the second terminal may include a first end portion on one side in the second direction and a second end portion on the other side in the second direction. The third connecting portion of the third terminal may include a first end portion on one side in the second direction and a second end portion on the other side in the second direction. The fourth connecting portion of the fourth terminal may include a first end portion on one side in the second direction and a second end portion on the other side in the second direction.

The first connecting portion of the first terminal may include a third end portion on one side in the first direction and a fourth end portion on the other side in the first direction. The second connecting portion of the second terminal may include a third end portion on one side in the first direction and a fourth end portion on the other side in the first direction. The third connecting portion of the third terminal may include a third end portion on one side in the first direction and a fourth end portion on the other side in the first direction. The fourth connecting portion of the fourth terminal may include a third end portion on one side in the first direction and a fourth end portion on the other side in the first direction.

The first main portion of the first terminal may extend from the second or first end portion of the first connecting portion of the first terminal in a direction including a component of the one side in the third direction. The second main portion of the second terminal may extend from the second or first end portion of the second connecting portion of the second terminal in a direction including a component of the one side in the third direction.

The third main portion of the third terminal extends from the first or second end portion of the third connecting portion of the third terminal in a direction including a component of the other side in the third direction. The fourth main portion of the fourth terminal extends from the first or second end portion of the fourth connecting portion of the fourth terminal in a direction including a component of the other side in the third direction.

The first main portion of the first terminal may extend from the third or fourth end portion of the first connecting portion of the first terminal in a direction including a component of the one side in the third direction. The second main portion of the second terminal may extend from the third or fourth end portion of the second connecting portion of the second terminal in a direction including a component of the one side in the third direction. The third main portion of the third terminal may extend from the third or fourth end portion of the third connecting portion of the third terminal in a direction including a component of the other side in the third direction. The fourth main portion of the fourth terminal may extend from the third or fourth end portion of the fourth connecting portion of the fourth terminal in a direction including a component of the other side in the third direction.

The first terminal, the second terminal, the third terminal, and the fourth terminal may, but are not require to, have an identical shape and size.

The first, second, third, and fourth terminals may be held in the body such as to be alternately rotated by 180 degrees in a circumferential direction. The circumferential direction may be a circumferential direction of an imaginary circle on a first cross section along the second and third directions of the connector.

A cable and connector assembly according to an aspect of the invention may include the connector of one of the above aspects and a cable.

The cable may include an outer insulator of tubular shape having an insulating property, an outer conductor of tubular shape having electrical conductivity, a first inner insulator of tubular shape having an insulating property, a second inner insulator of tubular shape having an insulating property, a third inner insulator of tubular shape having an insulating property, a fourth inner insulator of tubular shape having an insulating property, a first electric wire, a second electric wire, a third electric wire, and a fourth electric wire. The outer conductor may be disposed inside the outer insulator. The first inner insulator, the second inner insulator, the third inner insulator, and the fourth inner insulator may each include a first portion inside the outer conductor and a second portion outside the outer conductor. The first electric wire may include a first covered portion inside the first inner insulator and a first projecting portion projecting from the second portion of the first inner insulator. The second electric wire may include a second covered portion inside the second inner insulator and a second projecting portion projecting from the second portion of the second inner insulator. The third electric wire may include a third covered portion inside the third inner insulator and a third projecting portion projecting from the second portion of the third inner insulator. The fourth electric wire may include a fourth covered portion inside the fourth inner insulator and a fourth projecting portion projecting from the second portion of the fourth inner insulator. The first projecting portion of the first electric wire and the second projecting portion of the second electric wire may be arranged side by side in the second direction. The third projecting portion of the third electric wire and the fourth projecting portion of the fourth electric wire may be arranged side by side in the second direction. The first projecting portion of the first electric wire and the third projecting portion of the third electric wire may be arranged side by side in the third direction. The second projecting portion of the second electric wire and the fourth projecting portion of the fourth electric wire may be arranged side by side in the third direction. The first projecting portion of the first electric wire may be connected to the first connecting portion of the first terminal. The second projecting portion of the second electric wire may be connected to the second connecting portion of the second terminal. The third projecting portion of the third electric wire may be connected to the third connecting portion of the third terminal. The fourth projecting portion of the fourth electric wire may be connected to the fourth connecting portion of the fourth terminal.

A layout of the first connecting portion of the first terminal, the second connecting portion of the second terminal, the third connecting portion of the third terminal, and the fourth connecting portion of the fourth terminal in cross-sectional view of a first cross section of the connector may correspond to a layout of the first covered portion of the first electric wire, the second covered portion of the second electric wire, the third covered portion of the third electric wire, and the fourth covered portion of the fourth electric wire in cross-sectional view of a second cross section of the cable. The second cross section may be a cross section along the second and third directions of the cable as extended in the first direction.

The first projecting portion of the first electric wire may be soldered onto the first connecting portion of the first terminal. The second projecting portion of the second electric wire may be soldered onto the second connecting portion of the second terminal. The third projecting portion of the third electric wire may be soldered onto the third connecting portion of the third terminal. The fourth projecting portion of the fourth electric wire may be soldered onto the fourth connecting portion of the fourth terminal.

The third terminal and the third electric wire may be configured for transmitting therethrough one signal of a positive signal or a negative signal of differential signals, and the second terminal and the second electric wire may be configured for transmitting therethrough the other signal.

A connection structure of connectors according to an aspect of the invention may include a first connector being the connector according to any of the above aspects and a second connector connected to the first connector.

The second connector may include a body having an insulating property, a first terminal, a second terminal, a third terminal, and a fourth terminal. The body of the second connector partly may hold the first, second, third, and fourth terminals of the second connector. The first terminal of the second connector may include a first mounting portion, a first main portion, and a first distal portion. The second terminal of the second connector may include a second mounting portion, a second main portion, and a second distal portion. The third terminal of the second connector may include a third mounting portion, a third main portion, and a third distal portion. The fourth terminal of the second connector may include a fourth mounting portion, a fourth main portion, and a fourth distal portion.

The first distal portion of the first terminal, the second distal portion of the second terminal, the third distal portion of the third terminal, and the fourth distal portion of the fourth terminal of the second connector may be arranged and spaced along the second direction in accordance with a layout of the first distal portion of the first terminal, the second distal portion of the second terminal, the third distal portion of the third terminal, and the fourth distal portion of the fourth terminal of the first connector, and may be respectively in contact with, and in electrical connection with, the first distal portion of the first terminal, the second distal portion of the second terminal, the third distal portion of the third terminal, and the fourth distal portion of the fourth terminal of the first connector. The first mounting portion of the first terminal, the second mounting portion of the second terminal, the third mounting portion of the third terminal, and the fourth mounting portion of the fourth terminal of the second connector may be arranged and spaced along the second direction.

The connection structure of connectors may further include the cable of any of the above aspects.

Figure 1A:
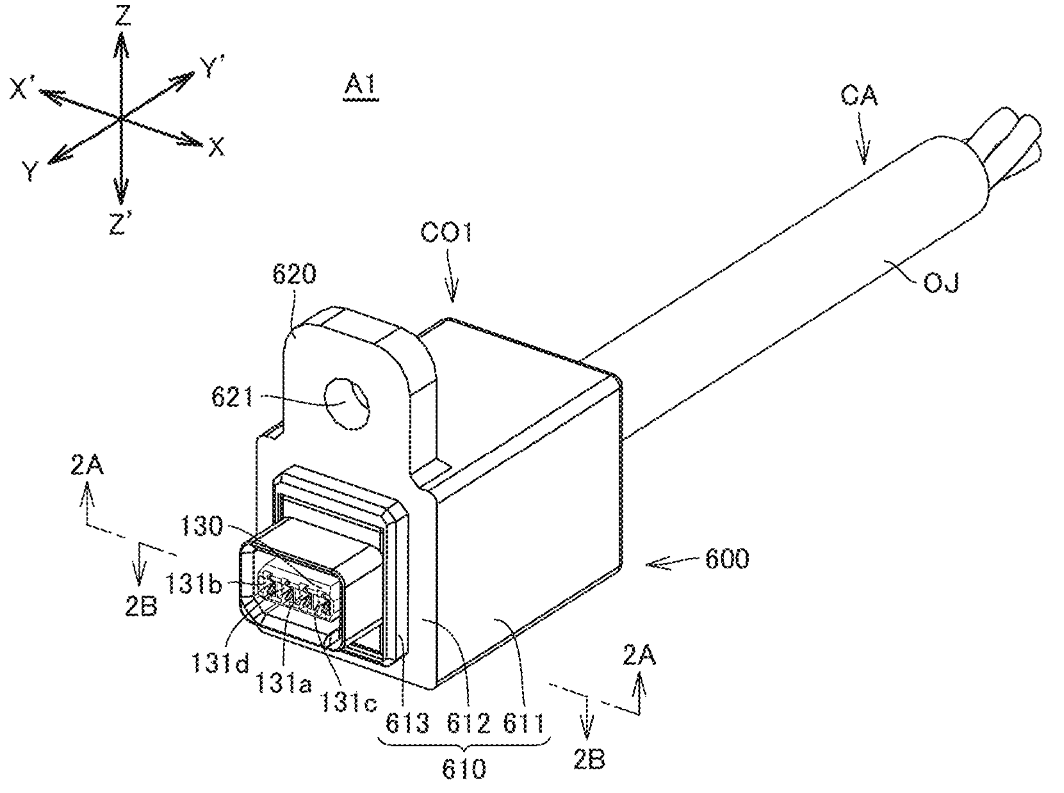
FIG. 1A is a top, front, right side perspective view of a connector assembly according to a first embodiment of the invention.
Figure 1B:
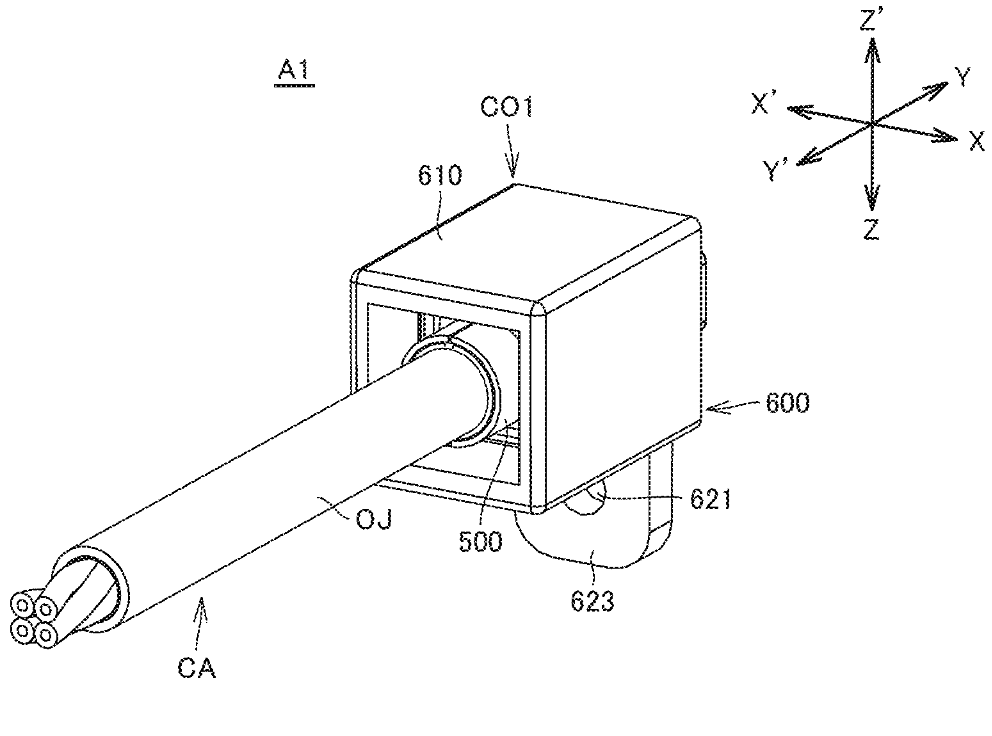
FIG. 1B is a bottom, rear, right side perspective view of the connector assembly of the first embodiment.

In the brief description of the drawings above and the description of embodiments which follows, relative spatial terms such as "upper", "lower", "top", "bottom", "left", "right", "front", "rear", etc., are used for the convenience of the skilled reader and refer to the orientations of the connectors, cable and connector assemblies, and connection structures of connectors, as well as their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

Hereinafter described are a plurality of embodiments, including first and second embodiments and modifications thereof, of the invention. It should be noted that constituents of the embodiments and their variants to be described can be combined in any possible manner. It should also be noted that the materials, the shapes, the dimensions, the numbers, the arrangements, etc. of the constituents of the embodiments and their variants to be described are presented by way of example only and can be modified in any manner as long as the same functions can be fulfilled.

First Embodiment

Figure 5A:
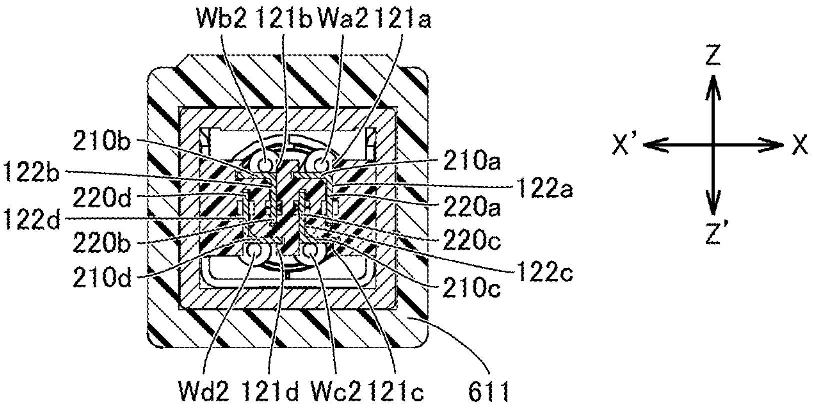
FIG. 5A is an enlarged cross-sectional view, corresponding to FIG. 2C, of a first variant connector of the connector assembly of the first embodiment.
Figure 5B:
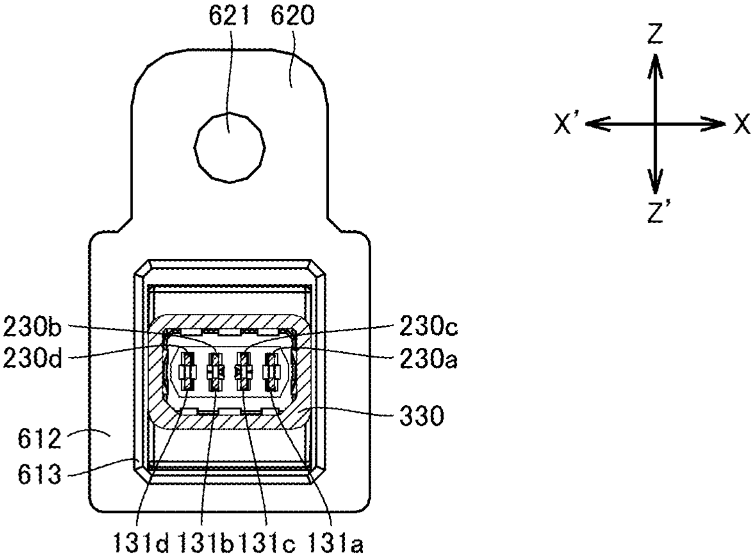
FIG. 5B is an enlarged cross-sectional view, corresponding to FIG. 2D, of the first variant connector of the connector assembly of the first embodiment.
Figure 6A:
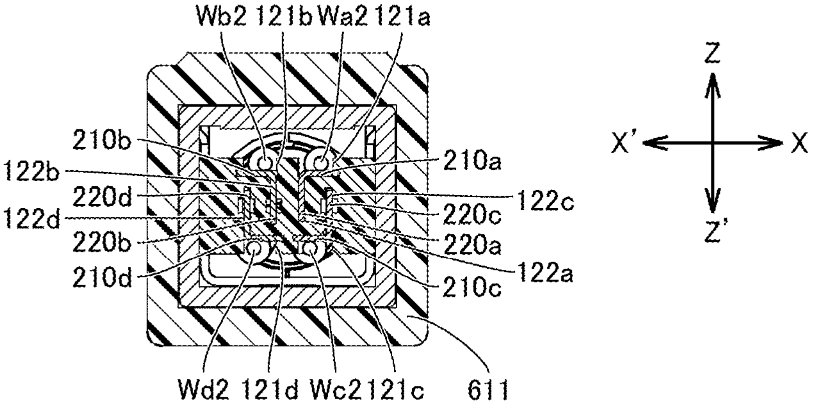
FIG. 6A is an enlarged cross-sectional view, corresponding to FIG. 2C, of a second variant connector of the connector assembly of the first embodiment.
Figure 6B:
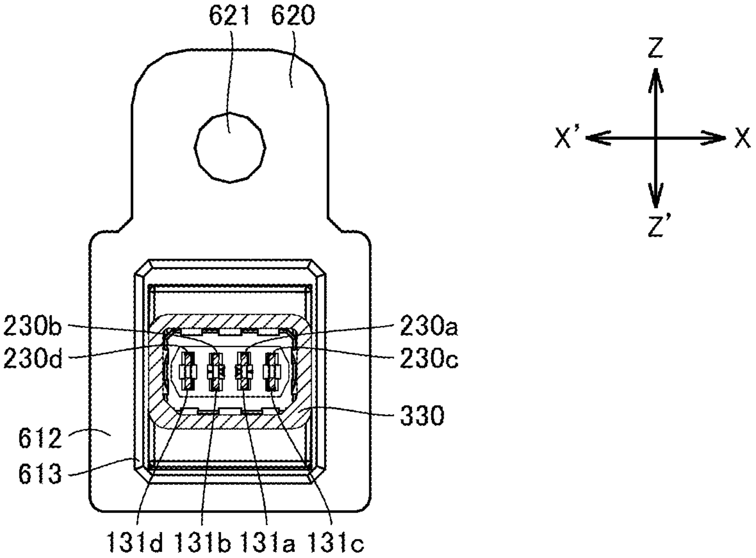
FIG. 6B is an enlarged cross-sectional view, corresponding to FIG. 2D, of the second variant connector of the connector assembly of the first embodiment.
Figure 7A:
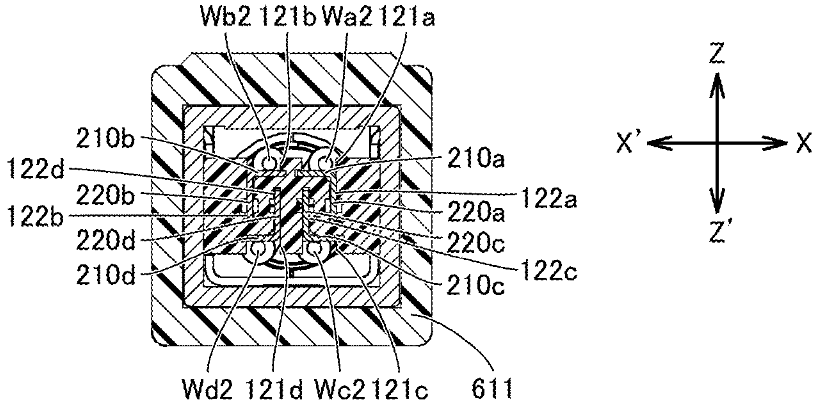
FIG. 7A is an enlarged cross-sectional view, corresponding to FIG. 2C, of a third variant connector of the connector assembly of the first embodiment.
Figure 7B:
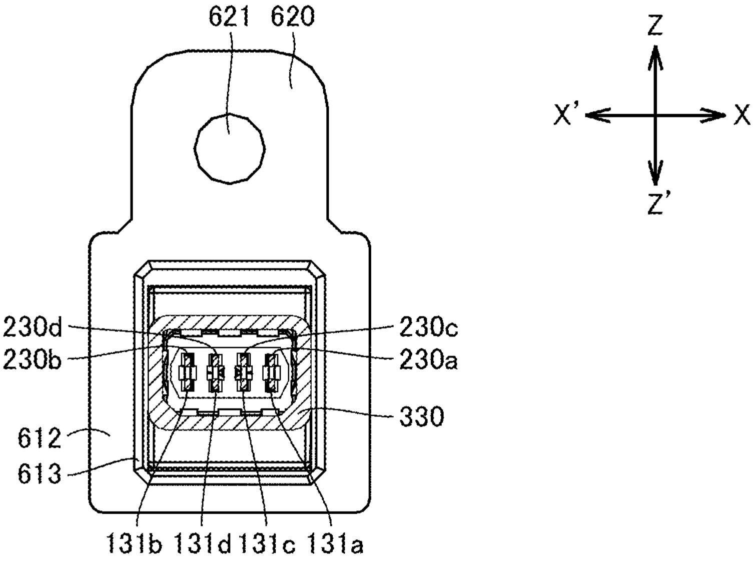
FIG. 7B is an enlarged cross-sectional view, corresponding to FIG. 2D, of the third variant connector of the connector assembly of the first embodiment.
Figure 8A:
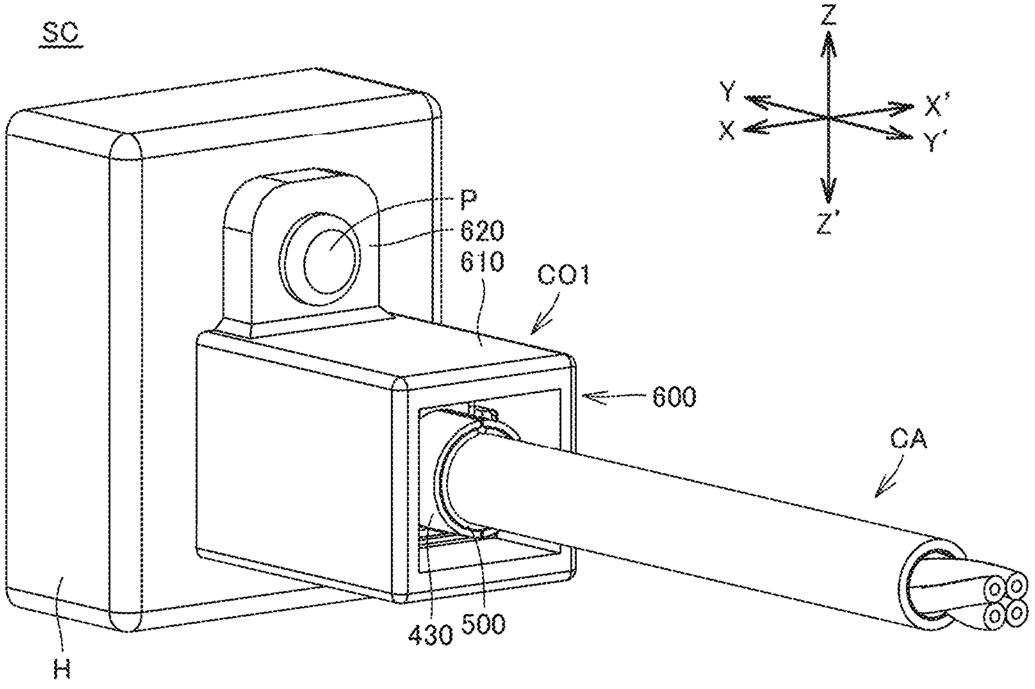
FIG. 8A is a perspective view of a connection structure of connectors according to the first embodiment of the invention, with first and second connectors connected together.
Figure 8B:
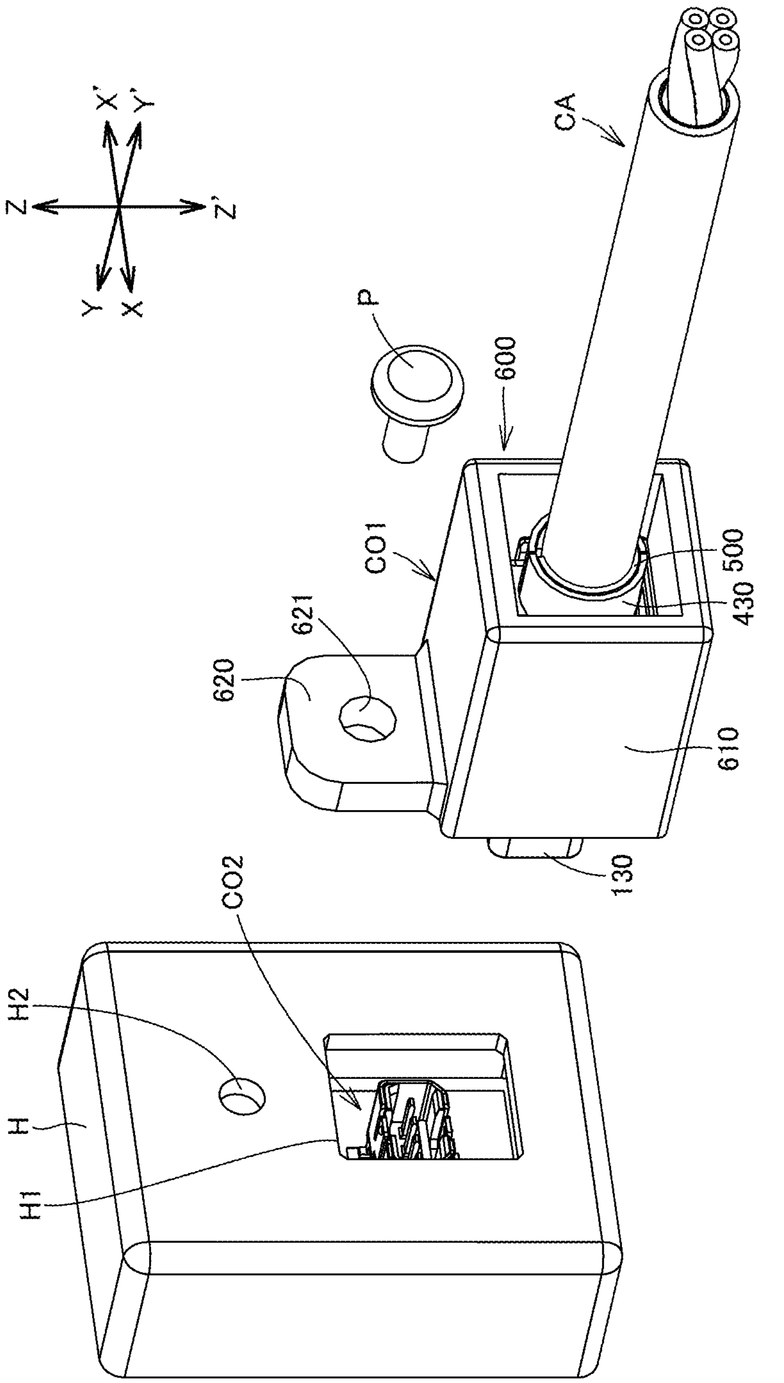
FIG. 8B is a perspective view of the connection structure of the first embodiment, with the first and second connectors disconnected.
Figure 9A:
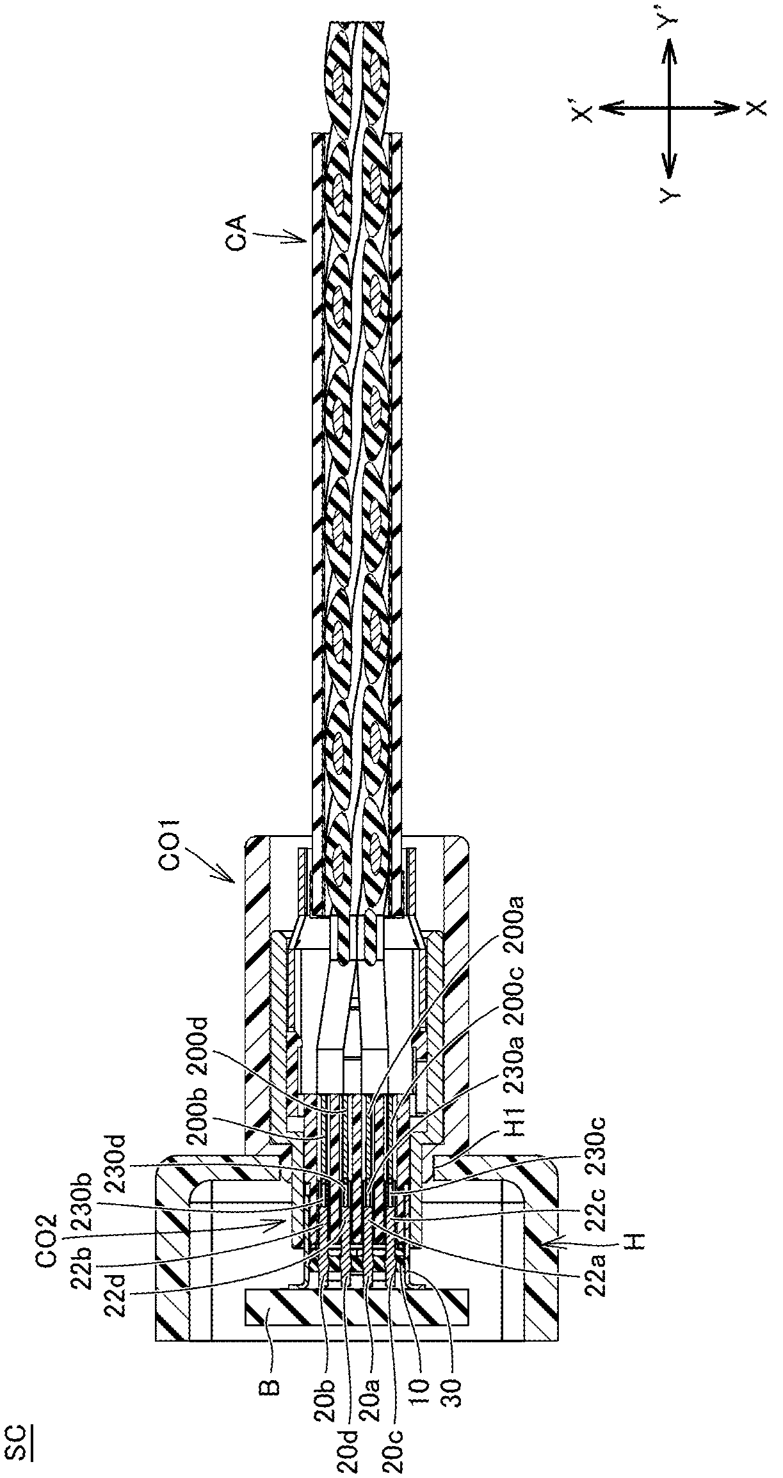
FIG. 9A is a cross-sectional view, corresponding to FIG. 2B, of the connection structure of the first embodiment.
Figure 9B:
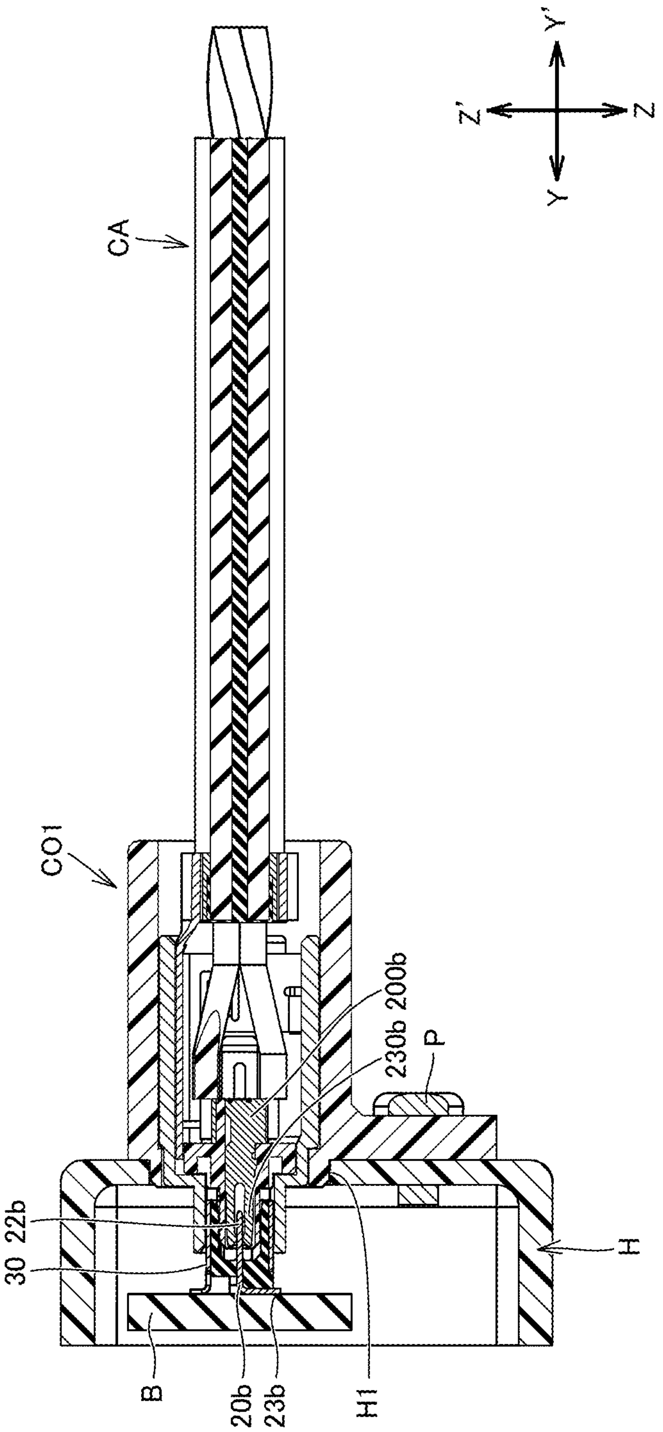
FIG. 9B is a cross-sectional view, corresponding to FIG. 2F, of the connection structure of the first embodiment.
Figure 9C:
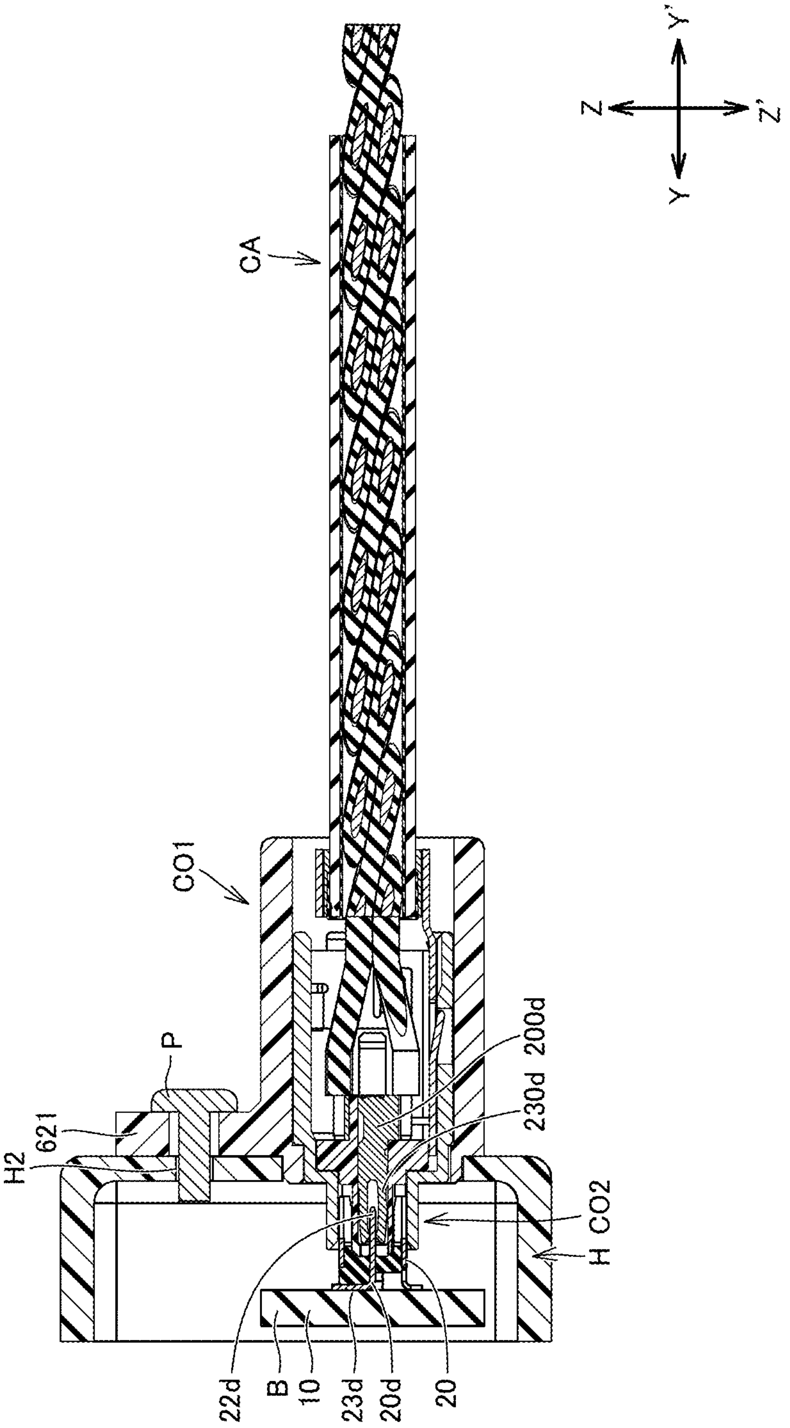
FIG. 9C is a cross-sectional view, corresponding to FIG. 2G, of the connection structure of the first embodiment.
Figure 10A:
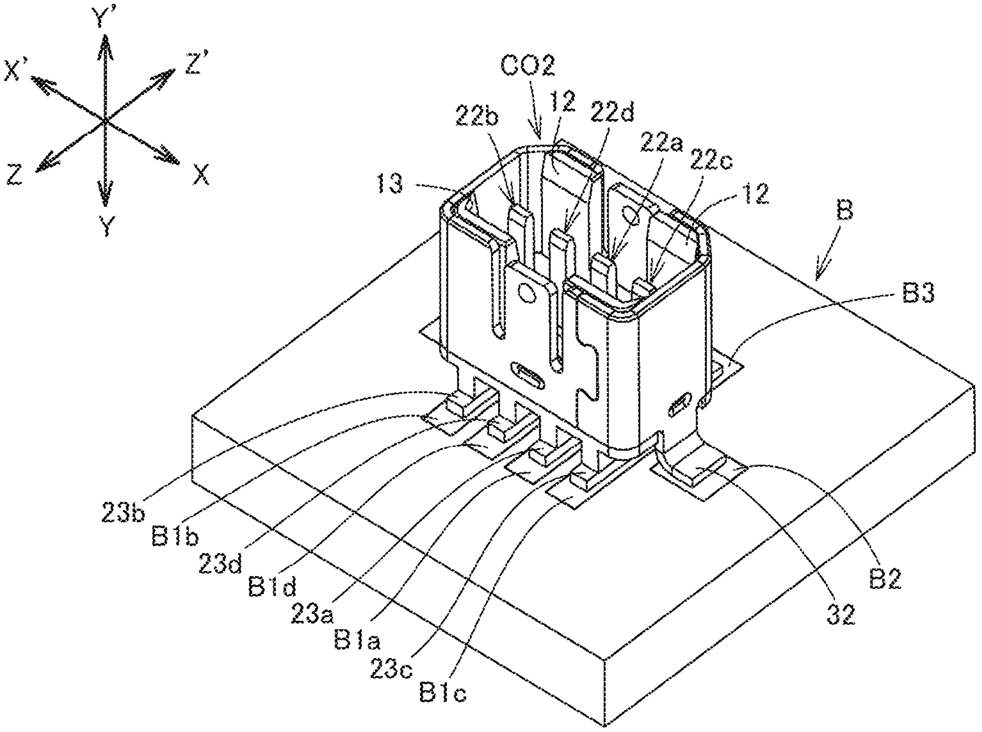
FIG. 10A is a top, front, left side perspective view of the second connector of the connection structure of the first embodiment.
Figure 10B:
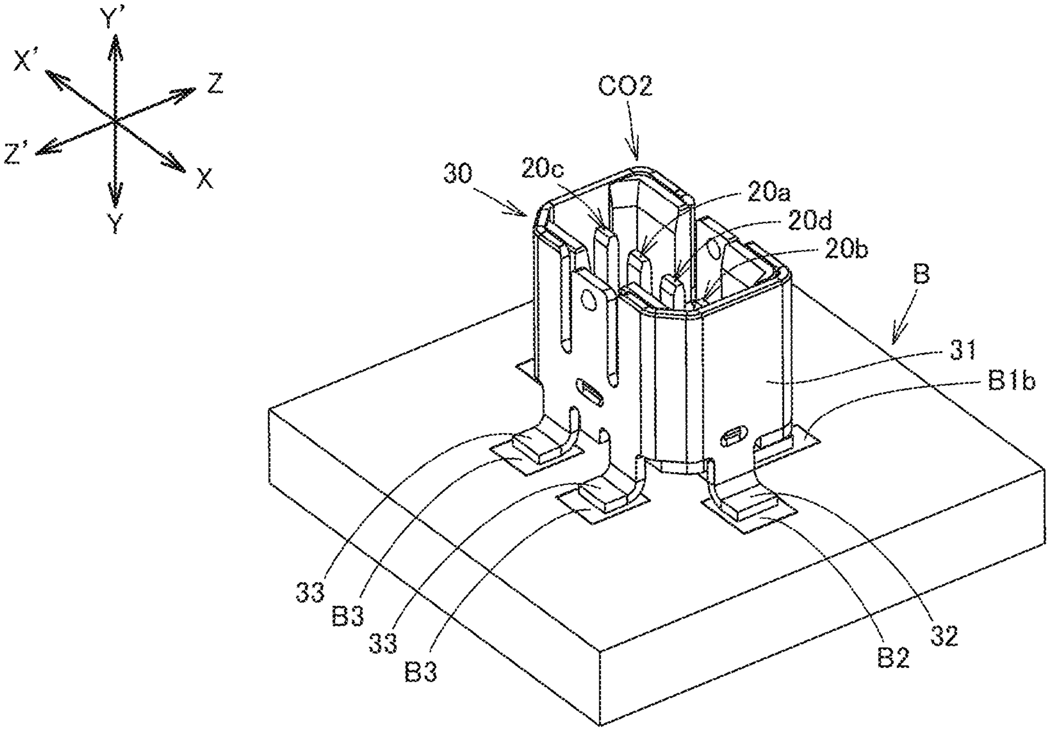
FIG. 10B is a bottom, front, right side perspective view of the second connector of the connection structure of the first embodiment.
Figure 11A:
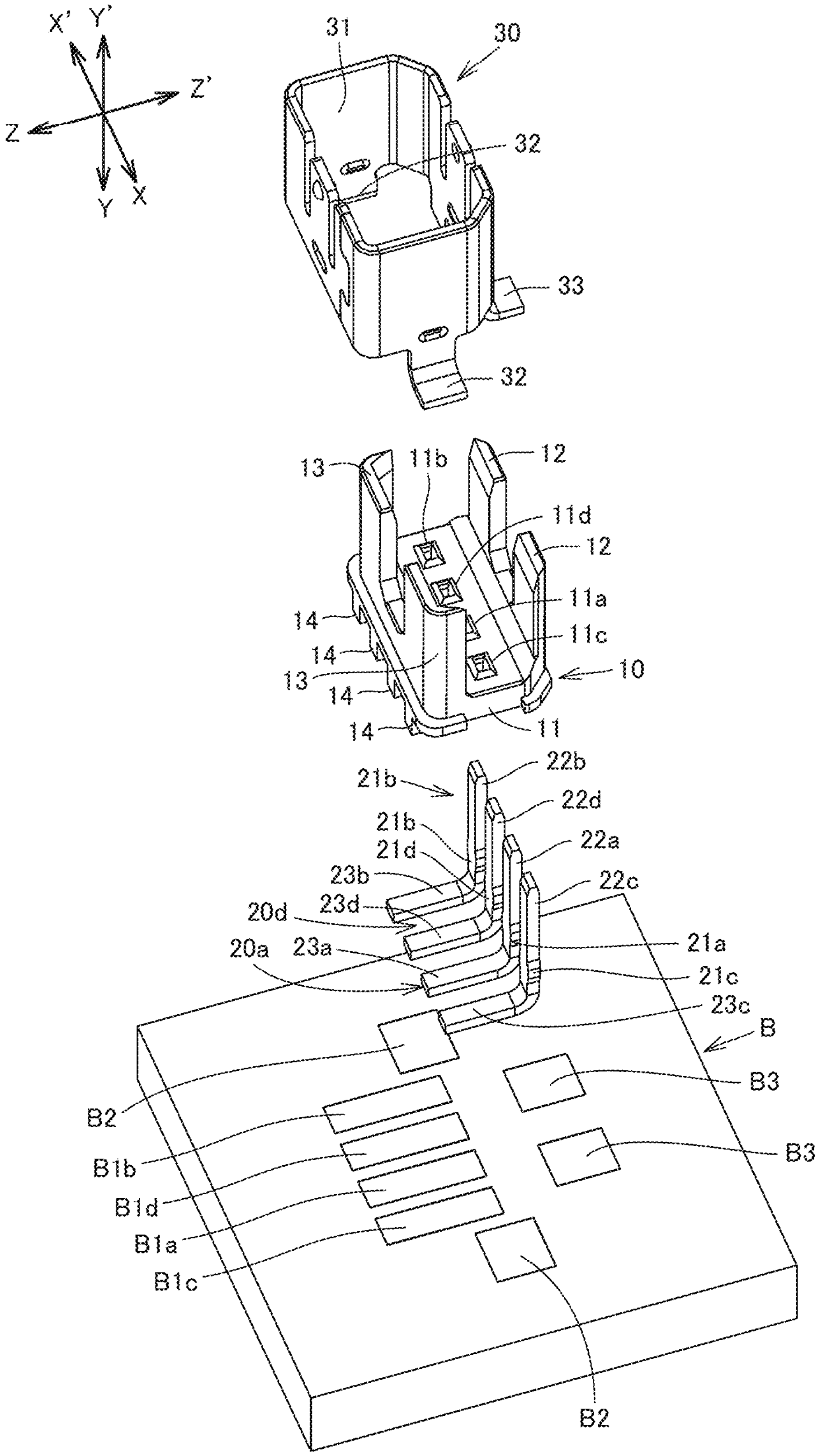
FIG. 11A is an exploded, top, front, left side perspective view of the second connector of the connection structure of the first embodiment.
Figure 11B:
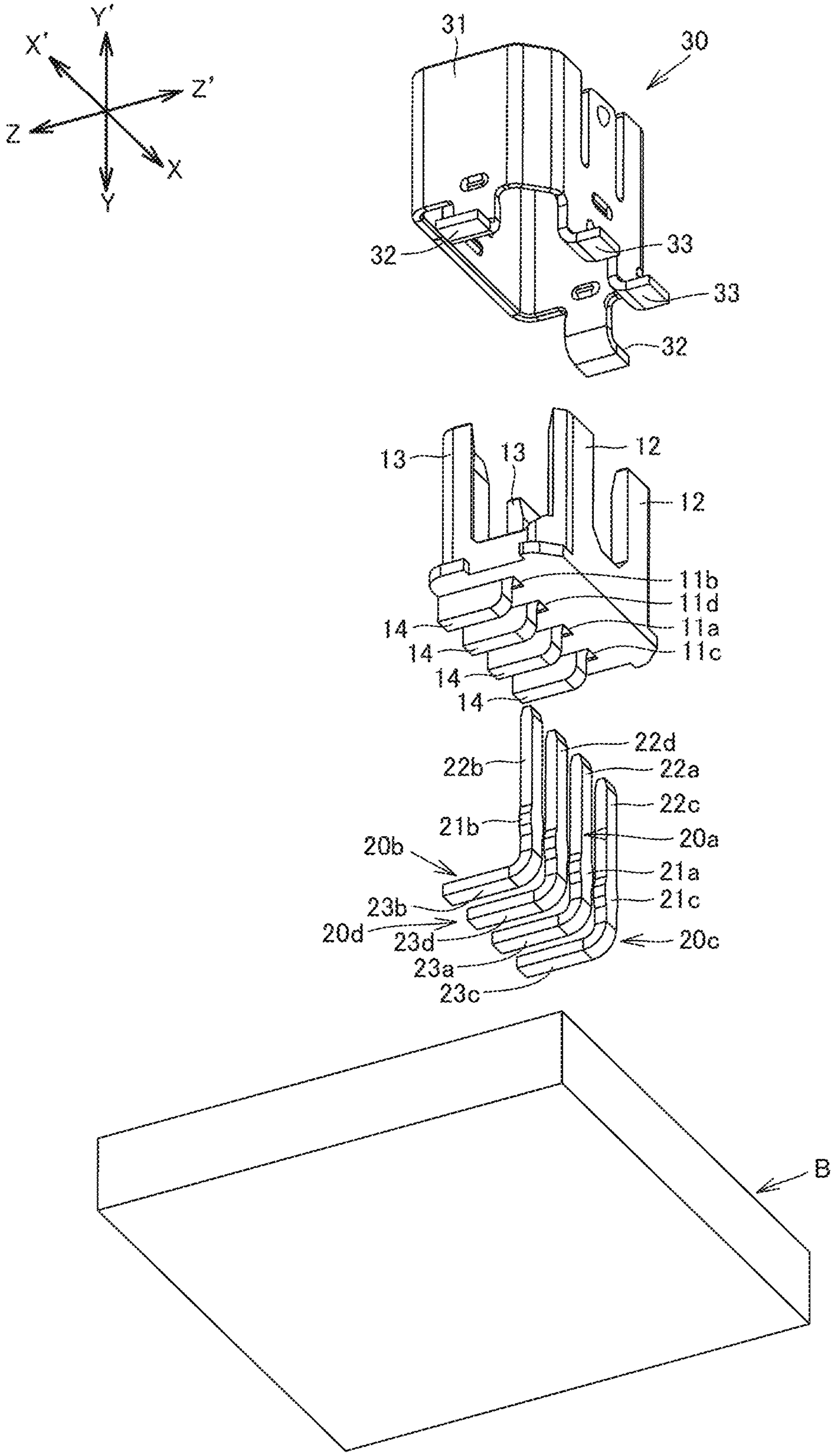
FIG. 11B is an exploded, bottom, rear, right side perspective view of the second connector of the connection structure of the first embodiment.

Hereinafter described is a connector assembly A1 (which may be referred to simply as an "assembly A1") according to a plurality of embodiments, including the first embodiment and modifications thereof, of the invention, with reference to FIGS. 1A to 7B. FIGS. 1A to 4B illustrate the assembly A1 of the first embodiment. FIGS. 5A and 5B illustrate a first variant of the assembly A1 of the first embodiment. FIGS. 6A and 6B illustrate a second variant of the assembly A1 of the first embodiment. FIGS. 7A and 7B illustrate a third variant of the assembly A1 of the first embodiment. FIGS. 1A to 2B and 2F to 4B show a Y-Y' direction (first direction). FIGS. 1A to 2E and 3A to 7B show an X-X' direction (second direction). FIGS. 1A, 1B, and 2C to 7B show a Z-Z' direction (third direction). The Y-Y' direction includes a Y direction (one side in the first direction) and a Y' direction (the other side in the first direction). The X-X' direction is substantially orthogonal to the Y-Y' direction and includes an X direction (one side in the second direction) and an X' direction (the other side in the second direction). The Z-Z' direction is substantially orthogonal to the Y-Y' and X-X' directions and includes a Z' direction (one side in the third direction) and a Z direction (the other side in the third direction).

The assembly A1 includes a connector CO1 (first connector) and a cable CA. The cable CA includes an outer insulator OJ, an outer conductor SH, a first inner insulator Da, a second inner insulator Db, a third inner insulator Dc, a fourth inner insulator Dd, a first electric wire Wa (inner conductor), a second electric wire Wb (inner conductor), a third electric wire Wc (inner conductor), and a fourth electric wire Wd (inner conductor). FIGS. 1A to 2B and 2F to 4B illustrate only a part of the cable CA.

The outer insulator OJ is made of a material having an insulating property, and is of a tubular shape having a generally circular section and extending in the Y-Y' direction. The outer insulator OJ includes a first end portion on the Y-direction side.

The outer conductor SH is constituted by a material having electrical conductivity (e.g., a braided copper wire, a metal foil, or other conductors) and is of a tubular shape having a generally circular section and extending in the Y-Y' direction. The outer conductor SH includes a first portion SH1 inside the outer insulator OJ. The outer conductor SH may further include a second portion SH2 outside the outer insulator OJ. The second portion SH2 of the outer conductor SH may be folded back in the Y' direction such as to be disposed on the first end portion of the outer insulator OJ (see FIGS. 1A to 5B), or may project from the first end portion of the outer insulator OJ to the Y-direction side (not illustrated).

Each of the first inner insulator Da, the second inner insulator Db, the third inner insulator Dc, and the fourth inner insulator Dd is a tube made of a material having an insulating property and extending in the Y-Y' direction. The first inner insulator Da includes a first portion Da1 inside the outer conductor SH and a second portion Da2 on the Y-direction side relative to the first portion Da1 and outside the outer conductor SH. The second inner insulator Db includes a first portion Db1 inside the outer conductor SH and a second portion Db2 on the Y-direction side relative to the first portion Db1 and outside the outer conductor SH. The third inner insulator Dc includes a first portion Dc1 inside the outer conductor SH and a second portion Dc2 on the Y-direction side relative to the first portion Dc1 and outside the outer conductor SH. The fourth inner insulator Dd includes a first portion Dd1 inside the outer conductor SH and a second portion Dd2 on the Y-direction side relative to the first portion Dd1 and outside the outer conductor SH.

Each of the first electric wire Wa, the second electric wire Wb, the third electric wire Wc, and the fourth electric wire Wd is constituted by a material having electrical conductivity (e.g., a copper wire or a soft copper wire).

The first electric wire Wa includes a first covered portion Wa1 and a first projecting portion Wa2. The second electric wire Wb includes a second covered portion Wb1 and a second projecting portion Wb2. The third electric wire Wc includes a third covered portion Wc1 and a third projecting portion Wc2. The fourth electric wire Wd includes a fourth covered portion Wd1 and a fourth projecting portion Wd2.

The first covered portion Wa1 of the first electric wire Wa is covered with, and disposed inside, the first inner insulator Da. The first projecting portion Wa2 of the first electric wire Wa is located on the Y-direction side relative to the first covered portion Wa1, projects from the first inner insulator Da in the Y direction, and is disposed outside the first inner insulator Da.

The second covered portion Wb1 of the second electric wire Wb is covered with, and disposed inside, the second inner insulator Db. The second projecting portion Wb2 of the second electric wire Wb is located on the Y-direction side relative to the second covered portion Wb1, projects from the second inner insulator Db in the Y direction, and is disposed outside the second inner insulator Db.

The third covered portion Wc1 of the third electric wire Wc is covered with, and disposed inside, the third inner insulator Dc. The third projecting portion Wc2 of the third electric wire Wc is located on the Y-direction side relative to the third covered portion Wc1, projects from the third inner insulator Dc in the Y direction, and is disposed outside the third inner insulator Dc.

The fourth covered portion Wd1 of the fourth electric wire Wd is covered with, and disposed inside, the fourth inner insulator Dd. The fourth projecting portion Wd2 of the fourth electric wire Wd is located on the Y-direction side relative to the fourth covered portion Wd1, projects from the fourth inner insulator Dd in the Y direction, and is disposed outside the fourth inner insulator Dd.

The first electric wire Wa includes a first portion Wa3 inside the outer conductor SH and a second portion Wa4 outside the outer conductor SH. The first portion Wa3 of the first electric wire Wa is a portion on the Y'-direction side of the first covered portion Wa1 of the first electric wire Wa, and is disposed inside the outer conductor SH. The second portion Wa4 of the first electric wire Wa includes a portion of the first covered portion Wa1 of the first electric wire Wa that is located on the Y-direction side relative to the first portion Wa3, and the first projecting portion Wa2 of the first electric wire Wa. The second portion Wa4 of the first electric wire Wa is led out of the outer conductor SH in the Y direction.

The second electric wire Wb includes a first portion Wb3 inside the outer conductor SH and a second portion Wb4 outside the outer conductor SH. The first portion Wb3 of the second electric wire Wb is a portion on the Y'-direction side of the second covered portion Wb1 of the second electric wire Wb, and is disposed inside the outer conductor SH. The second portion Wb4 of the second electric wire Wb includes a portion of the second covered portion Wb1 of the second electric wire Wb that is located on the Y-direction side relative to the first portion Wb3, and the second projecting portion Wb2 of the second electric wire Wb. The second portion Wb4 of the second electric wire Wb is led out of the outer conductor SH in the Y direction.

The third electric wire Wc includes a first portion Wc3 inside the outer conductor SH and a second portion Wc4 outside the outer conductor SH. The first portion Wc3 of the third electric wire Wc is a portion on the Y'-direction side of the third covered portion Wc1 of the third electric wire Wc, and is disposed inside the outer conductor SH. The second portion Wc4 of the third electric wire Wc includes a portion of the third covered portion Wc1 of the third electric wire Wc that is located on the Y-direction side relative to the first portion Wc3, and the third projecting portion Wc2 of the third electric wire Wc. The second portion Wc4 of the third electric wire Wc is led out of the outer conductor SH in the Y direction.

The fourth electric wire Wd includes a first portion Wd3 inside the outer conductor SH and a second portion Wd4 outside the outer conductor SH. The first portion Wd3 of the fourth electric wire Wd is a portion on the Y'-direction side of the fourth covered portion Wd1 of the fourth electric wire Wd, and is disposed inside the outer conductor SH. The second portion Wd4 of the fourth electric wire Wd includes a portion of the fourth covered portion Wd1 of the fourth electric wire Wd that is located on the Y-direction side relative to the first portion Wd3, and the fourth projecting portion Wd2 of the fourth electric wire Wd. The second portion Wd4 of the fourth electric wire Wd is led out of the outer conductor SH in the Y direction.

The first portion Da1 of the first inner insulator Da and the first portion Wa3 of the first electric wire Wa therein, the first portion Db1 of the second inner insulator Db and the first portion Wb3 of the second electric wire Wb therein, the first portion Del of the third inner insulator Dc and the first portion Wc3 of the third electric wire Wc therein, and the first portion Dd1 of the fourth inner insulator Dd and the first portion Wd3 of the fourth electric wire Wd therein may be twisted in the circumferential direction of the outer insulator OJ and, in this twisted state, disposed inside the outer conductor SH (see FIGS. 1B, 2A, 2B, and 2G).

In this case, in a state where the cable CA is extended in the Y-Y' direction, the first portion Da1 of the first inner insulator Da and the first portion Wa3 of the first electric wire Wa, the first portion Db1 of the second inner insulator Db and the first portion of the second electric wire Wb, the first portion Dd1 of the fourth inner insulator Dd and the first portion Wd3 of the fourth electric wire Wd, and the first portion Del of the third inner insulator Dc and the first portion Wc3 of the third electric wire Wc are arranged in this order in a counterclockwise direction, in cross-sectional view of each of a plurality of cross sections along the X-X' and Z-Z' directions of the cable CA. Referring to a second cross section (see FIG. 2E) among the plurality of cross sections, in cross-sectional view of the second cross section, the first portion Da1 of the first inner insulator Da and the first portion Wa3 of the first electric wire Wa are arranged side-by-side with the first portion Db1 of the second inner insulator Db and the first portion Wb3 of the second electric wire Wb in the X-X' direction; the first portion Del of the third inner insulator Dc and the first portion Wc3 of the third electric wire Wc are arranged side-by-side with the first portion Dd1 of the fourth inner insulator Dd and the first portion Wd3 of the fourth electric wire Wd in the X-X' direction; the first portion Da1 of the first inner insulator Da and the first portion Wa3 of the first electric wire Wa are arranged side-by-side with the first portion Dc1 of the third inner insulator Dc and the first portion Wc3 of the third electric wire Wc in the Z-Z' direction; and the first portion Db1 of the second inner insulator Db and the first portion Wb3 of the second electric wire Wb are arranged side-by-side with the first portion Dd1 of the fourth inner insulator Dd and the first portion Wd3 of the fourth electric wire Wd in the Z-Z' direction.

The first portion Da1 of the first inner insulator Da and the first portion Wa3 of the first electric wire Wa therein, the first portion Db1 of the second inner insulator Db and the first portion Wb3 of the second electric wire Wb therein, the first portion Del of the third inner insulator Dc and the first portion Wc3 of the third electric wire Wc therein, and the first portion Dd1 of the fourth inner insulator Dd and the first portion Wd3 of the fourth electric wire Wd therein may not be twisted in the circumferential direction of the outer insulator OJ but straightened along the outer conductor SH and, in this straightened state, disposed inside the outer conductor SH (not illustrated). In this case, in cross-sectional view of each of the plurality of cross sections (including the second cross section) along the X-X' and Z-Z' directions of the cable CA, the first portion Da1 of the first inner insulator Da and the first portion Wa3 of the first electric wire Wa are arranged side-by-side with the first portion Db1 of the second inner insulator Db and the first portion Wb3 of the second electric wire Wb in the X-X' direction; the first portion Dc1 of the third inner insulator Dc and the first portion Wc3 of the third electric wire Wc are arranged side-by-side with the first portion Dd1 of the fourth inner insulator Dd and the first portion Wd3 of the fourth electric wire Wd in the X-X' direction; the first portion Da1 of the first inner insulator Da and the first portion Wa3 of the first electric wire Wa are arranged side-by-side with the first portion Dc1 of the third inner insulator Dc and the first portion Wc3 of the third electric wire Wc in the Z-Z' direction, and the first portion Db1 of the second inner insulator Db and the first portion Wb3 of the second electric wire Wb are arranged side-by-side with the first portion Dd1 of the fourth inner insulator Dd and the first portion Wd3 of the fourth electric wire Wd in the Z-Z' direction.

In either case, the first portion Da1 of the first inner insulator Da and the first portion Wa3 of the first electric wire Wa, the first portion Db1 of the second inner insulator Db and the first portion Wb3 of the second electric wire Wb, the first portion Del of the third inner insulator Dc and the first portion Wc3 of the third electric wire Wc, and the first portion Dd1 of the fourth inner insulator Dd and the first portion Wd3 of the fourth electric wire Wd may be arranged such that the first portion Wd3 of the fourth electric wire Wd and the first portion Wa3 of the first electric wire Wa are located on diagonally opposite sides of the central axis of the outer insulator OJ, and such that the first portion Wb3 of the second electric wire Wb and the first portion Wc3 of the third electric wire Wc are located on diagonally opposite sides of the central axis of the outer insulator OJ.

Also, the second portion Da2 of the first inner insulator Da and the second portion Wa4 of the first electric wire Wa therein, and the second portion Db2 of the second inner insulator Db and the second portion Wb4 of the second electric wire Wb therein are arranged such that the first projecting portion Wa2 of the first electric wire Wa and the second projecting portion Wb2 of the second electric wire Wb are arranged side-by-side in the X-X' direction; the second portion Dc2 of the third inner insulator Dc and the second portion Wc4 of the third electric wire Wc therein, and the second portion Dd2 of the fourth inner insulator Dd and the second portion Wd4 of the fourth electric wire Wd therein are arranged such that the third projecting portion Wc2 of the third electric wire Wc and the fourth projecting portion Wd2 of the fourth electric wire Wd are arranged side-by-side in the X-X' direction; the second portion Da2 of the first inner insulator Da and the second portion Wa4 of the first electric wire Wa therein, and the second portion Dc2 of the third inner insulator Dc and the second portion Wc4 of the third electric wire Wc therein are arranged such that the first projecting portion Wa2 of the first electric wire Wa and the third projecting portion Wc2 of the third electric wire Wc are arranged side-by-side in the Z-Z' direction; and the second portion Db2 of the second inner insulator Db and the second portion Wb4 of the second electric wire Wb therein, and the second portion Dd2 of the fourth inner insulator Dd and the second portion Wd4 of the fourth electric wire Wd therein are arranged such that the second projecting portion Wb2 of the second electric wire Wb and the fourth projecting portion Wd2 of the fourth electric wire Wd are arranged side-by-side in the Z-Z' direction (see FIGS. 2C, 2F, 2G, 3 to 4B, 5A, 6A, and 7A).

The connector CO1 includes a body 100, a first terminal 200*a*, a second terminal 200*b*, a third terminal 200*c*, and a fourth terminal 200*d*.

The body 100 is made of a material having an insulating property. For example, the body 100 may be constituted by a molded resin or by an insulating resin formed by a 3D printer.

The body 100 includes a middle portion 110 and a rear portion 120. The middle portion 110 has a cross section along the X-X' and Z-Z' directions of generally polygonal shape (generally rectangular shape in FIGS. 1A to 7B) or generally circular shape. The rear portion 120 is generally polygonal or generally circular in cross section along the X-X' and Z-Z' directions, and extends from the middle portion 110 in the Y' direction. The rear portion 120 may further have either of the following configurations (1) or (2).

(1) The rear portion 120 includes a first housing recess 121*a*, a second housing recess 121*b*, a third housing recess 121*c*, and a fourth housing recess 121*d* (see FIGS. 2C, 2F, 2G, 3A to 5A, 6A, and 7A). The first housing recess 121*a* and the second housing recess 121*b* are provided in a face on the Z-direction side of the rear portion 120 and open in the Z and Y' directions. The third housing recess 121*c* and the fourth housing recess 121*d* are provided in a face on Z'-direction side of the rear portion 120 and open in the Z' and Y' directions. Each of the first housing recess 121*a*, the second housing recess 121*b*, the third housing recess 121*c*, and the fourth housing recess 121*d* includes a first end portion on the X-direction side and a second end portion on the X'-direction side.

The first housing recess 121*a* and the second housing recess 121*b* are arranged and spaced along the X-X' direction. The third housing recess 121*c* and the fourth housing recess 121*d* are arranged and spaced along the X-X' direction. The first housing recess 121*a* and the third housing recess 121*c* are arranged and spaced along the Z-Z' direction. In other words, the third housing recess 121*c* is arranged on the Z'-direction side relative to the first housing recess 121*a*. The second housing recess 121*b* and the fourth housing recess 121*d* are arranged and spaced along the Z-Z' direction. In other words, the fourth housing recess 121*d* is arranged on the Z'-direction side relative to the second housing recess 121*b*.

(2) The rear portion 120 includes a first housing hole, a second housing hole, a third housing hole, and a fourth housing hole (not illustrated). The first, second, third, and fourth housing holes are provided in the face on Y'-direction side of the rear portion 120, extend in the Y direction, and is open in the Y' direction. Each of first, second, third, and fourth housing holes includes a first end portion on the X-direction side and a second end portion on the X'-direction side.

The first housing hole and the second housing hole are arranged and spaced along the X-X' direction. The third housing hole and the fourth housing hole are arranged and spaced along the X-X' direction. The first housing hole and the third housing hole are arranged and spaced along the Z-Z' direction. In other words, the third housing hole is arranged on the Z'-direction side relative to the first housing hole. The second housing hole and the fourth housing hole are arranged and spaced along the Z-Z' direction. In other words, the fourth housing hole is arranged on the Z'-direction side relative to the second housing hole.

The middle portion 110 and the rear portion 120 include a first holding hole 122*a*, a second holding hole 122*b*, a third holding hole 122*c*, and a fourth holding hole 122*d*.

The first holding hole 122*a* extends from the first housing recess 121*a* or the first housing hole, in a direction including a component of the Z' direction (e.g., in the Z' direction, a first oblique direction, or a second oblique direction), communicates with the first housing recess 121*a* or the first housing hole, and is open in the Y' direction. The first oblique direction is a direction including a component of the Z' direction and a component of the X direction. The second oblique direction is a direction including a component of the Z' direction and a component of the X' direction.

The first holding hole 122*a* includes a first hole 122*a*1 and a second hole 122*a*2, for example. The first hole 122*a*1 of the first holding hole 122*a* extends from the second end portion (see FIGS. 2C and 6A) or the first end portion (see FIGS. 5A and 7A) of the first housing recess 121*a*, or alternatively from the second end portion or the first portion of the first housing hole, in the direction including the component of the Z' direction (e.g., in the Z' direction, the first oblique direction, or the second oblique direction), communicates with the first housing recess 121*a* or the first housing hole, and is open in the Y' direction. The second hole 122*a*2 of the first holding hole 122*a* extends in the Y direction from, is located on the Y-direction side relative to, and communicates with, the first hole 122*a*1 of the first holding hole 122*a* (see FIGS. 2A and 2B). The second hole 122*a*2 of the first holding hole 122*a* can be omitted.

The third holding hole 122*c* extends from the third housing recess 121*c* or the third housing hole, in a direction including a component of the Z direction (e.g., in the Z direction, a third oblique direction, or a fourth oblique direction), communicates with the third housing recess 121*c* or the third housing hole, and is open in the Y' direction. The third oblique direction is a direction including a component of the Z direction and a component of the X direction. The fourth oblique direction is a direction including a component of the Z direction and a component of the X' direction.

The third holding hole 122*c* includes a first hole 122*c*1 and a second hole 122*c*2, for example. The first hole 122*c*1 of the third holding hole 122*c* extends from the first end portion (see FIGS. 2C and 6A) or the second end portion (see FIGS. 5A and 7A) of the third housing recess 121*c*, or alternatively from the first end portion or the second portion of the third housing hole, in the direction including the component of the Z direction (e.g., in the Z direction, the third oblique direction, or the fourth oblique direction), communicates with the third housing recess 121*c* or the third housing hole, and is open in the Y' direction. The second hole 122*c*2 of the third holding hole 122*c* extends in the Y direction from, is located on the Y-direction side relative to, and communicates with, the first hole 122*c*1 of the third holding hole 122*c* (see FIGS. 2A and 2B). The second hole 122*c*2 of the third holding hole 122*c* can be omitted.

The first holding hole 122*a* and the third holding hole 122*c* are arranged and spaced along the X-X' direction (see FIGS. 2C, 5A, 6A, and 7A). The first holding hole 122*a* may be arranged on the X'-direction side relative to the third holding hole 122*c*, and the third holding hole 122*c* may be arranged on the X-direction side relative to the first holding hole 122*a* (see FIGS. 2C and 6A), or vice versa (see FIGS. 5A and 7A).

The second holding hole 122*b* extends from the second housing recess 121*b* or the second housing hole, in a direction including a component of the Z' direction (e.g., in the Z' direction, the first oblique direction, or the second oblique direction), communicates with the second housing recess 121*b* or the second housing hole, and is open in the Y' direction.

The second holding hole 122*b* includes a first hole 122*b*1 and a second hole 122*b*2, for example. The first hole 122*b*1 of the second holding hole 122*b* extends from the second end portion (see FIGS. 2C and 6A) or the first end portion (see FIGS. 5A and 7A) of the second housing recess 121*b*, or alternatively from the second end portion or the first portion of the second housing hole, in the direction including the component of the Z' direction (e.g., in the Z' direction, the first oblique direction, or the second oblique direction), communicates with the second housing recess 121*b* or the second housing hole, and is open in the Y' direction. The second hole 122*b*2 of the second holding hole 122*b* extends in the Y direction from, is located on the Y-direction side relative to, and communicates with, the first hole 122*b*1 of the second holding hole 122*b* (see FIGS. 2A, 2B, 2F, and 2G). The second hole 122*b*2 of the second holding hole 122*b* can be omitted.

The fourth holding hole 122*d* extends from the fourth housing recess 121*d* or the fourth housing hole, in a direction including a component of the Z direction (e.g., in the Z direction, the third oblique direction, or the fourth oblique direction), communicates with the fourth housing recess 121*d* or the fourth housing hole, and is open in the Y' direction.

The fourth holding hole 122*d* includes a first hole 122*d*1 and a second hole 122*d*2, for example. The first hole 122*d*1 of the fourth holding hole 122*d* extends from the first end portion (see FIGS. 2C and 6A) or the second end portion (see FIGS. 5A and 7A) of the fourth housing recess 121*d*, or alternatively from the first end portion or the second portion of the fourth housing hole, in the direction including the component of the Z direction (e.g., in the Z direction, the third oblique direction, or the fourth oblique direction), communicates with the fourth housing recess 121*d* or the fourth housing hole, and is open in the Y' direction. The second hole 122*d*2 of the fourth holding hole 122*d* extends in the Y direction from, is located on the Y-direction side relative to, and communicates with, the first hole 122*d*1 of the fourth holding hole 122*d* (see FIGS. 2A, 2B, 2F, and 2G). The second hole 122*d*2 of the fourth holding hole 122*d* can be omitted.

The second holding hole 122*b* and the fourth holding hole 122*d* are arranged and spaced along the X-X' direction (see FIGS. 2C, 5A, 6A, and 7A). The second holding hole 122*b* may be arranged on the X'-direction side relative to the fourth holding hole 122*d*, and the fourth holding hole 122*d* may be arranged on the X-direction side relative to the second holding hole 122*b* (see FIGS. 2C and 7A), or vice versa (see FIGS. 5A and 6A).

(a1) In a case where the first holding hole 122*a* is arranged on the X'-direction side relative to the third holding hole 122*c*, the third holding hole 122*c* is arranged on the X-direction side relative to the first holding hole 122*a*, the second holding hole 122*b* is arranged on the X'-direction side relative to the fourth holding hole 122*d*, and the fourth holding hole 122*d* is arranged on the X-direction side relative to the second holding hole 122*b* (see FIG. 2C), the second holding hole 122*b*, the fourth holding hole 122*d*, the first holding hole 122*a*, and the third holding hole 122*c* are arranged in this order and at spaced intervals along the X-X' direction.

(b1) In a case where the first holding hole 122*a* is arranged on the X-direction side relative to the third holding hole 122*c*, the third holding hole 122*c* is arranged on the X'-direction side relative to the first holding hole 122*a*, the second holding hole 122*b* is arranged on the X-direction side relative to the fourth holding hole 122*d*, and the fourth holding hole 122*d* is arranged on the X'-direction side relative to the second holding hole 122*b* (see FIG. 5A), the fourth holding hole 122*d*, the second holding hole 122*b*, the third holding hole 122*c*, and the first holding hole 122*a* are arranged in this order and at spaced intervals along the X-X' direction.

(c1) In a case where the first holding hole 122*a* is arranged on the X'-direction side relative to the third holding hole 122*c*, the third holding hole 122*c* is arranged on the X-direction side relative to the first holding hole 122*a*, the second holding hole 122*b* is arranged on the X-direction side relative to the fourth holding hole 122*d*, and the fourth holding hole 122*d* is arranged on the X'-direction side relative to the second holding hole 122*b* (see FIG. 6A), the fourth holding hole 122*d*, the second holding hole 122*b*, the first holding hole 122*a*, and the third holding hole 122*c* are arranged in this order and at spaced intervals along the X-X' direction.

(d1) In a case where the first holding hole 122*a* is arranged on the X-direction side relative to the third holding hole 122*c*, the third holding hole 122*c* is arranged on the X'-direction side relative to the first holding hole 122*a*, the second holding hole 122*b* is arranged on the X'-direction side relative to the fourth holding hole 122*d*, and the fourth holding hole 122*d* is arranged on the X-direction side relative to the second holding hole 122*b* (see FIG. 7A), the second holding hole 122*b*, the fourth holding hole 122*d*, the third holding hole 122*c*, and the first holding hole 122*a* are arranged in this order and at spaced intervals along the X-X' direction.

The body 100 may further include a distal portion 130. The distal portion 130 generally polygonal or generally circular in cross section along the X-X' and Z-Z' directions, and extends from the middle portion 110 in the Y direction. The distal portion 130 may further have either of the following configurations (3) or (4).

(3) The distal portion 130 includes a first connecting hole 131*a*, a second connecting hole 131*b*, a third connecting hole 131*c*, and a fourth connecting hole 131*d* (see FIGS. 1A, 2A, 2B, 2D, 2F, 2G, 3A, 4A, 5B, 6B, and 7B). The first connecting hole 131*a* extends from the first holding hole 122*a* in a direction including a component of the Y direction (e.g., in the Y direction, a fifth oblique direction, or a sixth oblique direction), communicates with the first holding hole 122*a*, and is open in the Y direction. The second connecting hole 131*b* extends from the second holding hole 122*b* in a direction including a component of the Y direction (e.g., in the Y direction, the fifth oblique direction, or the sixth oblique direction), communicates with the second holding hole 122*b*, and is open in the Y direction. The third connecting hole 131*c* extends from the third holding hole 122*c* in a direction including a component of the Y direction (e.g., in the Y direction, the fifth oblique direction, or the sixth oblique direction), communicates with the third holding hole 122*c*, and is open in the Y direction. The fourth connecting hole 131*d* extends from the fourth holding hole 122*d* in a direction including a component of the Y direction (e.g., in the Y direction, the fifth oblique direction, or the sixth oblique direction), communicates with the fourth holding hole 122*d*, and is open in the Y direction. The fifth oblique direction is a direction including a component of the Y direction and a component of the Z direction. The sixth oblique direction is a direction including a component of the Y direction and a component of the Z' direction.

Figure 2A:
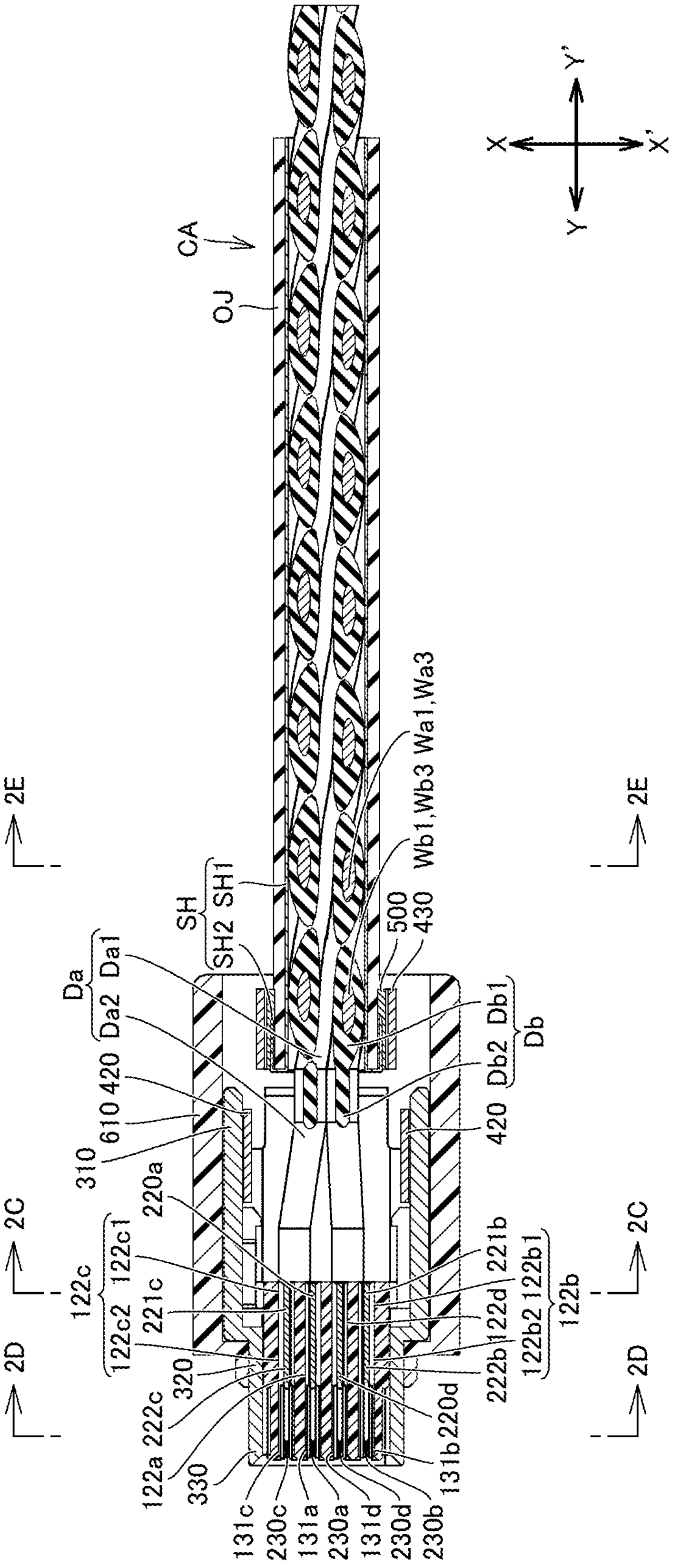
FIG. 2A is an enlarged cross-sectional view of the connector assembly of the first embodiment, taken along line 2A-2A in FIG. 1A.
Figure 2B:
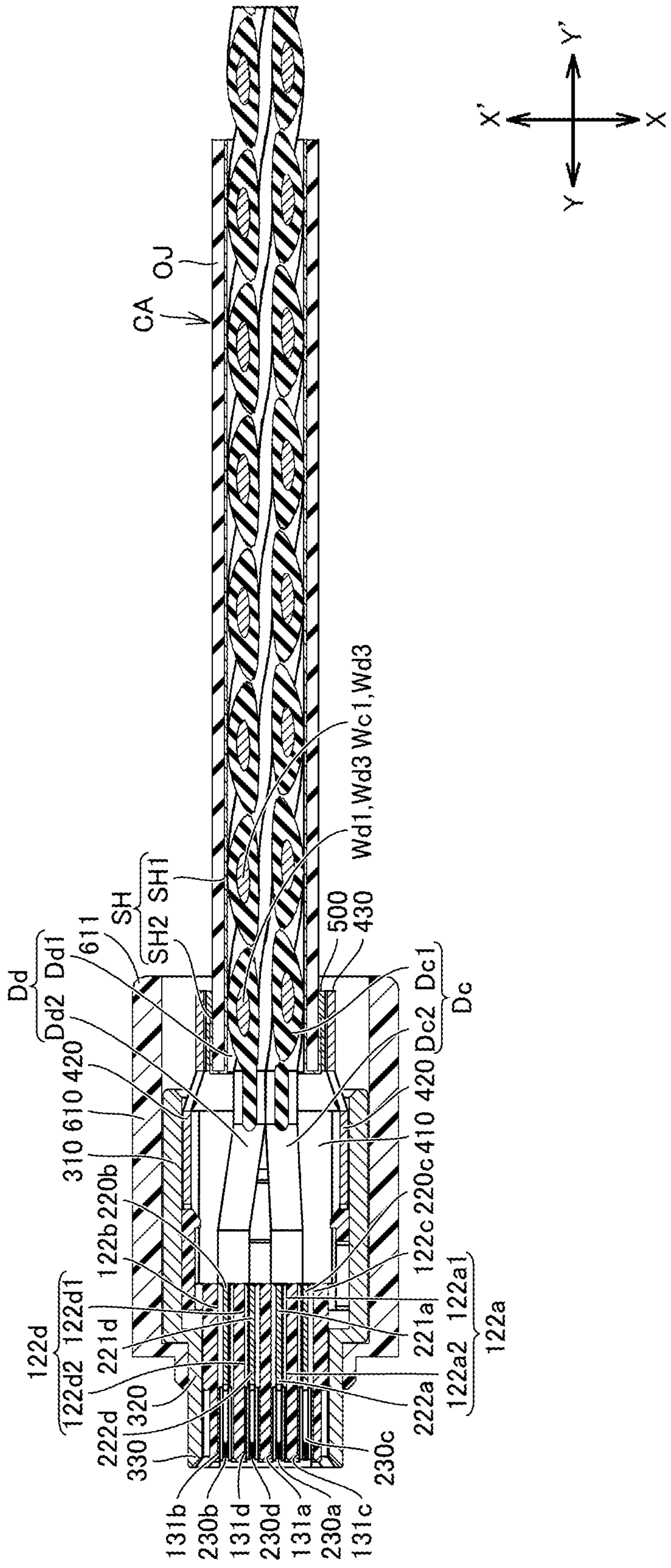
FIG. 2B is an enlarged cross-sectional view of the connector assembly of the first embodiment, taken along line 2B-2B in FIG. 1A.
Figure 2C:
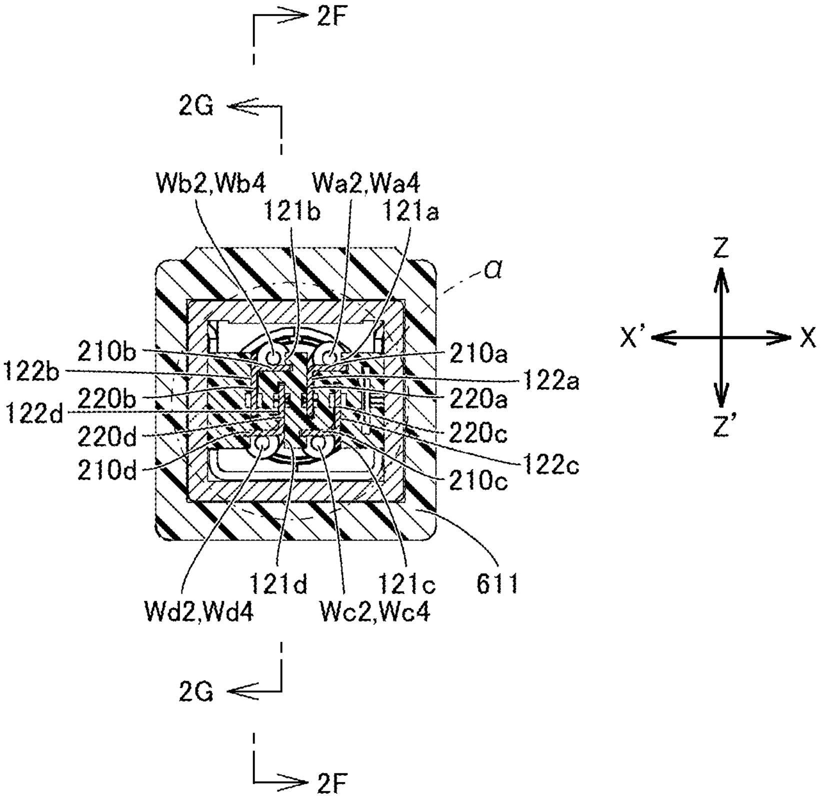
FIG. 2C is an enlarged cross-sectional view of the connector assembly of the first embodiment, taken along line 2C-2C in FIG. 2A.
Figure 2D:
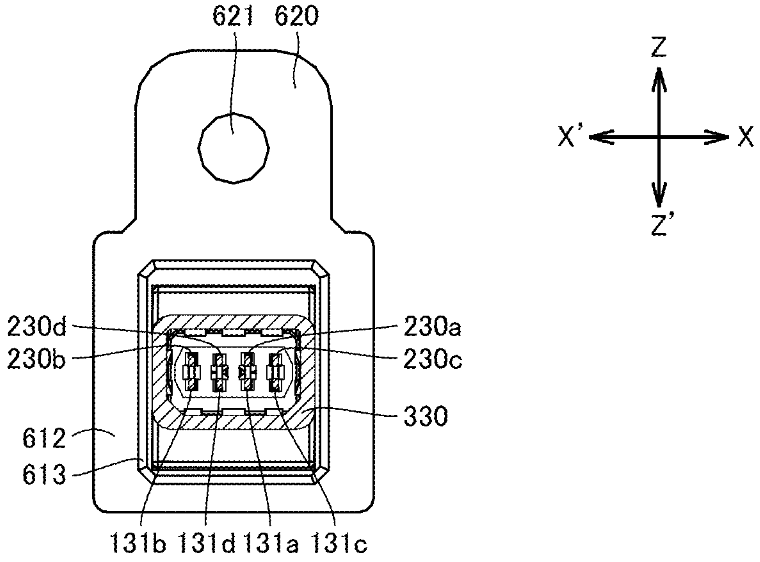
FIG. 2D is an enlarged cross-sectional view of the connector assembly of the first embodiment, taken along line 2D-2D in FIG. 2A.

The first connecting hole 131*a*, the second connecting hole 131*b*, the third connecting hole 131*c*, and the fourth connecting hole 131*d* are arranged and spaced along the X-X' direction. For example, the first connecting hole 131*a*, the second connecting hole 131*b*, the third connecting hole 131*c*, and the fourth connecting hole 131*d* are in one of the following arrangements.

Where the second holding hole 122*b*, the fourth holding hole 122*d*, the first holding hole 122*a*, and the third holding hole 122*c* are arranged in this order and at spaced intervals along the X-X' direction (in case (a1) above), (a2) the second connecting hole 131*b*, the fourth connecting hole 131*d*, the first connecting hole 131*a*, and the third connecting hole 131*c* are arranged in this order and at spaced intervals along the X-X' direction (see FIG. 2D).

Where the fourth holding hole 122*d*, the second holding hole 122*b*, the third holding hole 122*c*, and the first holding hole 122*a* are arranged in this order and at spaced intervals along the X-X' direction (in case (b1) above), (b2) the fourth connecting hole 131*d*, the second connecting hole 131*b*, the third connecting hole 131*c*, and the first connecting hole 131*a* are arranged in this order and at spaced intervals along the X-X' direction (see FIG. 5B).

Where the fourth holding hole 122*d*, the second holding hole 122*b*, the first holding hole 122*a*, and the third holding hole 122*c* are arranged in this order and at spaced intervals along the X-X' direction (in case (c1) above), (c2) the fourth connecting hole 131*d*, the second connecting hole 131*b*, the first connecting hole 131*a*, and the third connecting hole 131*c* are arranged in this order and at spaced intervals along the X-X' direction (see FIG. 6B).

Where the second holding hole 122*b*, the fourth holding hole 122*d*, the third holding hole 122*c*, and the first holding hole 122*a* are arranged in this order and at spaced intervals along the X-X' direction (in case (d1) above), (d2) the second connecting hole 131*b*, the fourth connecting hole 131*d*, the third connecting hole 131*c*, and the first connecting hole 131*a* are arranged in this order and at spaced intervals along the X-X' direction (see FIG. 7B).

(4) The distal portion 130 includes a first connecting groove, a second connecting groove, a third connecting groove, and a fourth connecting groove (not illustrated). The first connecting groove extends from the first holding hole 122*a* in the Y direction, communicates with the first holding hole 122*a*, and is open in the Y and Z directions or in the Y and Z' directions. The second connecting groove extends from the second holding hole 122*b* in the Y direction, communicates with the second holding hole 122*b*, and is open in the Y and Z directions or in the Y and Z' directions. The third connecting groove extends from the third holding hole 122*c* in the Y direction, communicates with the third holding hole 122*c*, and is open in the Y and Z directions or in the Y and Z' directions. The fourth connecting groove extends from the fourth holding hole 122*d* in the Y direction, communicates with the fourth holding hole 122*d*, and is open in the Y and Z directions or in the Y and Z' directions.

The first connecting groove, the second connecting groove, the third connecting groove, and the fourth connecting groove are arranged and spaced along the X-X' direction. For example, the first connecting groove, the second connecting groove, the third connecting groove, and the fourth connecting groove are in one of the following arrangements.

Where the second holding hole 122*b*, the fourth holding hole 122*d*, the first holding hole 122*a*, and the third holding hole 122*c* are arranged in this order and at spaced intervals along the X-X' direction (in case (a1) above), (a3) the second connecting groove, the fourth connecting groove, the first connecting groove, and the third connecting groove are arranged in this order and at spaced intervals along the X-X' direction.

Where the fourth holding hole 122*d*, the second holding hole 122*b*, the third holding hole 122*c*, and the first holding hole 122*a* are arranged in this order and at spaced intervals along the X-X' direction (in case (b1) above), (b3) the fourth connecting groove, the second connecting groove, the third connecting groove, and the first connecting groove are arranged in this order and at spaced intervals along the X-X' direction.

Where the fourth holding hole 122*d*, the second holding hole 122*b*, the first holding hole 122*a*, and the third holding hole 122*c* are arranged in this order and at spaced intervals along the X-X' direction (in case (c1) above), (c3) the fourth connecting groove, the second connecting groove, the first connecting groove, and the third connecting groove are arranged in this order and at spaced intervals along the X-X' direction.

Where the second holding hole 122*b*, the fourth holding hole 122*d*, the third holding hole 122*c*, and the first holding hole 122*a* are arranged in this order and at spaced intervals along the X-X' direction (in case (d1) above), (d3) the second connecting groove, the fourth connecting groove, the third connecting groove, and the first connecting groove are arranged in this order and at spaced intervals along the X-X' direction.

The distal portion 130 can be omitted.

Each of the first terminal 200*a*, the second terminal 200*b*, the third terminal 200*c*, and the fourth terminal 200*d* is constituted by a material having electrical conductivity. For example, each of the first terminal 200*a*, the second terminal 200*b*, the third terminal 200*c*, and the fourth terminal 200*d* may be constituted by a metal plate or a plate of other conductor, or may be constituted by a conductor formed by a 3D printer. The first terminal 200*a*, the second terminal 200*b*, the third terminal 200*c*, and the fourth terminal 200*d* extend in the Y-Y' direction. The Y-Y' direction is an extending direction of the first terminal 200*a*, the second terminal 200*b*, the third terminal 200*c*, and the fourth terminal 200*d*.

The first terminal 200*a* includes a first connecting portion 210*a*, a first main portion 220*a*, and a first distal portion 230*a*. The second terminal 200*b* includes a second connecting portion 210*b*, a second main portion 220*b*, and a second distal portion 230*b*. The third terminal 200*c* includes a third connecting portion 210*c*, a third main portion 220*c*, and a third distal portion 230*c*. The fourth terminal 200*d* includes a fourth connecting portion 210*d*, a fourth main portion 220*d*, and a fourth distal portion 230*d*.

The first connecting portion 210*a*, the second connecting portion 210*b*, the third connecting portion 210*c*, and the fourth connecting portion 210_d_ extend in the Y-Y' and X-X' directions. Each of the first connecting portion 210_a_, the second connecting portion 210_b_, the third connecting portion 210_c_, and the fourth connecting portion 210_d_ may have either of the following configuration (I) or (II).

(I) Each of the first connecting portion 210_a_, the second connecting portion 210_b_, the third connecting portion 210_c_, and the fourth connecting portion 210_d_ includes a flat plate extending in the Y-Y' and X-X' directions (see FIGS. 2C, 3A to 4B, 5A, 6A, and 7A). (II) Each of the first connecting portion 210_a_, the second connecting portion 210_b_, the third connecting portion 210_c_, and the fourth connecting portion 210_d_ may have a generally arc shape, a generally L shape, a generally V shape, a generally U shape, or a generally O shape in cross-sectional view of a cross section along the X-X' and Z-Z' directions, and extend in the Y-Y' direction (not illustrated). The first connecting portion 210_a_ and the second connecting portion 210_b_ of a generally arc shape, a generally L shape, a generally V shape, or a generally U shape in the cross-sectional view of the cross section are oriented oppositely in the Z-Z' direction to the third connecting portion 210_c_ and the fourth connecting portion 210_d_ having a generally arc shape, a generally L shape, a generally V shape, or a generally U shape in cross-sectional view of the cross section.

In any of the above configurations, each of the first connecting portion 210_a_, the second connecting portion 210_b_, the third connecting portion 210_c_, and the fourth connecting portion 210_d_ includes a first end portion on the X-direction side and a second end portion on the X'-direction side.

The first main portion 220_a_ extends from the first connecting portion 210_a_ in a direction including a component of the Z' direction (e.g., in the Z' direction, the first oblique direction, or the second oblique direction). The first main portion 220_a_ includes a first plate 221_a_ and a second plate 222_a_, for example. The first plate 221_a_ of the first main portion 220_a_ extends from the second end portion (see FIGS. 2C and 6A) or the first end portion (see FIGS. 5A and 7A) of the first connecting portion 210_a_ in a direction including a component of the Z' direction (e.g., in the Z' direction, the first oblique direction, or the second oblique direction). The second plate 222_a_ of the first main portion 220_a_ extends from an end on the Y-direction side of the first plate 221_a_ of the first main portion 220_a_, in a direction including a component of the Y direction (e.g., in the Y direction, a seventh oblique direction, or an eighth oblique direction) (see FIGS. 2A, 2B, and 3A to 4B). The second plate 222_a_ of the first main portion 220_a_ can be omitted. The seventh oblique direction is a direction including a component of the Y direction and a component of the X direction. The eighth oblique direction is a direction including a component of the Y direction and a component of the X' direction.

Where the second plate 222_a_ of the first main portion 220_a_ is provided, the first distal portion 230_a_ extends from an end on the Y-direction side of the second plate 222_a_ of the first main portion 220_a_, in a direction including a component of the Y direction (e.g., in the Y direction, the fifth oblique direction, or the sixth oblique direction). Where the second plate 222_a_ of the first main portion 220_a_ is not provided, the first distal portion 230_a_ extends from the end on the Y-direction side of the first plate 221_a_ of the first main portion 220_a_, in a direction including a component of the Y direction (e.g., in the Y direction, the fifth oblique direction, or the sixth oblique direction). For example, the first distal portion 230_a_ may have configuration (III-1) including first and second arms extending from the end on the Y-direction side of the second plate 222_a_ or the first plate 221_a_ of the first main portion 220_a_ in a direction including a component of the Y direction (see FIGS. 3A to 4B); configuration (III-2) including a first arm extending from the end on the Y-direction side of the second plate 222_a_ or the first plate 221_a_ of the first main portion 220_a_ in a direction including a component of the Y direction (not illustrated); configuration (III-3) including a tube, which extends from the end on the Y-direction side of the second plate 222_a_ or the first plate 221_a_ of the first main portion 220_a_ in a direction including a component of the Y direction, and first and second arms, which extend from the tube in the Y direction (not illustrated); configuration (III-4) including a first arm, which extends from the end on the Y-direction side of the second plate 222_a_ or the first plate 221_a_ of the first main portion 220_a_ in a direction including a component of the Y direction, a second arm, which extends in a direction including a component of the Y direction, and a coupling portion, which couples end portions on the Y'-direction side of the first and second arms (not illustrated); configuration (III-5) including a plate extending from the end on the Y-direction side of the second plate 222_a_ or the first plate 221_a_ of the first main portion 220_a_ in a direction including a component of the Y direction (not illustrated); configuration (III-6) including a rod extending from the end on the Y-direction side of the second plate 222_a_ or the first plate 221_a_ of the first main portion 220_a_ in a direction including a component of the Y direction (not illustrated); or configuration (III-7) including a tube extending from the end on the Y-direction side of the second plate 222_a_ or the first plate 221_a_ of the first main portion 220_a_ in a direction including a component of the Y direction (not illustrated). The first and second arms may face each other in the X-X' direction or in the Z-Z' direction.

Each of the first arm, the second arm, the plate, and the rod of the first distal portion 230_a_ according to any of the above aspects may, but is not required to, be bent such as to partly project in the Z or Z' direction.

The second main portion 220_b_ extends from the second connecting portion 210_b_ in a direction including a component of the Z' direction (e.g., in the Z' direction, the first oblique direction, or the second oblique direction). The second main portion 220_b_ includes a first plate 221_b_ and a second plate 222_b_, for example. The first plate 221_b_ of the second main portion 220_b_ extends from the second end portion (see FIGS. 2C and 6A) or the first end portion (see FIGS. 5A and 7A) of the second connecting portion 210_b_, in a direction including a component of the Z' direction (e.g., in the Z' direction, the first oblique direction, or the second oblique direction) (see FIGS. 2A, 2B, and 3A to 4B). The second plate 222_b_ of the second main portion 220_b_ extends from an end on the Y-direction side of the first plate 221_b_ of the second main portion 220_b_, in a direction including a component of the Y direction (e.g., in the Y direction, the seventh oblique direction, or the eighth oblique direction). The second plate 222_b_ of the second main portion 220_b_ can be omitted.

Where the second plate 222_b_ of the second main portion 220_b_ is provided, the second distal portion 230_b_ extends from an end on the Y-direction side of the second plate 222_b_ of the second main portion 220_b_, in a direction including a component of the Y direction (e.g., in the Y direction, the fifth oblique direction, or the sixth oblique direction). Where the second plate 222_b_ of the second main portion 220_b_ is not provided, the second distal portion 230_b_ extends from the end on the Y-direction side of the first plate 221_b_ of the second main portion 220_b_, in a direction including a component of the Y direction (e.g., in the Y direction, the fifth oblique direction, or the sixth oblique direction). The second distal portion 230*b* may have, for example, the same configuration as the first distal portion 230*a* described above, except that the second distal portion 230*b* extends from the end on the Y-direction side of the second plate 222*b* or the first plate 221*b* of the second main portion 220*b* in a direction including a component of the Y direction.

The third main portion 220*c* extends from the third connecting portion 210*c* in a direction including a component of the Z direction (e.g., in the Z direction, the third oblique direction, or the fourth oblique direction). The third main portion 220*c* includes a first plate 221*c* and a second plate 222*c*, for example. The first plate 221*c* of the third main portion 220*c* extends from the first end portion (see FIGS. 2C and 6A) or the second end portion (see FIGS. 5A and 7A) of the third connecting portion 210*c*, in a direction including a component of the Z direction (e.g., in the Z direction, the third oblique direction, or the fourth oblique direction). The second plate 222*c* of the third main portion 220*c* extends from the end on the Y-direction side of the first plate 221*c* of the third main portion 220*c*, in a direction including a component of the Y direction (e.g., in the Y direction, the seventh oblique direction, or the eighth oblique direction) (see FIGS. 2A, 2B, 2F, and 2G to 4B). The second plate 222*c* of the third main portion 220*c* can be omitted.

Where the second plate 222*c* of the third main portion 220*c* is provided, the third distal portion 230*c* extends from an end on the Y-direction side of the second plate 222*c* of the third main portion 220*c*, in a direction including a component of the Y direction (e.g., in the Y direction, the fifth oblique direction, or the sixth oblique direction). Where the second plate 222*c* of the third main portion 220*c* is not provided, the third distal portion 230*c* extends from the end on the Y-direction side of the first plate 221*c* of the third main portion 220*c*, in a direction including a component of the Y direction (e.g., in the Y direction, the fifth oblique direction, or the sixth oblique direction). The third distal portion 230*c* may have, for example, the same configuration as the first distal portion 230*a* described above, except that the third distal portion 230*c* extends from the end on the Y-direction side of the second plate 222*c* or the first plate 221*c* of the third main portion 220*c* in a direction including a component of the Y direction.

The fourth main portion 220*d* extends from the fourth connecting portion 210*d* in a direction including a component of the Z direction (e.g., in the Z direction, the third oblique direction, or the fourth oblique direction). The fourth main portion 220*d* includes a first plate 221*d* and a second plate 222*d*, for example. The first plate 221*d* of the fourth main portion 220*d* extends from the first end portion (see FIGS. 2C and 6A) or the second end portion (see FIGS. 5A and 7A) of the fourth connecting portion 210*d* in a direction including a component of the Z direction (e.g., in the Z direction, the third oblique direction, or the fourth oblique direction). The second plate 222*d* of the fourth main portion 220*d* extends from an end on the Y-direction side of the first plate 221*d* of the fourth main portion 220*d* in a direction including a component of the Y direction (e.g., in the Y direction, the seventh oblique direction, or the eighth oblique direction) (see FIGS. 2A, 2B, 2F, and 2G to 4B). The second plate 222*d* of the fourth main portion 220*d* can be omitted.

Where the second plate 222*d* of the fourth main portion 220*d* is provided, the fourth distal portion 230*d* extends from an end on the Y-direction side of the second plate 222*d* of the fourth main portion 220*d*, in a direction including a component of the Y direction (e.g., in the Y direction, the fifth oblique direction, or the sixth oblique direction). Where the second plate 222*d* of the fourth main portion 220*d* is not provided, the fourth distal portion 230*d* extends from the end on the Y-direction side of the first plate 221*d* of the fourth main portion 220*d*, in a direction including a component of the Y direction (e.g., in the Y direction, the fifth oblique direction, or the sixth oblique direction). The fourth distal portion 230*d* may have, for example, the same configuration as the first distal portion 230*a* described above, except that the fourth distal portion 230*d* extends from the end on the Y-direction side of the second plate 222*d* or the first plate 221*d* of the fourth main portion 220*d* in a direction including a component of the Y direction.

Each of the first terminal 200*a*, the second terminal 200*b*, the third terminal 200*c*, and the fourth terminal 200*d* is required to be at least partly held in the body 100. For example, the first terminal 200*a*, the second terminal 200*b*, the third terminal 200*c*, and the fourth terminal 200*d* are partly held in the body 100 in one of the following manners.

Where each of the first main portion 220*a* of the first terminal 200*a*, the second main portion 220*b* of the second terminal 200*b*, the third main portion 220*c* of the third terminal 200*c*, and the fourth main portion 220*d* of the fourth terminal 200*d* has the first plate and the second plate, the first plate 221*a* and the second plate 222*a* of the first main portion 220*a* are securely housed in the first hole 122*a*1 and the second hole 122*a*2, respectively, of the first holding hole 122*a* of the body 100 from the Y'-direction side; the first plate 221*b* and the second plate 222*b* of the second main portion 220*b* are securely housed in the first hole 122*b*1 and the second hole 122*b*2, respectively, of the second holding hole 122*b* of the body 100 from the Y'-direction side; the first plate 221*c* and the second plate 222*c* of the third main portion 220*c* are securely housed in the first hole 122*c*1 and the second hole 122*c*2, respectively, of the third holding hole 122*c* of the body 100 from the Y'-direction side, and the first plate 221*d* and the second plate 222*d* of the fourth main portion 220*d* of the fourth terminal 200*d* are securely housed in the first hole 122*d*1 and the second hole 122*d*2, respectively, of the fourth holding hole 122*d* of the body 100 from the Y'-direction side.

Where each of the first main portion 220*a* of the first terminal 200*a*, the second main portion 220*b* of the second terminal 200*b*, the third main portion 220*c* of the third terminal 200*c*, and the fourth main portion 220*d* of the fourth terminal 200*d* does not include the second plate, the first plate 221*a* of the first main portion 220*a* is securely housed in the first hole 122*a*1 of the first holding hole 122*a* of the body 100 from the Y'-direction side; the first plate 221*b* of the second main portion 220*b* is securely housed in the first hole 122*b*1 of the second holding hole 122*b* of the body 100 from the Y'-direction side; the first plate 221*c* of the third main portion 220*c* is securely housed in the first hole 122*c*1 of the third holding hole 122*c* of the body 100 from the Y'-direction side; and the first plate 221*d* of the fourth main portion 220*d* of the fourth terminal 200*d* is securely housed in the first hole 122*d*1 of the fourth holding hole 122*d* of the body 100 from the Y'-direction side.

In either case, the first main portion 220*a*, the second main portion 220*b*, the third main portion 220*c*, and the fourth main portion 220*d* are held by the body 100 and arranged and spaced along the X-X' direction. For example, the first main portion 220*a*, the second main portion 220*b*, the third main portion 220*c*, and the fourth main portion 220*d* is in one of the following arrangements.

Where the second holding hole 122*b*, the fourth holding hole 122*d*, the first holding hole 122*a*, and the third holding hole 122*c* are arranged in this order and at spaced intervals along the X-X' direction (in case (a1) above), (a4) the second main portion 220*b*, the fourth main portion 220*d*, the first main portion 220*a*, and the third main portion 220*c* are arranged in this order and at spaced intervals along the X-X' direction (see FIG. 2C).

Where the fourth holding hole 122*d*, the second holding hole 122*b*, the third holding hole 122*c*, and the first holding hole 122*a* are arranged in this order and at spaced intervals along the X-X' direction (in case (b1) above), (b4) the fourth main portion 220*d*, the second main portion 220*b*, the third main portion 220*c*, and the first main portion 220*a* are arranged in this order and at spaced intervals along the X-X' direction (see FIG. 5A).

Where the fourth holding hole 122*d*, the second holding hole 122*b*, the first holding hole 122*a*, and the third holding hole 122*c* are arranged in this order and at spaced intervals along the X-X' direction (in case (c1) above), (c4) the fourth main portion 220*d*, the second main portion 220*b*, the first main portion 220*a*, and the third main portion 220*c* are arranged in this order and at spaced intervals along the X-X' direction (see FIG. 6A).

Where the second holding hole 122*b*, the fourth holding hole 122*d*, the third holding hole 122*c*, and the first holding hole 122*a* are arranged in this order and at spaced intervals along the X-X' direction (in case (d1) above), (d4) the second main portion 220*b*, the fourth main portion 220*d*, the third main portion 220*c*, and the first main portion 220*a* are arranged in this order and at spaced intervals along the X-X' direction (see FIG. 7A).

Where the rear portion 120 of the body 100 is provided with the first housing recess 121*a* to the fourth housing recess 121*d*, the first connecting portion 210*a* of the first terminal 200*a* is housed in the first housing recess 121*a* of the rear portion 120 of the body 100 from the Y'-direction side and exposed in the Z direction, the second connecting portion 210*b* of the second terminal 200*b* is housed in the second housing recess 121*b* of the rear portion 120 of the body 100 from the Y'-direction side and exposed in the Z direction, the third connecting portion 210*c* of the third terminal 200*c* is housed in the third housing recess 121*c* of the rear portion 120 of the body 100 from the Y'-direction side and exposed in the Z' direction, and the fourth connecting portion 210*d* of the fourth terminal 200*d* is housed in the fourth housing recess 121*d* of the rear portion 120 of the body 100 from the Y'-direction side and exposed in the Z' direction.

Where the rear portion 120 of the body 100 is provided with the first to fourth housing holes, the first connecting portion 210*a* of the first terminal 200*a* is housed in the first housing hole of the rear portion 120 of the body 100 from the Y'-direction side and exposed in the Y' direction, the second connecting portion 210*b* of the second terminal 200*b* is housed in the second housing hole of the rear portion 120 of the body 100 from the Y'-direction side and exposed in the Y' direction, the third connecting portion 210*c* of the third terminal 200*c* is housed in the third housing hole of the rear portion 120 of the body 100 from the Y'-direction side and exposed in the Y' direction, and the fourth connecting portion 210*d* of the fourth terminal 200*d* is housed in the fourth housing hole of the rear portion 120 of the body 100 from the Y'-direction side and exposed in the Y' direction.

In any of the above cases, the first connecting portion 210*a*, the second connecting portion 210*b*, the third connecting portion 210*c*, and the fourth connecting portion 210*d* are arranged in cross-sectional view of a cross section along the X-X' and Z-Z' directions of the connector CO1 (in cross-sectional view of a first cross section (see FIGS. 2C, 5A, 6A, and 7A)) such as to correspond to an arrangement of the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd of the cable CA.

Specifically, the first connecting portion 210*a*, the second connecting portion 210*b*, the third connecting portion 210*c*, and the fourth connecting portion 210*d* are arranged as follows. The first connecting portion 210*a* and the second connecting portion 210*b* are arranged and spaced along the X-X' direction. The third connecting portion 210*c* and the fourth connecting portion 210*d* are arranged and spaced along the X-X' direction. The first connecting portion 210*a* and the third connecting portion 210*c* are arranged and spaced along the Z-Z' direction. In other words, the third connecting portion 210*c* is arranged on the Z'-direction side relative to the first connecting portion 210*a*. The second connecting portion 210*b* and the fourth connecting portion 210*d* are arranged and spaced along the Z-Z' direction. In other words, the fourth connecting portion 210*d* is arranged on the Z'-direction side relative to the second connecting portion 210*b*.

The first connecting portion 210*a*, the second connecting portion 210*b*, the third connecting portion 210*c*, and the fourth connecting portion 210*d* are respectively in contact with, and electrically connected to, the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd. For example, where each of the first connecting portion 210*a*, the second connecting portion 210*b*, the third connecting portion 210*c*, and the fourth connecting portion 210*d* is the flat plate of configuration (I) above, or where each of the first connecting portion 210*a*, the second connecting portion 210*b*, the third connecting portion 210*c*, and the fourth connecting portion 210*d* is a portion having a generally arc shape, a generally L shape, a generally V shape, or a generally U shape in cross-sectional view of a cross section along the X-X' and Z-Z' directions of configuration (II) above, the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd may be respectively placed on, and connected by soldering, adhering with conductive adhesive, laser welding, or the like means to, the first connecting portion 210*a*, the second connecting portion 210*b*, the third connecting portion 210*c*, and the fourth connecting portion 210*d*. Where each of the first connecting portion 210*a*, the second connecting portion 210*b*, the third connecting portion 210*c*, and the fourth connecting portion 210*d* is a portion having a generally U shape or a generally O shape in cross-sectional view of a cross section along the X-X' and Z-Z' directions of configuration (II) above, the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd may be respectively crimped or pressure-welded to, and electrically connected to, the first connecting portion 210*a*, the second connecting portion 210*b*, the third connecting portion 210*c*, and the fourth connecting portion

210*d*. Note that each of the first connecting portion 210*a*, the second connecting portion 210*b*, the third connecting portion 210*c*, and the fourth connecting portion 210*d* may be provided with a plurality of contacting pieces or projections (not illustrated). The contacting pieces or projections of the first connecting portion 210*a*, the second connecting portion 210*b*, the third connecting portion 210*c*, and the fourth connecting portion 210*d* may be pressure-welded to the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd.

Further, a layout of the first connecting portion 210*a*, the second connecting portion 210*b*, the third connecting portion 210*c*, and the fourth connecting portion 210*d* in cross-sectional view of the first cross section (see FIGS. 2C, 5A, 6A, and 7A) corresponds to a layout of the first covered portion Wa1 of the first portion Wa3 of the first electric wire Wa inside the first portion Da1 of the first inner insulator Da, the second covered portion Wb1 of the first portion Wb3 of the second electric wire Wb inside the first portion Db1 of the second inner insulator Db, the third covered portion Wc1 of the first portion Wc3 of the third electric wire Wc inside the first portion Del of the third inner insulator Dc, and the fourth covered portion Wd1 of the first portion Wd3 of the fourth electric wire Wd inside the first portion Dd1 of the fourth inner insulator Dd in cross-sectional view of the second cross section (see FIG. 2E) of the cable CA. The meaning of correspondence of layouts herein includes the following layouts (IV) and (V).

(IV) The relative positions of the substantially central point of the first connecting portion 210*a*, the substantially central point of the second connecting portion 210*b*, the substantially central point of the third connecting portion 210*c*, and the substantially central point of the fourth connecting portion 210*d* in cross-sectional view of the first cross-section (see FIGS. 2C, 5A, 6A, and 7A) are not substantially coincident with (are displaced relative to) the respective relative positions of the substantially central point of the first covered portion Wa1 of the first portion Wa3 of the first electric wire Wa, the substantially central point of the second covered portion Wb1 of the first portion Wb3 of the second electric wire Wb, the substantially central point of the third covered portion Wc1 of the first portion Wc3 of the third electric wire Wc, and the substantially central point of the fourth covered portion Wd1 of the first portion Wd3 of the fourth electric wire Wd in cross-sectional view of the second cross section (see FIG. 2E) (for example, in cases where the first connecting portion 210*a*, the second connecting portion 210*b*, the third connecting portion 210*c*, and the fourth connecting portion 210*d* meet at least one of the following arrangements (IV-1) to (IV-4)). However, the layout of the first connecting portion 210*a*, the second connecting portion 210*b*, the third connecting portion 210*c*, and the fourth connecting portion 210*d* in cross-sectional view of the first cross-section (see FIGS. 2C, 5A, 6A, and 7A) corresponds to the layout of the first covered portion Wa1 of the first portion Wa3 of the first electric wire Wa, the second covered portion Wb1 of the first portion Wb3 of the second electric wire Wb, the third covered portion Wc1 of the first portion Wc3 of the third electric wire Wc, and the fourth covered portion Wd1 of the first portion Wd3 of the fourth electric wire Wd in cross-sectional view of the second cross section (see FIG. 2E).

(IV-1) The distance in the X-X' direction between the first connecting portion 210*a* and the second connecting portion 210*b* is different from the distance in the X-X' direction between the first covered portion Wa1 of the first portion Wa3 of the first electric wire Wa and the second covered portion Wb1 of the first portion Wb3 of the second electric wire Wb. (IV-2) The distance in the X-X' direction between the third connecting portion 210*c* and the fourth connecting portion 210*d* is different from the distance in the X-X' direction between the third covered portion Wc1 of the first portion Wc3 of the third electric wire Wc and the fourth covered portion Wd1 of the first portion Wd3 of the fourth electric wire Wd. (IV-3) The distance in the Z-Z' direction between the first connecting portion 210*a* and the third connecting portion 210*c* is different from the distance in the Z-Z' direction between the first covered portion Wa1 of the first portion Wa3 of the first electric wire Wa and the third covered portion Wc1 of the first portion Wc3 of the third electric wire Wc. (IV-4) The distance in the Z-Z' direction between the second connecting portion 210*b* and the fourth connecting portion 210*d* is different from the distance in the X-X' direction between the second covered portion Wb1 of the first portion Wb3 of the second electric wire Wb and the fourth covered portion Wd1 of the first portion Wd3 of the fourth electric wire Wd.

Figure 2E:
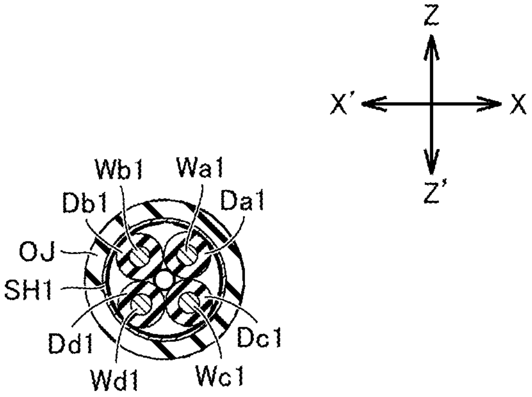
FIG. 2E is an enlarged cross-sectional view of the connector assembly of the first embodiment, taken along line 2E-2E in FIG. 2A.
Figure 2F:
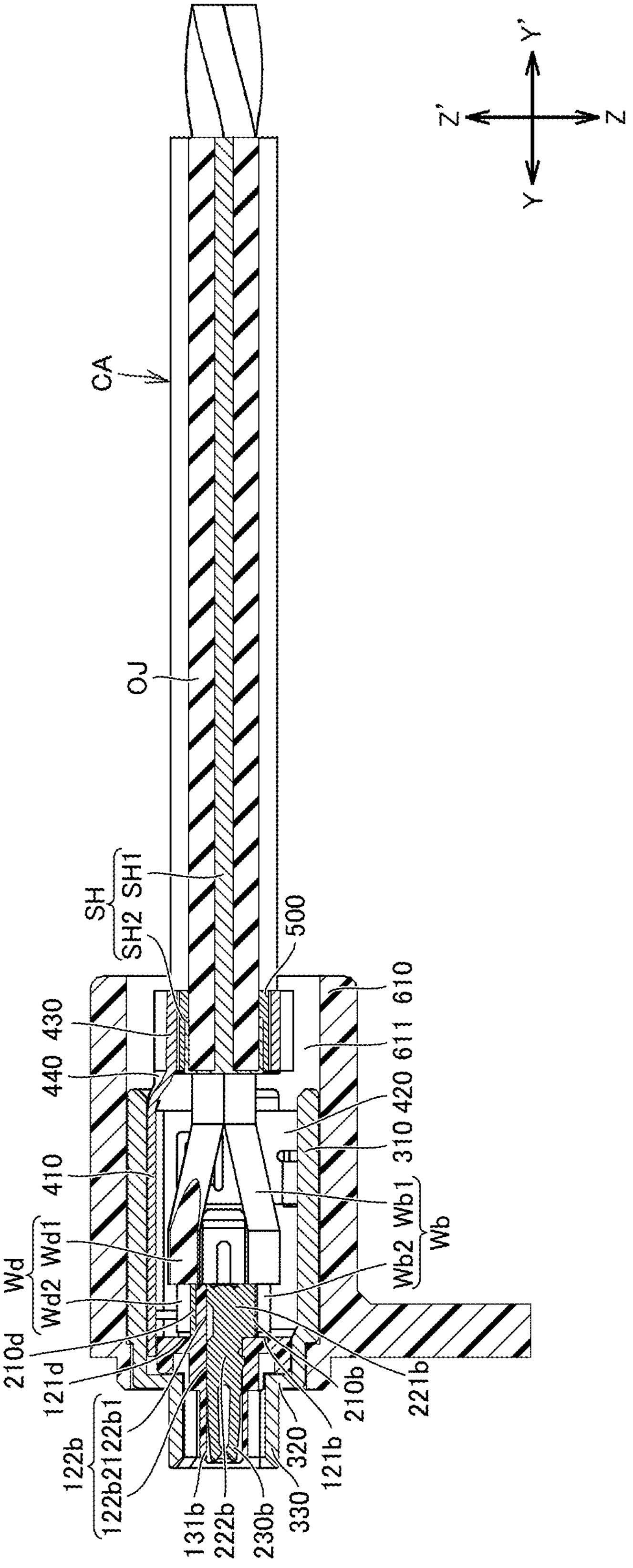
FIG. 2F is an enlarged cross-sectional view of the connector assembly of the first embodiment, taken along line 2F-2F in FIG. 2C.
Figure 2G:
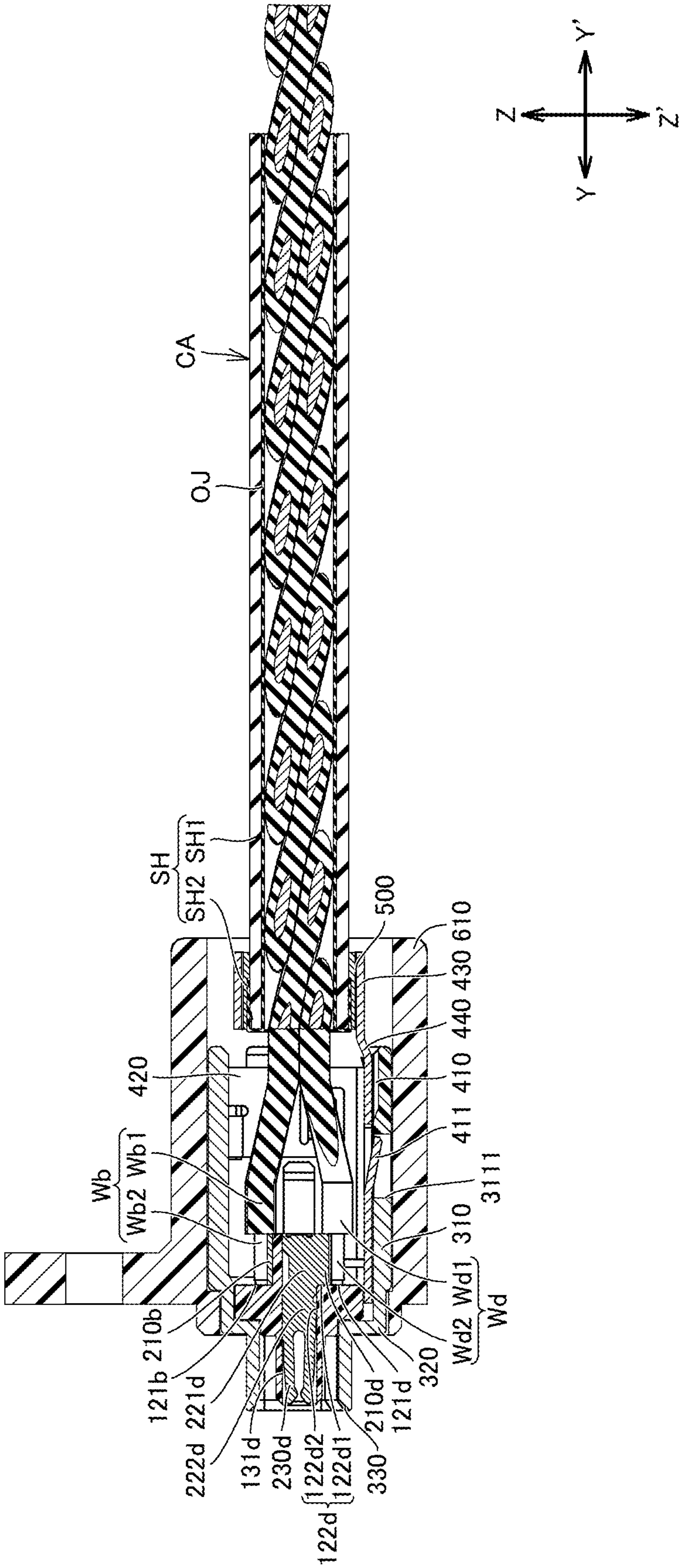
FIG. 2G is an enlarged cross-sectional view of the connector assembly of the first embodiment, taken along line 2G-2G in FIG. 2C.
Figure 3A:
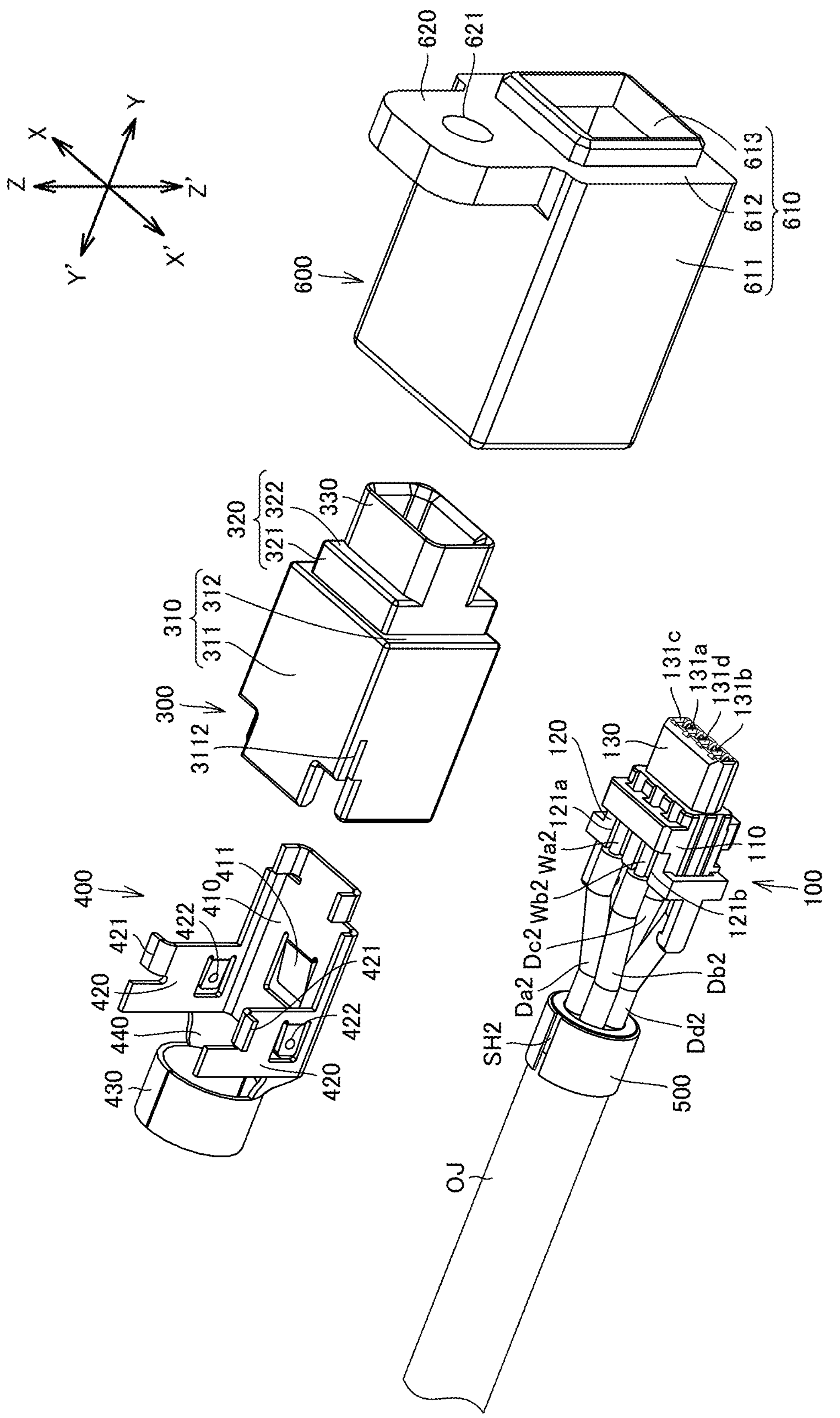
FIG. 3A is an exploded, top, front, left side perspective view of the connector assembly according to the first embodiment.
Figure 3B:
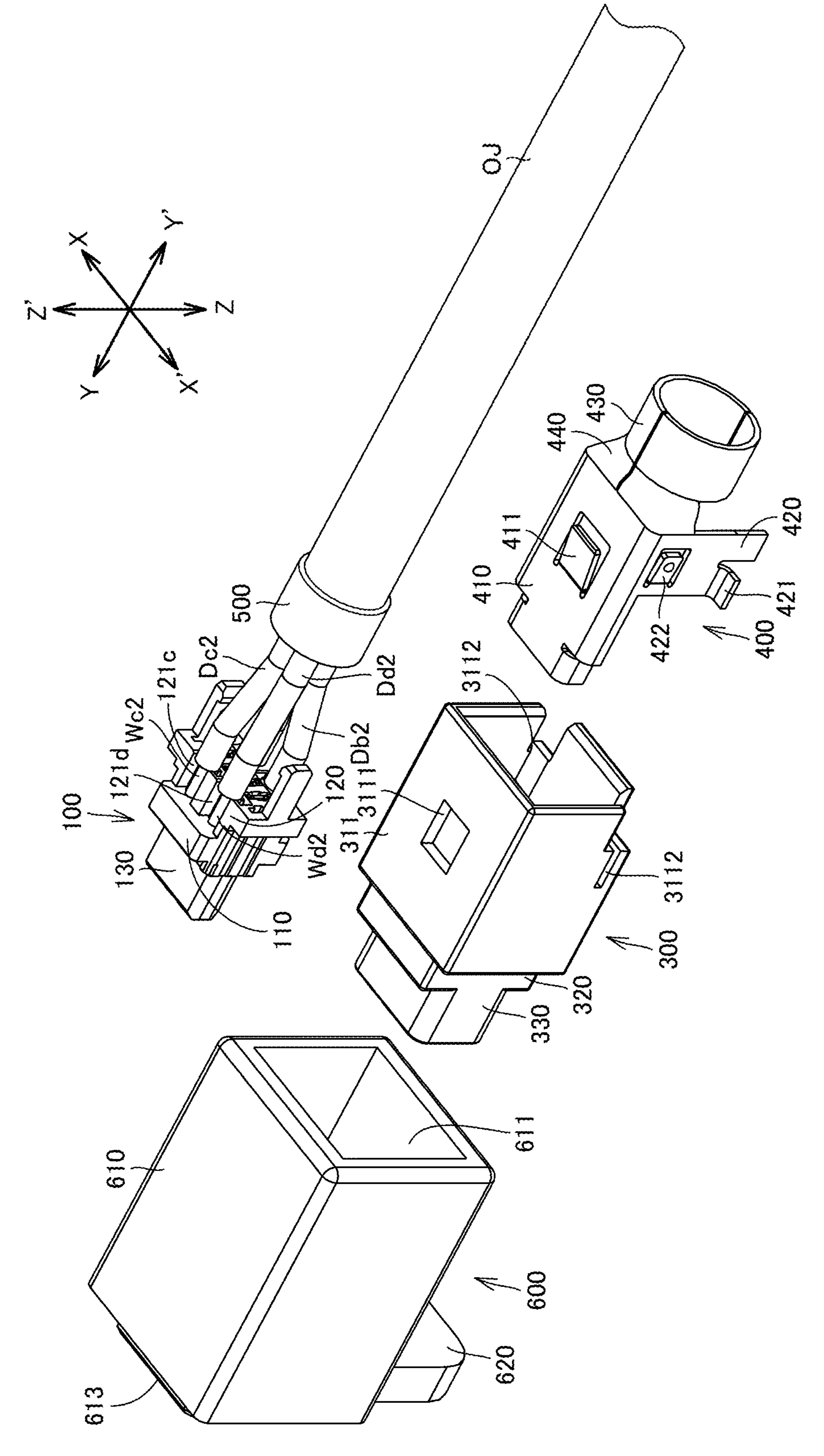
FIG. 3B is an exploded, bottom, rear, left side perspective view of the connector assembly according to the first embodiment.
Figure 4A:
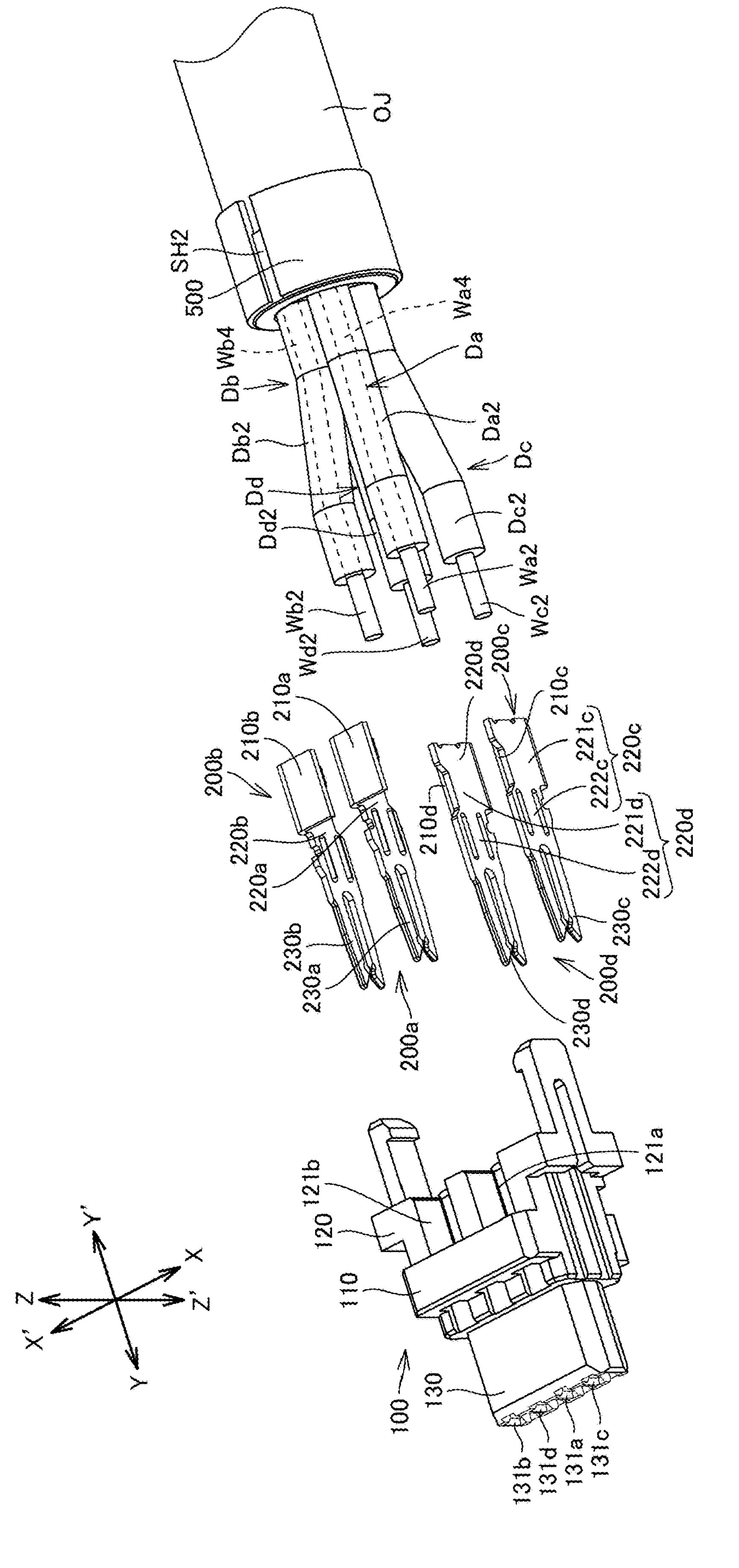
FIG. 4A is an exploded, top, front, right side perspective view of the body and the first to fourth terminals of the connector, as well as a cable, of the connector assembly of the first embodiment.
Figure 4B:
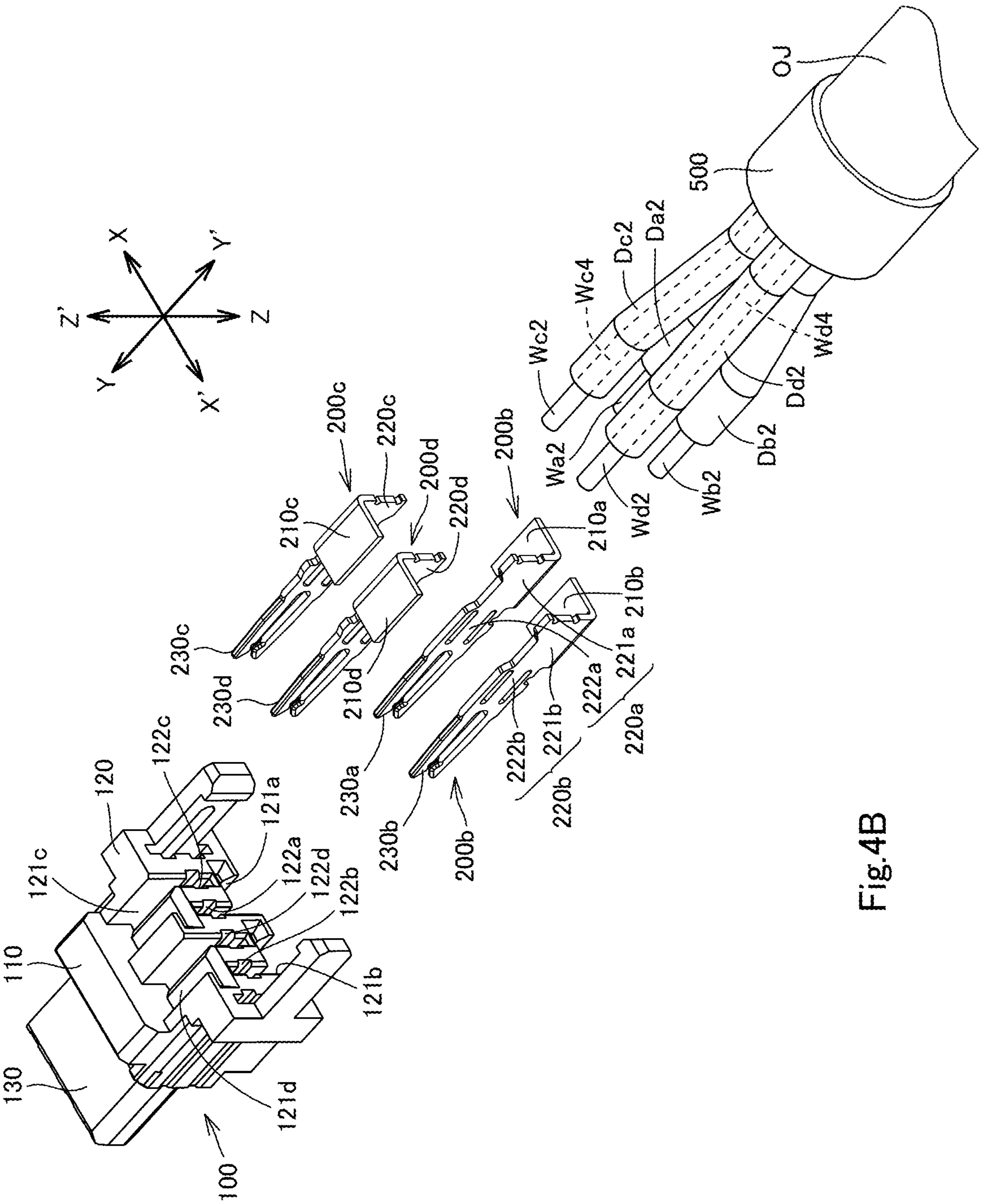
FIG. 4B is an exploded, bottom, rear, left side perspective view of the body and the first to fourth terminals of the connector, as well as the cable, of the connector assembly of the first embodiment.

(V) The relative positions of the substantially central point of the first connecting portion 210*a*, the substantially central point of the second connecting portion 210*b*, the substantially central point of the third connecting portion 210*c*, and the substantially central point of the fourth connecting portion 210*d* in cross-sectional view of the first cross section (see FIGS. 2C, 5A, 6A, and 7A) are substantially coincident with the respective relative positions of the substantially central point of the first covered portion Wa1 of the first portion Wa3 of the first electric wire Wa, the substantially central point of the second covered portion Wb1 of the first portion Wb3 of the second electric wire Wb, the substantially central point of the third covered portion Wc1 of the first portion Wc3 of the third electric wire Wc, and the substantially central point of the fourth covered portion Wd1 of the first portion Wd3 of the fourth electric wire Wd in cross-sectional view of the second cross section (see FIG. 2E).

Where the distal portion 130 of the body 100 is provided with the first connecting hole 131*a*, the second connecting hole 131*b*, the third connecting hole 131*c*, and the fourth connecting hole 131*d*, the first distal portion 230*a* of the first terminal 200*a* is housed in the first connecting hole 131*a* of the distal portion 130 of the body 100 from the Y'-direction side and exposed in the Y direction, the second distal portion 230*b* of the second terminal 200*b* is housed in the second connecting hole 131*b* of the distal portion 130 of the body 100 from the Y'-direction side and exposed in the Y direction, the third distal portion 230*c* of the third terminal 200*c* is housed in the third connecting hole 131*c* of the distal portion 130 of the body 100 from the Y'-direction side and exposed in the Y direction, and the fourth distal portion 230*d* of the fourth terminal 200*d* is housed in the fourth connecting hole 131*d* of the distal portion 130 of the body 100 from the Y'-direction side and exposed in the Y direction.

Where the distal portion 130 of the body 100 is provided with the first connecting groove, the second connecting groove, the third connecting groove, and the fourth connecting groove, the first distal portion 230*a* of the first terminal 200*a* is housed in the first connecting groove of the distal portion 130 of the body 100 from the Y'-direction side and exposed in the Y and Z directions or in the Y and Z' directions, the second distal portion 230*b* of the second terminal 200*b* is housed in the second connecting groove of the distal portion 130 of the body 100 from the Y'-direction side and exposed in the Y and Z directions or in the Y and Z' directions, the third distal portion 230*c* of the third terminal 200*c* is housed in the third connecting groove of the distal portion 130 of the body 100 from the Y'-direction side and exposed in the Y and Z directions or in the Y and Z' directions, and the fourth distal portion 230*d* of the fourth terminal 200*d* is housed in the fourth connecting groove of the distal portion 130 of the body 100 from the Y'-direction side and exposed in the Y and Z directions or in the Y and Z' directions.

Where the distal portion 130 of the body 100 is not provided, the first distal portion 230*a* of the first terminal 200*a* projects in the Y direction from the body 100, the second distal portion 230*b* of the second terminal 200*b* projects in the Y direction from the body 100, the third distal portion 230*c* of the third terminal 200*c* projects in the Y direction from the body 100, and the fourth distal portion 230*d* of the fourth terminal 200*d* projects in the Y direction from the body 100.

In any of the above cases, the first distal portion 230*a*, the second distal portion 230*b*, the third distal portion 230*c*, and the fourth distal portion 230*d* are only required to be arranged and spaced along the X-X' direction. For example, the first distal portion 230*a*, the second distal portion 230*b*, the third distal portion 230*c*, and the fourth distal portion 230*d* are in one of the following arrangements.

Where the second main portion 220*b*, the fourth main portion 220*d*, the first main portion 220*a*, and the third main portion 220*c* are arranged in this order and at spaced intervals along the X-X' direction (in case (a4) above), (a5) the second distal portion 230*b*, the fourth distal portion 230*d*, the first distal portion 230*a*, and the third distal portion 230*c* are arranged in this order and at spaced intervals along the X-X' direction (see FIGS. 2A, 2B, 2C, and 2D).

Where the fourth main portion 220*d*, the second main portion 220*b*, the third main portion 220*c*, and the first main portion 220*a* are arranged in this order and at spaced intervals along the X-X' direction (in case (b4) above), (b5) the fourth distal portion 230*d*, the second distal portion 230*b*, the third distal portion 230*c*, and the first distal portion 230*a* are arranged in this order and at spaced intervals along the X-X' direction (see FIG. 5B).

Where the fourth main portion 220*d*, the second main portion 220*b*, the first main portion 220*a*, and the third main portion 220*c* are arranged in this order and at spaced intervals along the X-X' direction (in case (c4) above), (c5) the fourth distal portion 230*d*, the second distal portion 230*b*, the first distal portion 230*a*, and the third distal portion 230*c* are arranged in this order and at spaced intervals along the X-X' direction (see FIG. 6B).

Where the second main portion 220*b*, the fourth main portion 220*d*, the third main portion 220*c*, and the first main portion 220*a* are arranged in this order and at spaced intervals along the X-X' direction (in case (d4) above), (d5) the second distal portion 230*b*, the fourth distal portion 230*d*, the third distal portion 230*c*, and the first distal portion 230*a* are arranged in this order and at spaced intervals along the X-X' direction (see FIG. 7B).

In any arrangement, the first distal portion 230*a*, the second distal portion 230*b*, the third distal portion 230*c*, and the fourth distal portion 230*d* may be at respective height positions in the Z-Z' direction (VI) to (VIII) as follows.

(VI) The first distal portion 230*a*, the second distal portion 230*b*, the third distal portion 230*c*, and the fourth distal portion 230*d* may be at the substantially same height position in the Z-Z' direction (see FIGS. 2A, 2B, and 2D). In this case, the first connecting hole 131*a*, the second connecting hole 131*b*, the third connecting hole 131*c*, and the fourth connecting hole 131*d* of the distal portion 130 of the body 100 may be at the substantially same height position in the Z-Z' direction (see FIGS. 2A, 2B, and 2D), or alternatively the first connecting groove, the second connecting groove, the third connecting groove, and the fourth connecting groove of the distal portion 130 of the body 100 may be at the substantially same height position in the Z-Z' direction.

(VII) At least one distal portion of the first distal portion 230*a*, the second distal portion 230*b*, the third distal portion 230*c*, and the fourth distal portion 230*d* may be at a different position (different height position) in the Z-Z' direction from the position or positions in the Z-Z' direction of the remaining distal portion or portions. In this case, at least one connecting hole of the first connecting hole 131*a*, the second connecting hole 131*b*, the third connecting hole 131*c*, and the fourth connecting hole 131*d* of the distal portion 130 of the body 100 may be at a different position (different height position) in the Z-Z' direction from the position or positions in the Z-Z' direction of the remaining connecting hole or holes, or alternatively at least one connecting groove of the first connecting groove, the second connecting groove, the third connecting groove, and the fourth connecting groove of the distal portion 130 of the body 100 may be at a different position (different height position) in the Z-Z' direction from the position or positions in the Z-Z' direction of the remaining connecting groove or grooves.

(VIII) The first distal portion 230*a*, the second distal portion 230*b*, the third distal portion 230*c*, and the fourth distal portion 230*d* may be at mutually different positions (height positions) in the Z-Z' direction. In this case, the first connecting hole 131*a*, the second connecting hole 131*b*, the third connecting hole 131*c*, and the fourth connecting hole 131*d* of the distal portion 130 of the body 100 may be at mutually different positions (different height positions) in the Z-Z' direction, or alternatively the first connecting groove, the second connecting groove, the third connecting groove, and the fourth connecting groove of the distal portion 130 of the body 100 at mutually different positions (different height positions) in the Z-Z' direction.

The central axes of the first distal portion 230*a*, the second distal portion 230*b*, the third distal portion 230*c*, and the fourth distal portion 230*d* extend in the Y-Y' direction through the respective centers of the first distal portion 230*a*, the second distal portion 230*b*, the third distal portion 230*c*, and the fourth distal portion 230*d*. The central axes of the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd respectively connected to the first connecting portion 210*a*, the second connecting portion 210*b*, the third connecting portion 210*c*, and the fourth connecting portion 210*d* and extend in the Y-Y' direction through the respective centers of the first projecting portion Wa2, the second projecting portion Wb2, the third projecting portion Wc2, and the fourth projecting portion Wd2. Where the first main portion 220*a* extends from the second end portion (see FIGS. 2C and 6A) or the first end portion (see FIGS. 5A and 7A) of the first connecting portion 210*a* in the direction including the component of the Z' direction, the central axis of the first distal portion 230*a* is displaced in the X-X' direction and also in the Z-Z' direction relative to the central axis of the first projecting portion Wa2 of the first electric wire Wa. Where the second main portion 220*b* extends from the second end portion (see FIGS. 2C and 6A) or the first end portion (see FIGS. 5A and 7A) of the second connecting portion 210*b* in the direction including the component of the Z' direction, the central axis of the second distal portion 230*b* is displaced in the X-X' direction and also in the Z-Z' direction relative to the central axis of the second projecting portion Wb2 of the second electric wire Wb. Where the third main portion 220*c* extends from the first end portion (see FIGS. 2C and 6A) or the second end portion (see FIGS. 5A and 7A) of the third connecting portion 210*c* in the direction including the component of the Z direction, the central axis of the third distal portion 230*c* is displaced in the X-X' direction and also in the Z-Z' direction relative to the central axis of the third projecting portion Wc2 of the third electric wire Wc. Where the fourth main portion 220*d* extends from the first end portion (see FIGS. 2C and 6A) or the second end portion (see FIGS. 5A and 7A) of the fourth connecting portion 210*d* in the direction including the component of the Z direction, the central axis of the fourth distal portion 230*d* is displaced in the X-X' direction and also in the Z-Z' direction relative to the central axis of the fourth projecting portion Wd2 of the fourth electric wire Wd.

The first terminal 200*a*, the second terminal 200*b*, the third terminal 200*c*, and the fourth terminal 200*d* may have an identical shape and size selected from the configurations described above (see FIGS. 2A to 5B). That is, commonality is achieved between the first terminal 200*a*, the second terminal 200*b*, the third terminal 200*c*, and the fourth terminal 200*d* as terminals of a single type.

For example, where the first terminal 200*a*, the second terminal 200*b*, the third terminal 200*c*, and the fourth terminal 200*d* are in arrangements (a4) and (a5) described above, four terminals of a single type may be prepared, among which a first terminal may be used as the third terminal 200*c* held by the body 100 as described above such that the third main portion 220*c* extends in the direction including the component of the Z direction, a second terminal may be rotated by 180 degrees in the circumferential direction relative to the third terminal 200*c* and used as the first terminal 200*a* held by the body 100 as described above such that the first main portion 220*a* extends in the direction including the component of the Z' direction, a third terminal may be rotated by 180 degrees in the circumferential direction relative to the first terminal 200*a* and used as the fourth terminal 200*d* held by the body 100 as described above such that the fourth main portion 220*d* extends in the direction including the component of the Z direction, and a fourth terminal may be rotated by 180 degrees in the circumferential direction relative to the fourth terminal 200*d* and used as the second terminal 200*b* held by the body 100 as described above such that the second main portion 220*b* extends in the direction including the component of the Z' direction. The circumferential direction is the circumferential direction of the outer insulator OJ of the cable CA and/or the circumferential direction of an imaginary circle a represented by a dot-dash line on the first cross section of the connector CO1 in FIG. 2C. The center of the imaginary circle a may or may not be coincident with the center of the connector CO1 in the first cross section.

Where the first terminal 200*a*, the second terminal 200*b*, the third terminal 200*c*, and the fourth terminal 200*d* are in arrangements (b4) and (b5) described above, four terminals of a single type may be prepared, among which a first terminal may be used as the first terminal 200*a* held by the body 100 as described above such that the first main portion 220*a* extends in the direction including the component of the Z' direction, a second terminal may be rotated by 180 degrees in the circumferential direction relative to the first terminal 200*a* and used as the third terminal 200*c* held by the body 100 as described above such that the third main portion 220*c* extends in the direction including the component of the Z direction, a third terminal may be rotated by 180 degrees in the circumferential direction relative to the third terminal 200*c* and used as the second terminal 200*b* held by the body 100 as described above such that the second main portion 220*b* extends in the direction including the component of the Z' direction, and a fourth terminal may be rotated by 180 degrees in the circumferential direction relative to the second terminal 200*b* and is used as the fourth terminal 200*d* held by the body 100 as described above such that the fourth main portion 220*d* extends in the direction including the component of the Z direction. In either case, four terminals having the identical shape and configuration may be alternately rotated by 180 degrees in the circumferential direction and held by the body 100 so as to be used as the first terminal 200*a*, the second terminal 200*b*, the third terminal 200*c*, and the fourth terminal 200*d*.

The first terminal 200*a* and the second terminal 200*b* may have an identical shape and size selected from the configurations described above, and the third terminal 200*c* and the fourth terminal 200*d* may have another identical shape and size selected from the configurations described above (not illustrated). In this case, commonality is achieved between the first terminal 200*a* and the second terminal 200*b* as a first type of terminals, and commonality is achieved between the third terminal 200*c* and the fourth terminal 200*d* as a second type of terminals, but the first type of terminals and the second type of terminals have different shapes and/or different sizes. Alternatively, the first terminal 200*a* and the third terminal 200*c* may have an identical shape and size selected from the configurations described above, and the second terminal 200*b* and the fourth terminal 200*d* may have another identical shape and size selected from the configurations described above (see FIGS. 6A to 7B). In this case, commonality is achieved between the first terminal 200*a* and the third terminal 200*c* as a first type of terminals, and commonality is achieved between the second terminal 200*b* and the fourth terminal 200*d* as a second type of terminals, but the first type of terminals and the second type of terminals have different shapes and/or different sizes. The first terminal 200*a*, the second terminal 200*b*, the third terminal 200*c*, and the fourth terminal 200*d* may have different shapes and/or different sizes selected from the configurations described above.

The connector CO1 may further include a shell 300 having electrical conductivity. The shell 300 may be constituted by a metal or other conductor, or may be constituted by a molded resin and a metal plated or vapor-deposited on an outer face and/or an inner face thereof. The shell 300 includes a shell body 310, a holding portion 320, and a connecting portion 330.

The shell body 310 includes a tubular portion 311, which has a cross section along the X-X' and Z-Z' directions of generally polygonal ring shape or generally circular ring shape, and a front frame 312, which has a generally polygonal ring shape or generally circular ring shape and extends inward from an end in the Y direction of the tubular portion 311. The cross section of the tubular portion 311 of the shell body 310 is larger in size than the cross section along the X-X' and Z-Z' directions of the rear portion 120 of the body 100. The shell body 310 houses the rear portion 120 of the body 100, the first connecting portion 210*a* of the first terminal 200*a*, the second connecting portion 210*b* of the second terminal 200*b*, the third connecting portion 210*c* of the third terminal 200*c*, the fourth connecting portion 210*d* of the fourth terminal 200*d*, the first projecting portion Wa2 of the first electric wire Wa, the second projecting portion Wb2 of the second electric wire Wb, the third projecting portion Wc2 of the third electric wire Wc, the fourth projecting portion Wd2 of the fourth electric wire Wd of the cable CA, etc.

The tubular portion 311 of the shell body 310 includes a bottom portion on the Z'-direction side, a ceiling portion on the Z-direction side, a first side portion on the X-direction side, and a second side portion on the X'-direction side. Where the cross section of the tubular portion 311 of the shell body 310 is of generally polygonal ring shape, the bottom portion of the tubular portion 311 of the shell body 310 is a flat plate on the Z'-direction side, the ceiling portion of the tube of the shell body 310 is a flat plate on the Z-direction side, the first side portion of the tubular portion 311 of the shell body 310 is a flat plate on the X-direction side, and the second side portion of the tubular portion 311 of the shell body 310 is a flat plate on the X'-direction side. Where the cross section of the tubular portion 311 of the shell body 310 is of generally circular ring shape, the bottom portion of the tubular portion 311 of the shell body 310 is a curved plate projecting to the Z'-direction side, the ceiling portion of the tubular portion 311 of the shell body 310 is a curved plate projecting to the Z-direction side, the first side portion of the tubular portion 311 of the shell body 310 is a curved plate projecting to the X-direction side, and the second side portion of the tubular portion 311 of the shell body 310 is a curved plate projecting to the X'-direction side.

The holding portion 320 includes a tubular portion 321, which has a cross section along the X-X' and Z-Z' directions of generally polygonal ring shape or generally circular ring shape and extends in the Y direction from an inner edge of the front frame 312 of the shell body 310, and a front frame 322, which has a generally polygonal ring shape or generally circular ring shape and extends inward from an end in the Y direction of the tubular portion 321. The inner shape and size of the cross section of the tubular portion 321 of the holding portion 320 correspond to the outer shape and size of the cross section along the X-X' and Z-Z' directions of the middle portion 110 of the body 100. The holding portion 320 fittingly and securely houses the middle portion 110 of the body 100.

The connecting portion 330 is a tubular portion having a cross section along the X-X' and Z-Z' directions of generally polygonal ring shape or generally circular ring shape and extending in the Y direction from an inner edge of the front frame 322 of the holding portion 320. Where the distal portion 130 of the body 100 is provided, the cross section of the connecting portion 330 is larger in size than the cross section along the X-X' and Z-Z' directions of the distal portion 130 of the body 100. An inner shape of the cross section of the connecting portion 330 may correspond to, or may be different from, an outer shape of the cross section along the X-X' and Z-Z' directions of the distal portion 130 of the body 100. The connecting portion 330 houses the distal portion 130 of the body 100. Where the distal portion 130 of the body 100 is not provided, the connecting portion 330 houses the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* projecting from the body 100. The shell 300 can be omitted.

The connector CO1 may further include a shield plate 400 having electrical conductivity. The shield plate 400 may be constituted by a metal or other conductor, or may be constituted by a molded resin and a metal plated or vapor-deposited on an outer face and/or an inner face thereof.

The shield plate 400 includes a main plate 410, a first side plate 420, a second side plate 420, a first ring 430, and a coupling portion 440.

The main plate 410 is a flat or curved plate having a shape corresponding to the shape of the bottom portion of the tubular portion 311 of the shell body 310. The main plate 410 is received in the tubular portion 311 of the shell body 310 and placed on the bottom portion of the tubular portion 311. One of the main plate 410 and the bottom portion of the tubular portion 311 of the shell body 310 may be provided with an engaging projection 411, and the other may be provided with an engaging hole 3111. The engaging projection 411 hooked in the engaging hole 3111, so that the main plate 410 is attached to the shell body 310. The engaging projection 411 and the engaging hole 3111 can be omitted.

The first side plate 420 is a flat or curved plate having a shape corresponding to the shape of the first side portion of the tubular portion 311 of the shell body 310, and extends in the Z direction from an end on the X-direction side of the main plate 410. The second side plate 420 is a flat or curved plate having a shape corresponding to the shape of the second side portion of the tubular portion 311 of the shell body 310, and extends in the Z direction from an end on the X'-direction side of the main plate 410. With the main plate 410 received in the tubular portion 311 of the shell body 310, the first side plate 420 and the second side plate 420 abut on the first side portion and the second side portion, respectively, of the tubular portion 311.

One of the first side plate 420 and the first side portion may be provided with an engagement piece 421, and the other may be provided with a slit 3112 opening in the Y' direction. One of the second side plate 420 and the second side portion may be provided with another engagement piece 421, and the other may be provided with another slit 3112 opening in the Y' direction. Since the engagement pieces 421 are received in the respective slits 3112 from the Y'-direction side, the first side plate 420 is attached to the first side portion, and the second side plate 420 is attached to the second side portion. The engagement pieces 421 and the slits 3112 can be omitted.

One of the first side plate 420 and the first side portion may be provided with a contacting piece 422 to elastically contact the other. One of the second side plate 420 and the second side portion may be provided with another contacting piece 422 to elastically contact the other. The contacting pieces 422 can be omitted.

The first side plate 420 and/or the second side plate 420 can be omitted.

The coupling portion 440 is disposed, and couples, between the main plate 410 and the first ring 430.

The first ring 430 fits directly or indirectly over, and is in direct or indirect contact with, the entire circumference or a part of the second portion SH2 of the outer conductor SH of the cable CA. The shield plate 400 and the shell 300 are thus electrically connected to the second portion SH2 of the outer conductor SH of the cable CA.

The main plate 410 of the shield plate 400 may be integrated with the shell body 310 of the shell 300. In this case, the first side plate 420 and the second side plate 420 are omitted. Also, the shield plate 400 may be omitted.

The connector CO1 may further include a second ring 500 having electrical conductivity. The second ring 500 may be constituted by a metal or other conductor, or may be constituted by a pipe-like member and a metal plated or vapor-deposited on an outer face and/or an inner face thereof, or may be constituted by a combination of the former two constitutions. The second ring 500 fits over, and is in contact with, the entire circumference or a part of the second portion SH2 of the outer conductor SH of the cable CA. The first ring 430 of the shield plate 400 fits over, and is in contact with, the entire circumference or a part of the second ring 500; i.e., the first ring 430 externally fits indirectly over, and is in indirect contact with, the second portion SH2 of the outer conductor SH of the cable CA via the second ring 500. The first ring 430 may be formed into a ring shape and simultaneously fitting over the second ring 500 by round swaging. Alternatively, the first ring 430 may be formed in a ring shape and then fitted over the second ring 500. Also, the first ring 430 may be fitted over the second portion SH2 of the outer conductor SH and then directly or indirectly connected to the second portion SH2 by soldering or laser welding. When used herein, the term "ring shape" includes a tubular shape having a generally circular section, a tubular shape having a generally polygonal section, or a generally C-shape in cross-section along the X-X' and Z-Z' directions.

The second ring 500 can be omitted. Where the second ring 500 is omitted and the shield plate 400 is provided separately from the shell 300, or where the second ring 500 is omitted and the main plate 410 of the shield plate 400 is provided integrally with the shell body 310 of the shell 300, the first ring 430 fits directly over the second portion SH2 of the outer conductor SH of the cable CA.

The connector CO1 may further include a holder 600. The holder 600 is constituted by a material having an insulating property or a material having electrical conductivity. For example, the holder 600 may be constituted by a molded resin or a cast metal, or may be constituted by an insulating resin or conductive material formed by a 3D printer. The holder 600 includes a holder body 610 and a fixing portion 620. The holder body 610 includes a tubular portion 611, which has a cross section along the X-X' and Z-Z' directions of generally polygonal ring shape or generally circular ring shape, and a front frame 612, which has a generally polygonal ring shape or generally circular ring shape and extends inward from an end in the Y direction of the tubular portion 611, and a projection 613, which has a cross section along the X-X' and Z-Z' directions of generally polygonal ring shape or generally circular ring shape and extends from an inner edge of the front frame 612 in the Y direction. The inner shape and size of the cross section of the tubular portion 611 correspond to the outer shape and size of the cross section along the X-X' and Z-Z' directions of the tubular portion 311 of the shell body 310 of the shell 300. The tubular portion 611 fittingly and securely houses the tubular portion 311 of the shell body 310. The inner shape and size of the cross section of the front frame 612 and the inner shape and size of the cross section of the projection 613 correspond to the outer shape and size of the connecting portion 330 of the cross section along the X-X' and Z-Z' directions of the shell 300. The front frame 612 and the projection 613 fittingly and securely houses the connecting portion 330. The sum of the dimension in the Y-Y' direction of the front frame 612 and the dimension in the Y-Y' direction of the projection 613 is smaller than the dimension in the Y-Y' direction of the connecting portion 330. The connecting portion 330 projects in the Y direction from the front frame 612 and the projection 613.

The fixing portion 620 extends in the Z direction from the tubular portion 611 of the holder body 610. The fixing portion 620 is provided with a through hole 621 extending through the fixing portion 620 in the Y-Y' direction. The fixing portion 620 can be omitted. The projection 613 can be omitted. The holder 600 itself can also be omitted.

The assembly A1 having the above configuration may be assembled by the following method. First, the body 100, the first terminal 200*a*, the second terminal 200*b*, the third terminal 200*c*, and the fourth terminal 200*d* are prepared. The first terminal 200*a*, the second terminal 200*b*, the third terminal 200*c*, and the fourth terminal 200*d* are held by the body 100 as described above. Where the first terminal 200*a*, the second terminal 200*b*, the third terminal 200*c*, and the fourth terminal 200*d* have an identical shape and size, it is preferable that four terminals are prepared and held by the body 100 in a state where the four terminals are alternately rotated by 180 degrees in the circumferential direction as described above.

Thereafter, the cable CA is prepared. The cable CA is configured such that the second portion Da2 of the first inner insulator Da and the second portion Wa4 of the first electric wire Wa therein, the second portion Db2 of the second inner insulator Db and the second portion Wb4 of the second electric wire Wb therein, the second portion Dc2 of the third inner insulator Dc and the second portion Wc4 of the third electric wire Wc therein, and the second portion Dd2 of the fourth inner insulator Dd and the second portion Wd4 of the fourth electric wire Wd therein are led out in the Y direction from the outer conductor SH. The cable CA in this led-out state is fixed, and the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd of the cable CA are respectively connected to the first connecting portion 210*a* of the first terminal 200*a*, the second connecting portion 210*b* of the second terminal 200*b*, the third connecting portion 210*c* of the third terminal 200*c*, and the fourth connecting portion 210*d* of the fourth terminal 200*d* held by the body 100 as described above. This process will be hereinafter referred to as a connection step of the cable CA.

Where the second ring 500 is provided, before and after the connection step of the cable CA, the second ring 500 is fitted over, and brought into contact with, the second portion SH2 of the outer conductor SH of the cable CA.

Where the shell 300 is provided, after the connection step of the cable CA, the body 100 is housed into the shell 300. Where the shield plate 400 is provided, after the body 100 is housed into the shell 300, the main plate 410, the first side plate 420, and the second side plate 420 of the shield plate 400 are inserted into, and attached to, the shell body 310 of the shell 300 as described above. The first ring 430 of the shield plate 400 is fitted over, and brought into contact with, the second ring 500. Where the second ring 500 is not provided, the first ring 430 fitted over, and brought into contact with, the second portion SH2 of the outer conductor SH of the cable CA. Where the shield plate 400 is integrated with the shell body 310, the attachment step of the shield plate 400 is omitted. Where the shell 300 and the shield plate 400 are not provided, the steps described in this paragraph are omitted.

Where the holder 600 is provided, the shell 300 is housed into the holder body 610 of the holder 600. Where the holder 600 is not provided, this step is omitted. The assembly A1 is thus assembled.

The connector CO1 having any of the configurations described above provides the following technical features and effects. The first connecting portion 210*a* of the first terminal 200*a*, the second connecting portion 210*b* of the second terminal 200*b*, the third connecting portion 210*c* of the third terminal 200*c*, and the fourth connecting portion 210*d* of the fourth terminal 200*d* are arranged in two rows in cross-sectional view of the first cross section (see FIGS. 2C, 5A, 6A, and 7A) such as to correspond to the arrangement of the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd of the cable CA. On the other hand, the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* are arranged in a single row in the X-X' direction. These arrangements are achieved for the following reasons. The first main portion 220*a* of the first terminal 200*a* extends from the first connecting portion 210*a* of the first terminal 200*a* in the direction including the component of the Z' direction, the second main portion 220*b* of the second terminal 200*b* extends from the second connecting portion 210*b* of the second terminal 200*b* in the direction including the component of the Z' direction, the third main portion 220*c* of the third terminal 200*c* extends from the third connecting portion 210*c* of the third terminal 200*c* in the direction including the component of the Z direction, and the fourth main portion 220*d* of the fourth terminal 200*d* extends from the fourth connecting portion 210*d* in the direction including the component of the Z direction. The first main portion 220*a*, the second main portion 220*b*, the third main portion 220*c*, and the fourth main portion 220*d* are arranged and spaced along the X-X' direction. The first distal portion 230*a* of the first terminal 200*a* extends from the first main portion 220*a* in the direction including the component of the Y direction, the second distal portion 230*b* of the second terminal 200*b* extends from the second main portion 220*b* in the direction including the component of the Y direction, the third distal portion 230*c* of the third terminal 200*c* extends from the third main portion 220*c* in the direction including the component of the Y direction, and the fourth distal portion 230*d* of the fourth terminal 200*d* extends from the fourth main portion 220*d* in the direction including the component of the Y direction. Therefore, it is possible to arrange the first connecting portion 210*a* of the first terminal 200*a*, the second connecting portion 210*b* of the second terminal 200*b*, the third connecting portion 210*c* of the third terminal 200*c*, and the fourth connecting portion 210*d* of the fourth terminal 200*d* in two rows as described above, and also possible to arrange, and space apart, the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* in the X-X' direction.

The connector CO1 is also advantageous in terms of size over the second conventional connector. The second conventional connector is configured such that the connecting portions of the four terminals are arranged in a single row in the X-X' direction. Since the connecting portions of the four terminals are plates extending in the Y-Y' and X-X' directions, the second conventional connector has a larger dimension in the X-X' direction. However, the connector CO1 is configured such that the first connecting portion 210*a* of the first terminal 200*a*, the second connecting portion 210*b* of the second terminal 200*b*, the third connecting portion 210*c* of the third terminal 200*c*, and the fourth connecting portion 210*d* of the fourth terminal 200*d* are arranged in two rows as described above. Although the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* are arranged in a single row and spaced along the X-X' direction, it is possible to reduce the dimensions in the X-X' direction of the first distal portion 230*a*, the second distal portion 230*b*, the third distal portion 230*c*, and the fourth distal portion 230*d*, compared with the respective dimensions in the X-X' direction of the first connecting portion 210*a*, the second connecting portion 210*b*, the third connecting portion 210*c*, and the fourth connecting portion 210*d*. This is because the first main portion 220*a* can be a plate extending from the first connecting portion 210*a* in the direction including the component of the Z' direction, the second main portion 220*b* can be a plate extending from the second connecting portion 210*b* in the direction including the component of the Z' direction, the third main portion 220*c* can be a plate extending from the third connecting portion 210*c* in the direction including the component of the Z direction, the fourth main portion 220*d* can be a plate extending from the first main portion 220*a* in the direction including the component of the Z direction, the first distal portion 230*a* can be a plate extending from the first main portion 220*a* in the direction including the component of the Y direction, the second distal portion 230*b* can be a plate extending from the second main portion 220*b* in the direction including the component of the Y direction, the third distal portion 230*c* can be a plate extending from the third main portion 220*c* in the direction including the component of the Y direction, and the fourth distal portion 230*d* can be a plate extending from the fourth main portion 220*d* in the direction including the component of the Y direction. It is therefore possible to reduce the dimension in the X-X' direction of the connector CO1 compared with that the second conventional connector.

Where commonality is achieved between the first terminal 200*a*, the second terminal 200*b*, the third terminal 200*c*, and the fourth terminal 200*d* by a single type of terminals, where commonality is achieved between the first terminal 200*a* and the second terminal 200*b* as a first type of terminals and commonality is achieved between the third terminal 200*c* and the fourth terminal 200*d* as a second type of terminals, or where commonality is achieved between the first terminal 200*a* and the third terminal 200*c* as a first type of terminals and commonality is achieved between the second terminal 200*b* and the fourth terminal 200*d* as a second type of terminals, it is possible to reduce the cost of fabricating the terminals. It is therefore possible to reduce the cost of the connector CO1.

The assembly A1 including the above configuration includes the connector CO1. Accordingly, the assembly A1 provides the same technical features and effects as those of the connector CO1.

Where the connector CO1 of the assembly A1 has the configurations (a1) to (a5) described above (see FIGS. 1A to 4B), the assembly A1 may be configured for transmitting therethrough differential signals. In this case, the connector CO1 and the cable CA may have the following configurations.

The fourth terminal 200*d* of the connector CO1 and the fourth electric wire Wd of the cable CA connected thereto are configured for transmitting therethrough one signal of a positive signal or a negative signal of differential signals, and the first terminal 200*a* of the connector CO1 and the first electric wire Wa of the cable CA connected thereto are configured for transmitting therethrough the other signal. In other words, the combination of the fourth terminal 200*d* and the fourth electric wire Wd and the combination of the first terminal 200*a* and the first electric wire Wa form a differential pair. The second terminal 200*b* of the connector CO1 and the second electric wire Wb of the cable CA connected thereto are used for one of power supply or grounding, and the third terminal 200*c* of the connector CO1 and the third electric wire Wc of the cable CA connected thereto are used for the other use.

Inside the outer insulator OJ of the cable CA, the first portion Wd3 of the fourth electric wire Wd and the first portion Wa3 of the first electric wire Wa forming a differential pair are located on diagonally opposite sides of the central axis of the outer insulator OJ, and the first portion Wb3 of the second electric wire Wb and the first portion Wc3 of the third electric wire Wc are located on diagonally opposite sides of the central axis of the outer insulator OJ. This arrangement enables impedance control between the first portion Wd3 of the fourth electric wire Wd and the first portion Wa3 of the first electric wire Wa. Also, the distance relationship of the first portion Wd3 of the fourth electric wire Wd relative to the first portion Wb3 of the second electric wire Wb, the first portion Wc3 of the third electric wire Wc, and the first portion SH1 of the outer conductor SH is substantially electrically equivalent to the distance relationship of the first portion Wa3 of the first electric wire Wa relative to the first portion Wb3 of the second electric wire Wb, the first portion Wc3 of the third electric wire Wc, and the first portion SH1 of the outer conductor SH. As a result, the cable CA has improved electromagnetic compatibility (EMC) characteristics.

As for the fourth terminal 200*d* forming one of the differential pair, the second main portion 220*b* and the second distal portion 230*b* of the second terminal 200*b* are arranged on the X'-direction side relative to, and spaced from, the fourth main portion 220*d* and the fourth distal portion 230*d* of the fourth terminal 200*d*, and the first main portion 220*a* and the first distal portion 230*a* of the first terminal 200*a* are arranged on the X-direction side relative to, and spaced from, the fourth main portion 220*d* and the fourth distal portion 230*d* of the fourth terminal 200*d*. As for the first terminal 200*a* forming the other of the differential pair, the fourth main portion 220*d* and the fourth distal portion 230*d* of the fourth terminal 200*d* are arranged on the X'-direction side relative to, and spaced from, the first main portion 220*a* and the first distal portion 230*a* of the first terminal 200*a*, and the third main portion 220*c* and the third distal portion 230*c* of the third terminal 200*c* are arranged on the X'-direction side relative to, and spaced from, the first main portion 220*a* and the first distal portion 230*a* of the first terminal 200*a*. Accordingly, the second distal portion 230*b*, the fourth distal portion 230*d*, the first distal portion 230*a*, and the third distal portion 230*c* are arranged in this order and at spaced intervals along the X-X' direction. The second distal portion 230*b*, the fourth distal portion 230*d*, the first distal portion 230*a*, and the third distal portion 230*c* are located at a substantially equal height position in the Z-Z' direction.

As used herein, the term "first distance" refers to a distance in the X-X' direction from the fourth main portion 220*d* and the fourth distal portion 230*d* of the fourth terminal 200*d* to the second main portion 220*b* and the second distal portion 230*b* of the second terminal 200*b*; the term "second distance" refers to a distance in the X-X' direction from the fourth main portion 220*d* and the fourth distal portion 230*d* of the fourth terminal 200*d* to the first main portion 220*a* and the first distal portion 230*a* of the first terminal 200*a*; the term "third distance" refers to a distance in the X-X' direction from the first main portion 220*a* and the first distal portion 230*a* of the first terminal 200*a* to the fourth main portion 220*d* and the fourth distal portion 230*d* of the fourth terminal 200*d*; and the term "fourth distance" refers to a distance in the X-X' direction from the first main portion 220*a* and the first distal portion 230*a* of the first terminal 200*a* to the third main portion 220*c* and the third distal portion 230*c* of the third terminal 200*c*.

The first, second, third, and fourth distances are substantially equal distances. Also, the first, second, third, and fourth distances may be adjusted (changed) by changing the dimensions in the X-X' direction of the second main portion 220*b* and the second distal portion 230*b* of the second terminal 200*b*, the dimensions in the X-X' direction of the fourth main portion 220*d* and the fourth distal portion 230*d* of the fourth terminal 200*d*, the dimensions in the X-X' direction of the first main portion 220*a* and the first distal portion 230*a* of the first terminal 200*a*, and the dimensions in the X-X' direction of the third main portion 220*c* and the third distal portion 230*c* of the third terminal 200*c*, and/or by displacing the positions in the X-X' direction of the second main portion 220*b* and the second distal portion 230*b* of the second terminal 200*b*, the positions in the X-X' direction of the fourth main portion 220*d* and the fourth distal portion 230*d* of the fourth terminal 200*d*, the positions in the X-X' direction of the first main portion 220*a* and the first distal portion 230*a* of the first terminal 200*a*, and the positions in the X-X' direction of the third main portion 220*c* and the third distal portion 230*c* of the third terminal 200*c*. By thus adjusting (changing) the first, second, third, and fourth distances, impedance control is achieved between the fourth main portion 220*d* and the fourth distal portion 230*d* of the fourth terminal 200*d* and the first main portion 220*a* and the first distal portion 230*a* of the first terminal 200*a*. As a result, the fourth main portion 220*d* and the fourth distal portion 230*d* of the fourth terminal 200*d* are substantially electrically equivalent to the first main portion 220*a* and the first distal portion 230*a* of the first terminal 200*a*, so that electrical equilibrium is achieved. The connector CO1 therefore has improved electromagnetic compatibility (EMC) characteristics. Where the first terminal 200*a*, the second terminal 200*b*, the third terminal 200*c*, and the fourth terminal 200*d* have an identical shape and size, it is easy to maintain electrical equilibrium between the fourth main portion 220*d* and the fourth distal portion 230*d* of the fourth terminal 200*d* and the first main portion 220*a* and the first distal portion 230*a* of the first terminal 200*a*, so that the connector CO1 has further improved electromagnetic compatibility (EMC) characteristics. It is also possible to reduce the possibility that skews occur between the two.

Advantages of the assembly A1 will now be described, comparing the assembly A1 with an assembly of a comparative example.

The assembly of the comparative example includes the second conventional connector and the cable CA connected to the second conventional connector. The connecting portions of the four terminals of the second conventional connector are arranged in a single row in the X-X' direction. Accordingly, the second portion Da2 of the first inner insulator Da and the second portion Wa4 of the first electric wire Wa therein, the second portion Db2 of the second inner insulator Db and the second portion Wb4 of the second electric wire Wb therein, the second portion Dc2 of the third inner insulator Dc and the second portion Wc4 of the third electric wire Wc therein, and the second portion Dd2 of the fourth inner insulator Dd and the second portion Wd4 of the fourth electric wire Wd therein of the cable CA are arranged and spaced along the X-X' direction; and the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd of the cable CA are connected to the respective connecting portions of the four terminals of the second conventional connector. In such an arrangement, the second portion Da2 of the first inner insulator Da and the second portion Wa4 of the first electric wire Wa, the second portion Db2 of the second inner insulator Db and the second portion Wb4 of the second electric wire Wb, the second portion Dc2 of the third inner insulator Dc and the second portion Wc4 of the third electric wire Wc, and the second portion Dd2 of the fourth inner insulator Dd and the second portion Wd4 of the fourth electric wire Wd of the cable CA should have larger lengths. Also larger are the distances between the second portions of the four electric wires of the cable CA (namely, the distance in the X-X' direction between the second portion Wa4 of the first electric wire Wa and the second portion Wb4 of the second electric wire Wb, the distance in the X-X' direction between the second portion Wb4 of the second electric wire Wb and the second portion Wc4 of the third electric wire Wc, and the distance in the X-X' direction between the second portion Wc4 of the third electric wire Wc and the second portion Wd4 of the fourth electric wire Wd of the cable CA). Therefore, the second portion Wa4 of the first electric wire Wa is higher in impedance than the first portion Wa3 of the first electric wire Wa, resulting in an impedance mismatch between the second portion Wa4 of the first electric wire Wa and the first portion Wa3 of the first electric wire Wa; the second portion Wb4 of the second electric wire Wb is higher in impedance than the first portion Wb3 of the second electric wire Wb, resulting in an impedance mismatch between the second portion Wb4 of the second electric wire Wb and the first portion Wb3 of the second electric wire Wb; the second portion Wc4 of the third electric wire Wc is higher in impedance than the first portion Wc3 of the third electric wire Wc, resulting in an impedance mismatch between the second portion Wc4 of the third electric wire Wc and the first portion Wc3 of the third electric wire Wc; and the second portion Wd4 of the fourth electric wire Wd is higher in impedance than the first portion Wd3 of the fourth electric wire Wd, resulting in an impedance mismatch between the second portion Wd4 of the fourth electric wire Wd and the first portion Wd3 of the fourth electric wire Wd. In the assembly of the comparative example having such a configuration, the combination of the second electric wire Wb and one of the four terminals of the second conventional connector connected thereto and the combination of the third electric wire Wc and another one of the four terminals of the second conventional connector connected thereto form a differential pair. When differential signals are transmitted through this differential pair, the differential signals would be reflected at a position where impedances are not matched between two electric wires, and the reflection would cause signal loss and noise radiation. Therefore, the assembly of the comparative example have poor EMI characteristics.

Moreover, due to the larger distances between the second portions of the electric wires of the cable CA of the assembly of the comparative example as described above, the electrical coupling is lower between the second portion Wb4 of the second electric wire Wb and the second portion Wc4 of the third electric wire Wc forming the differential pair. Therefore, the assembly of the comparative example also has poor electromagnetic susceptibility (EMS) characteristics.

In contrast, the assembly A1 is configured such that the first connecting portion 210*a*, the second connecting portion 210*b*, the third connecting portion 210*c*, and the fourth connecting portion 210*d* are arranged in cross-sectional view of the first cross section (see FIGS. 2C, 5A, 6A, and 7A) such as to correspond to the arrangement of the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd of the cable CA. This configuration enables the first projecting portion Wa2 of the second portion Wa4 of the first electric wire Wa, the second projecting portion Wb2 of the second portion Wb4 of the second electric wire Wb, the third projecting portion Wc2 of the second portion Wc4 of the third electric wire Wc, and the fourth projecting portion Wd2 of the second portion Wd4 of the fourth electric wire Wd to be connected respectively to the first connecting portion 210*a*, the second connecting portion 210*b*, the third connecting portion 210*c*, and the fourth connecting portion 210*d* of the connector CO1 in a state where the second portion Da2 of the first inner insulator Da and the second portion Wa4 of the first electric wire Wa, the second portion Db2 of the second inner insulator Db and the second portion Wb4 of the second electric wire Wb, the second portion Dc2 of the third inner insulator Dc and the second portion Wc4 of the third electric wire Wc, and the second portion Dd2 of the fourth inner insulator Dd and the second portion Wd4 of the fourth electric wire Wd are led out of the outer conductor SH. Therefore, the assembly A1 is advantageous in that the second portion Da2 of the first inner insulator Da and the second portion Wa4 of the first electric wire Wa, the second portion Db2 of the second inner insulator Db and the second portion Wb4 of the second electric wire Wb, the second portion Dc2 of the third inner insulator Dc and the second portion Wc4 of the third electric wire Wc, and the second portion Dd2 of the fourth inner insulator Dd and the second portion Wd4 of the fourth electric wire Wd of the cable CA have smaller lengths, as compared with the assembly of the comparative example. Also smaller are the distances between the second portions of the four electric wires of the cable CA (namely, the distance in the X-X' direction between the second portion Wa4 of the first electric wire Wa and the second portion Wb4 of the second electric wire Wb, the distance in the X-X' direction between the second portion Wc4 of the third electric wire Wc and the second portion Wd4 of the fourth electric wire Wd, the distance in the Z-Z' direction between the second portion Wa4 of the first electric wire Wa and the second portion Wc4 of the third electric wire Wc, the distance in the Z-Z' direction between the second portion Wb4 of the second electric wire Wb and the second portion Wd4 of the fourth electric wire Wd, the distance in the second oblique direction between the second portion Wa4 of the first electric wire Wa and the second portion Wd4 of the fourth electric wire Wd, and the distance in first oblique direction between the second portion Wb4 of the second electric wire Wb and the second portion Wc4 of the third electric wire Wc) of the cable CA also decreases. As a result, in the assembly A1, as compared with the assembly of the comparative example, the second portion Wa4 of the first electric wire Wa is less likely to be higher in impedance than the first portion Wa3 of the first electric wire Wa, resulting in a higher expectation of an impedance match between the second portion Wa4 of the first electric wire Wa and the first portion Wa3 of the first electric wire Wa; the second portion Wb4 of the second electric wire Wb is less likely to be higher in impedance than the first portion Wb3 of the second electric wire Wb, resulting in a higher expectation of an impedance match between the second portion Wb4 of the second electric wire Wb and the first portion Wb3 of the second electric wire Wb; the second portion Wc4 of the third electric wire Wc is less likely to be higher in impedance than the first portion Wc3 of the third electric wire Wc, resulting in a higher expectation of an impedance match between the second portion Wc4 of the third electric wire Wc and the first portion Wc3 of the third electric wire Wc; and the second portion Wd4 of the fourth electric wire Wd is less likely to be higher in impedance than the first portion Wd3 of the fourth electric wire Wd, resulting in a higher expectation of an impedance match between the second portion Wd4 of the fourth electric wire Wd and the first portion Wd3 of the fourth electric wire Wd. In the assembly A1, the combination of the fourth terminal 200*d* and the fourth electric wire Wd of the connector CO1 and the combination of the first terminal 200*a* and the first electric wire Wa of the connector CO1 form a differential pair. When differential signals are transmitted through this differential pair, the differential signals would be likely be reflected at neither the fourth electric wire Wd nor the first electric wire Wa, and the reflection, if any, would be less likely to cause signal loss or noise radiation. Therefore, the assembly A1 have improved the EMI characteristics, as compared with the assembly of the comparative example.

Moreover, in the assembly A1, as compared with the assembly of the comparative example, because of the smaller distances between the second portions of the electric wires of the cable CA, the electrical coupling is improved between the two electric wires forming the differential pair (namely, between the second portion Wd4 of the fourth electric wire Wd and the second portion Wa4 of the first electric wire Wa of the assembly A1). Therefore, the assembly A1 has improved EMC characteristics compared with those of the assembly of the comparative example.

Where the connector CO1 of the assembly A1 has configurations (b1) to (b5) described above (see FIGS. 5A and 5B), the assembly A1 may be configured for transmitting therethrough differential signals therethrough. In this case, the connector CO1 and the cable CA may have the following configurations. The third terminal 200*c* of the connector CO1 and the third electric wire Wc of the cable CA connected thereto are configured for transmitting therethrough one signal of a positive signal or a negative signal of differential signals, and the second terminal 200*b* of the connector CO1 and the second electric wire Wb of the cable CA connected thereto are configured for transmitting therethrough the other signal. In other words, the combination of the third terminal 200*c* and the third electric wire Wc and the combination of the second terminal 200*b* and the second electric wire Wb form a differential pair. The first terminal 200*a* of the connector CO1 and the first electric wire Wa of the cable CA connected thereto are used for one of power supply or grounding, and the fourth terminal 200*d* of the connector CO1 and the fourth electric wire Wd of the cable CA connected thereto are used for the other.

The assembly A1 having any of the above configurations is not limited to use in transmitting differential signals, but may be configured for transmitting therethrough signals other than differential signals (e.g., single-ended signals).

Hereinafter described is a connection structure SC (combination) according to a plurality of embodiments, including the first embodiment of the invention and variants thereof, with reference to FIGS. 8A to 11B. FIGS. 8A to 11B illustrate the connection structure SC of the first embodiment.

The connection structure SC includes the connector CO1 according to any of the above aspects and a connector CO2 (second connector) connected to the connector CO1. The connection structure SC may further include the cable CA of any of the above aspects. The connection structure SC may further include a circuit board B. FIGS. 8A to 9C shown only a part of the cable CA.

The circuit board B includes a first electrode B1*a*, a second electrode B1*b*, a third electrode B1*c*, and a fourth electrode Bld. The first electrode B1*a*, the second electrode B1*b*, the third electrode B1*c*, and the fourth electrode B1*d* are surface electrodes provided on a face on Y'-direction side of the circuit board B (see FIGS. 10A to 11A) or through-hole electrodes extending through the circuit board B (not illustrated), and are arranged and spaced along the X-X' direction in accordance with to the layout of the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1.

The circuit board B may further include a pair of first GND electrodes B2 and/or a pair of second GND electrodes B3. The pair of first GND electrodes B2 are surface electrodes provided on the face on Y'-direction side of the circuit board B (see FIGS. 10A to 11A) or through-hole electrodes (not illustrated) extending through the circuit board B. One of the first GND electrodes B2 is arranged on the X-direction side relative to the first electrode B1*a*, the second electrode B1*b*, the third electrode B1*c*, and the fourth electrode B1*d*, and the other is arranged on the X'-direction side relative to the first electrode B1*a*, the second electrode B1*b*, the third electrode B1*c*, and the fourth electrode B1*d*. The pair of second GND electrodes B3 are also surface electrodes provided on the face on Y'-direction side of the circuit board B (see FIGS. 10A to 11A) or through-hole electrodes extending through the circuit board B (not illustrated). The pair of second GND electrodes B3 are arranged on the Z'-direction side relative to the first electrode B1*a*, the second electrode B1*b*, the third electrode B1*c*, and the fourth electrode B1*d*, and are arranged and spaced along the X-X' direction.

The connector CO2 includes a body 10. The body 10 is made of a material having an insulating property. For example, the body 10 may be constituted by a molded resin or by an insulating resin formed by a 3D printer.

The body 10 includes a base 11 (see FIGS. 9A to 11B). The base 11 is a plate extending in the X-X' and Z-Z' directions. The base 11 is provided with a first holding hole 11*a*, a second holding hole 11*b*, a third holding hole 11*c*, and a fourth holding hole 11*d* extending through the base 11 in the Y-Y' direction. The first holding hole 11*a*, the second holding hole 11*b*, the third holding hole 11*c*, and the fourth holding hole 11*d* are arranged and spaced along the X-X' direction in accordance with the layout of the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1. The base 11 includes an end portion on the Z-direction side and an end portion on the Z'-direction side.

The body 10 further includes a pair of first struts 12 and a pair of second struts 13 (see FIGS. 9A to 11B). The pair of first struts 12 extend in the Y' direction from the end portion on the Z'-direction side of the base 11 and are arranged and spaced along the X-X' direction. The pair of second struts 13 extend in the Y' direction from the end portion on the Z-direction side of the base 11 and are arranged and spaced along the X-X' direction. The pair of first struts 12 and the pair of second struts 13 define a receiving space. Where the distal portion 130 of the body 100 of the connector CO1 is provided, the receiving space houses the distal portion 130 of the body 100 of the connector CO1, together with the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d*, removably in the Y-Y' direction (i.e., the distal portion 130 of the body 100 of the connector CO1, together with the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d*, are housed between the pair of first struts 12 and the pair of second struts 13 removably in the Y-Y' direction). Where the distal portion 130 of the body 100 of the connector CO1 is not provided, the receiving space houses the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1, removably in the Y-Y' direction (i.e., the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1 are housed between the pair of first struts 12 and the pair of second struts 13 removably in the Y-Y' direction).

The first strut 12 and/or the second strut 13 can be omitted. Alternatively, the body 10 may include, in place of the pair of first struts 12 and the pair of second struts 13, a tubular portion extending from the base 11 in the Y' direction and defining the receiving space (not illustrated).

The body 10 may further include one or more leg portions 14 (see FIGS. 9A to 11B) projecting in the Y direction from the base 11. The one or more leg portions 14 can be omitted.

The connector CO2 further includes a first terminal 20*a*, a second terminal 20*b*, a third terminal 20*c*, and a fourth terminal 20*d*. Each of the first terminal 20*a*, the second terminal 20*b*, the third terminal 20*c*, and the fourth terminal 20*d* is made of a material having electrical conductivity, such as a metal plate or a plate of other conductor, or a conductor formed by a 3D printer. The first terminal 20*a*, the second terminal 20*b*, the third terminal 20*c*, and the fourth terminal 20*d* extend in the Y-Y' direction. The first terminal 20*a*, the second terminal 20*b*, the third terminal 20*c*, and the fourth terminal 20*d* are partly held in the body 10.

The first terminal 20*a* includes a first main portion 21*a*, a first distal portion 22*a*, and a first mounting portion 23*a*. The second terminal 20*b* includes a second main portion 21*b*, a second distal portion 22*b*, and a second mounting portion 23*b*. The third terminal 20*c* includes a third main portion 21*c*, a third distal portion 22*c*, and a third mounting portion 23*c*. The fourth terminal 200*d* includes a fourth main portion 21*d*, a fourth distal portion 22*d*, and a fourth mounting portion 23*d*.

The first main portion 21*a*, the second main portion 21*b*, the third main portion 21*c*, and the fourth main portion 21*d* are rods (see FIGS. 9A to 11B) or plates (not illustrated) extending in the Y-Y' direction respectively through the first holding hole 11*a*, the second holding hole 11*b*, the third holding hole 11*c*, and the fourth holding hole 11*d* of the base 11 to be held respectively in the first holding hole 11*a*, the second holding hole 11*b*, the third holding hole 11*c*, and the fourth holding hole 11*d* of the base 11. The first main portion 21*a*, the second main portion 21*b*, the third main portion 21*c*, and the fourth main portion 21*d* are arranged and spaced along the X-X' direction in accordance with the layout of the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1.

Each of the first distal portion 22*a*, the second distal portion 22*b*, the third distal portion 22*c*, and the fourth distal portion 22*d* is a rod (see FIGS. 9A to 11B), a plate (not illustrated), or a pair of arms (not illustrated). The first distal portion 22*a*, the second distal portion 22*b*, the third distal portion 22*c*, and the fourth distal portion 22*d* extend in the Y' direction respectively from the first main portion 21*a*, the second main portion 21*b*, the third main portion 21*c*, and the fourth main portion 21*d*, and are disposed in the receiving space. The first distal portion 22*a*, the second distal portion 22*b*, the third distal portion 22*c*, and the fourth distal portion 22*d* are also arranged and spaced along the X-X' direction in accordance with the layout of the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1. The first distal portion 22*a*, the second distal portion 22*b*, the third distal portion 22*c*, and the fourth distal portion 22*d* are in contact respectively with, and electrically connected respectively to, the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1 in the receiving space. The first distal portion 22*a*, the second distal portion 22*b*, the third distal portion 22*c*, and the fourth distal portion 22*d* may, but are not required to, be bent or curved such as to be partly project in the Z' or Z direction so as to be elastically contactable respectively with the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1.

Where the first electrode B1*a*, the second electrode B1*b*, the third electrode B1*c*, and the fourth electrode B1*d* of the circuit board B are the surface electrodes (see FIGS. 9A to 9C, 11A, and 11B), the first mounting portion 23*a*, the second mounting portion 23*b*, the third mounting portion 23*c*, and the fourth mounting portion 23*d* are generally L-shaped rods extending in the Z direction (see FIGS. 9B to 11B) or the Z' direction (not illustrated) respectively from the first main portion 21*a*, the second main portion 21*b*, the third main portion 21*c*, and the fourth main portion 21*d*, and are respectively placed on, and connected by soldering, adhering with conductive adhesive, laser welding, or the like means to, the first electrode B1*a*, the second electrode B1*b*, the third electrode B1*c*, and the fourth electrode B1*d*. Where the one or more leg portions 14 of the body 10 are provided, the one or more leg portions 14 are in abutment with the first mounting portion 23*a*, the second mounting portion 23*b*, the third mounting portion 23*c*, and the fourth mounting portion 23*d* from the Y'-direction side (see FIG. 10A) or are in abutment with the circuit board B from the Y'-direction side (not illustrated).

Where the first electrode B1*a*, the second electrode B1*b*, the third electrode B1*c*, and the fourth electrode B1*d* of the circuit board B are the through-hole electrodes (not illustrated), the first mounting portion 23*a*, the second mounting portion 23*b*, the third mounting portion 23*c*, and the fourth mounting portion 23*d* are rods extending in the Y direction respectively from the first main portion 21*a*, the second main portion 21*b*, the third main portion 21*c*, and the fourth main portion 21*d*, and extend through, connected by soldering, adhering with conductive adhesive, laser welding, or the like means to, the first electrode B1*a*, the second electrode B1*b*, the third electrode B1*c*, and the fourth electrode B1*d*. Where the one or more leg portions 14 of the body 10 are provided, the one or more leg portions 14 are in abutment with the circuit board B from the Y'-direction side (not illustrated).

The connector CO2 may further include a shell 30 (see FIGS. 9A to 11B). The shell 30 may be constituted by a metal or other conductor, or may be constituted by a molded resin and a metal plated or vapor-deposited on an outer face and/or an inner face thereof.

The shell 30 includes a shell body 31 of tubular shape extending in the Y-Y' direction. The shell body 31 fits over the base 11, the pair of first struts 12, and the pair of second struts 13 of the body 10 (see FIGS. 9A to 11B), or fits over the base 11 and the tubular portion of the body 10. Where the shell 300 of the connector CO1 is provided, the shell body 31 has an outer shape and size of a cross section along the X-X' and Z-Z' directions that corresponds to an inner shape and size of a cross section along the X-X' and Z-Z' directions of the connecting portion 330 of the shell 300 of the connector CO1. The shell body 31 fits in the connecting portion 330 removably in the Y-Y' direction.

The shell body 31 has an end portion on the Y-direction side. The end portion on the Y-direction side of the shell body 31 includes an end on the X-direction side, an end on the X'-direction side, an end on the Z-direction side, and an end on Z'-direction side.

The shell 30 further includes a pair of first mounting portions 32 and/or a pair of second mounting portions 33.

Where the pair of first GND electrodes B2 of the circuit board B are the surface electrodes (see FIGS. 9A to 9C, 11A, and 11B), one of the first mounting portions 32 is a generally L-shaped plate extending in the Y direction from the end on the X-direction side of the end portion on the Y-direction side of the shell body 31 and then being bent in the X direction, and the other of the first mounting portions 32 is a generally L-shaped plate extending in the Y direction from the end on the X'-direction side of the end portion on the Y-direction side of the shell body 31 and then being bent in the X' direction. The first mounting portions 32 are respectively placed on, and connected by soldering, adhering with conductive adhesive, laser welding, or the like means to, the first GND electrodes B2.

Where the pair of second GND electrodes B3 of the circuit board B are the through-hole electrodes (not illustrated), one of the first mounting portions 32 is a plate or rod extending in the Y direction from the end on the X-direction side of the end portion on the Y-direction side of the shell body 31, and the other of the first mounting portions 32 is a plate or rod extending in the Y direction from the end on the X'-direction side of the end portion on the Y-direction side of the shell body 31. The first mounting portions 32 are respectively received in, and connected by soldering, adhering with conductive adhesive, laser welding, or the like means to, the first GND electrodes B2 and connected by soldering, adhering with conductive adhesive, laser welding, or the like means.

The pair of second mounting portions 33 are generally L-shaped plates extending in the Y direction from the end on Z'-direction side of the end portion on the Y-direction side of the shell body 31 and then being bent in the Z' direction. The second mounting portions 33 are arranged and spaced along the X-X' direction. Where the pair of second GND electrodes B3 of the circuit board B are the surface electrodes (see FIGS. 9A to 9C, 11A, and 11B), the second GND electrodes B3 are respectively placed on, and connected by soldering, adhering with conductive adhesive, laser welding, or the like means to, the second GND electrodes B3. Where the pair of second GND electrodes B3 of the circuit board B are the through-hole electrodes (not illustrated), the second mounting portions 33 are respectively received in, and connected by soldering, adhering with conductive adhesive, laser welding, or the like means to, the second GND electrodes B3.

The shell 30 can be omitted. Where the shell 30 is omitted, the first GND electrodes B2 and the second GND electrodes B3 of the circuit board B are also omitted.

The connection structure SC may further include a housing H. The housing H has a connection port H1, which is a through hole extending through the housing H in the Y-Y' direction. The connector CO1 can be removably received in the housing H through the connection port H1 in the Y-Y' direction. The connector CO2 and the circuit board B are housed in the housing H such that the receiving space of the connector CO2 is open in the Y' direction through the connection port H1. Where the projection 613 of the holder 600 of the connector CO1 is provided, the outer shape and size of the cross section in the X-X' and Z-Z' directions of the projection 613 may correspond to the inner shape and size of the connection port H1. In this case, the projection 613 of the holder 600 of the connector CO1 fits in the connection port H1 of the housing H. The housing H may be provided with a screw hole H2. The screw hole H2 can be omitted.

The housing H can be omitted.

The connector CO2 according to any of the above aspects may be assembled by one of the following methods. The body 10, the first terminal 20*a*, the second terminal 20*b*, the third terminal 20*c*, and the fourth terminal 20*d* are prepared. The first terminal 20*a*, the second terminal 20*b*, the third terminal 20*c*, and the fourth terminal 20*d* are held by the base 11 of the body 10 as described above. Where the shell 30 is provided, the body 10 is inserted into the shell body 31 of the shell 30, and the shell body 310 is attached to the body 10. The connector CO2 is thus assembled. Where the shell 30 is not provided, the step of attaching the shell 30 is omitted.

The connector CO2 thus assembled may be mounted on the circuit board B by one of the following methods. Where the first electrode B1*a*, the second electrode B1*b*, the third electrode B1*c*, and the fourth electrode B1*d* of the circuit board B are the surface electrodes (see FIGS. 9A to 9C, 11A, and 11B), the first mounting portion 23*a* of the first terminal 20*a*, the second mounting portion 23*b* of the second terminal 20*b*, the third mounting portion 23*c* of the third terminal 20*c*, and the fourth mounting portion 23*d* of the fourth terminal 20*d* are respectively placed on the first electrode B1*a*, the second electrode B1*b*, the third electrode B1*c*, and the fourth electrode B1*d* (this step may be hereinafter referred to simply as a "placement step of the mounting portions"). Thereafter, the first mounting portion 23*a* of the first terminal 20*a*, the second mounting portion 23*b* of the second terminal 20*b*, the third mounting portion 23*c* of the third terminal 20*c*, and the fourth mounting portion 23*d* of the fourth terminal 20*d* are respectively connected to the first electrode B1*a*, the second electrode B1*b*, the third electrode B1*c*, and the fourth electrode B1*d* by soldering, adhering with conductive adhesive, laser welding, or the like means. Where the first electrode B1*a*, the second electrode B1*b*, the third electrode B1*c*, and the fourth electrode B1*d* of the circuit board B are the through-hole electrodes (not illustrated), the first mounting portion 23*a* of the first terminal 20*a*, the second mounting portion 23*b* of the second terminal 20*b*, the third mounting portion 23*c* of the third terminal 20*c*, and the fourth mounting portion 23*d* of the fourth terminal 20*d* are respectively inserted into the first electrode B1*a*, the second electrode B1*b*, the third electrode B1*c*, and the fourth electrode B1*d* of the circuit board B (this step may be hereinafter referred to simply as a "insertion step of the mounting portions"). Thereafter, the first mounting portion 23*a* of the first terminal 20*a*, the second mounting portion 23*b* of the second terminal 20*b*, the third mounting portion 23*c* of the third terminal 20*c*, and the fourth mounting portion 23*d* of the fourth terminal 20*d* are respectively connected to the first electrode B1*a*, the second electrode B1*b*, the third electrode B1*c*, and the fourth electrode B1*d* by soldering, adhering with conductive adhesive, laser welding, or the like means.

Where the pair of first mounting portions 32 of the shell 30 of the connector CO2 are provided and the pair of first GND electrodes B2 as the surface electrodes are provided, in the placement step or the insertion step of the mounting portions, the first mounting portions 32 are respectively placed on the first GND electrodes B2. Thereafter, the first mounting portions 32 of the shell 30 of the connector CO2 are respectively connected to the first GND electrodes B2 by soldering, adhering with conductive adhesive, laser welding, or the like means.

Where the pair of first mounting portions 32 of the shell 30 of the connector CO2 are provided and the pair of first GND electrodes B2 as the through-hole electrodes are provided, in the placement step or the insertion step of the mounting portions, the first mounting portions 32 are respectively inserted into the first GND electrodes B2. Thereafter, the first mounting portions 32 of the shell 30 of the connector CO2 are respectively connected to the first GND electrodes B2 by soldering, adhering with conductive adhesive, laser welding, or the like means.

Where the pair of second mounting portions 33 of the shell 30 of the connector CO2 are provided and the pair of second GND electrodes B3 as the surface electrodes are provided, in the placement step or the insertion step of the mounting portions, the second mounting portions 33 are respectively placed on the second GND electrodes B3. Thereafter, the second mounting portions 33 of the shell 30 of the connector CO2 are respectively connected to the second GND electrodes B3 by soldering, adhering with conductive adhesive, laser welding, or the like means.

Where the pair of second mounting portions 33 of the shell 30 of the connector CO2 are provided and the pair of second GND electrodes B3 as the through-hole electrodes are provided, in the placement step or the insertion step of the mounting portions, the second mounting portions 33 are respectively inserted into the second GND electrodes B3. Thereafter, the second mounting portions 33 of the shell 30 of the connector CO2 are respectively connected to the second GND electrodes B3 by soldering, adhering with conductive adhesive, laser welding, or the like means.

The connector CO2 is thus mounted on the circuit board B. Where the pair of first mounting portions 32 are not provided, the above mounting step is omitted. Where the pair of second mounting portions 33 are not provided, the above mounting process is omitted.

The connector CO1 of any of the above aspects may be connected to the connector CO2 of any of the above aspects by one of the following exemplary non-limiting methods.

Where the housing H is provided, the shell 30 of the connector CO2 is provided, and the distal portion 130 of the body 100 and the shell 300 of the connector CO1 are provided, the distal portion 130 of the body 100 and the connecting portion 330 of the shell 300 of the connector CO1 are inserted into the housing H through the connection port H1 of the housing H. Then, the distal portion 130 of the body 100 of the connector CO1 is inserted into the receiving space of the body 10 of the connector CO2 along the Y-Y' direction; and the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1 are respectively brought into contact with, and into electrical connection with, the first distal portion 22*a* of the first terminal 20*a*, the second distal portion 22*b* of the second terminal 20*b*, the third distal portion 22*c* of the third terminal 20*c*, and the fourth distal portion 22*d* of the fourth terminal 20*d* of the connector CO2 in the receiving space. At the same time, the shell body 31 of the shell 30 of the connector CO2 is fitted into the connecting portion 330 of the shell 300 of the connector CO1. As a result, the shell body 31 of the shell 30 of the connector CO2 is brought into contact with the connecting portion 330 of the shell 300 of the connector CO1, and the shell 300 of the connector CO1 are electrically connected to the shell 30 of the connector CO2. The connector CO1 is thus connected to the connector CO2.

Where the housing H is provided, the shell 30 of the connector CO2 is provided, and the shell 300 of the connector CO1 is provided, but the distal portion 130 of the body 100 of the connector CO1 is not provided, in this case the first distal portion 230*a* of the first terminal 200*a*, the second distal portion 230*b* of the second terminal 200*b*, the third distal portion 230*c* of the third terminal 200*c*, the fourth distal portion 230*d* of the fourth terminal 200*d*, and the connecting portion 330 of the shell 300 of the connector CO1 are inserted into the housing H through the connection port H1 of the housing H. Then, the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1 are inserted into the receiving space of the body 10 of the connector CO2 along the Y-Y' direction, and are respectively brought into contact with, and into electrical connection with, the first distal portion 22*a* of the first terminal 20*a*, the second distal portion 22*b* of the second terminal 20*b*, the third distal portion 22*c* of the third terminal 20*c*, and the fourth distal portion 22*d* of the fourth terminal 20*d* of the connector CO2 in the receiving space. At the same time, the shell body 31 of the shell 30 of the connector CO2 is fitted into the connecting portion 330 of the shell 300 of the connector CO1. As a result, the shell body 31 of the shell 30 of the connector CO2 is brought into contact with the connecting portion 330 of the shell 300 of the connector CO1, and the shell 300 of the connector CO1 are electrically connected to the shell 30 of the connector CO2. The connector CO1 is thus connected to the connector CO2.

Where the screw hole H2 of the housing H and the fixing portion 620 of the holder 600 of the connector CO1 are provided, in a state where the connector CO1 is connected to the connector CO2, the fixing portion 620 of the holder 600 of the connector CO1 abuts on the housing H, and the through hole 621 of the fixing portion 620 of the holder 600 of the connector CO1 communicates with the screw hole H2 of the housing H. Thereafter, a screw P is inserted through the through hole 621 and screwed into the screw hole H2. The screw P may be replaced with an engaging portion, such as a screw pin or a latch. In this case, the housing H may be provided with an engaging hole in place of the screw hole H2. The engaging portion is inserted through the through hole 621 of the fixing portion 620 and into the engaging hole of the housing H to fit in the engaging hole.

Where the housing H is not provided, the connection methods described above do not include the steps related to the housing H.

Since the connection structure SC as described above includes the connector CO1, the connection structure SC provides technical features and effects similar to those of the connector CO1.

Further advantageously, the first terminal 20*a*, the second terminal 20*b*, the third terminal 20*c*, and the fourth terminal 20*d* of the connector CO2 of the connection structure SC are arranged and spaced along the X-X' direction in accordance with the layout of the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1. It is therefore easy to connect the first mounting portion 23*a* of the first terminal 20*a*, the second mounting portion 23*b* of the second terminal 20*b*, the third mounting portion 23*c* of the third terminal 20*c*, and the fourth mounting portion 23*d* of the fourth terminal 20*d* of the connector CO2 respectively to the first electrode B1*a*, the second electrode B1*b*, the third electrode B1*c*, and the fourth electrode B1*d* of the circuit board B as described above.

Note that the connection structure SC may be configured for transmitting therethrough differential signals. Where the connector CO1 of the connection structure SC has configuration (a) described above (see FIGS. 1A to 4B), the connection structure SC may be configured as follows. The fourth terminal 200*d* of the connector CO1, the fourth electric wire Wd of the cable CA connected thereto, and the fourth terminal 20*d* of the connector CO2 are configured for transmitting therethrough one signal of a positive signal or a negative signal of differential signals, and the first terminal 200*a* of the connector CO1, the first electric wire Wa of the cable CA connected thereto, and the first terminal 20*a* of the connector CO2 are configured for transmitting therethrough the other signal. In other words, the combination of the fourth terminal 200*d*, the fourth electric wire Wd, and the fourth terminal 20*d* and the combination of the first terminal 200*a*, the first electric wire Wa, and the first terminal 20*a* form a differential pair. The second terminal 200*b* of the connector CO1, the second electric wire Wb of the cable CA connected thereto, and the second terminal 20*b* of the connector CO2 are used for one of power supply or grounding, and the third terminal 200*c* of the connector CO1, the third electric wire Wc of the cable CA connected thereto, and the third terminal 20*c* of the connector CO2 are used for the other.

Where the connector CO1 of the connection structure SC has configuration (b) described above (see FIGS. 5A and 5B), the connector CO2 of the connection structure SC may be configured as follows. The third terminal 200*c* of the connector CO1, the third electric wire Wc of the cable CA connected thereto, and the third terminal 20*c* of the connector CO2 are configured for transmitting therethrough one signal of a positive signal or a negative signal of differential signals, and the second terminal 200*b* of the connector CO1, the second electric wire Wb of the cable CA connected thereto, and the second terminal 20*b* of the connector CO2 are configured for transmitting therethrough the other signal. In other words, the combination of the third terminal 200*c*, the third electric wire Wc, and the third terminal 20*c* and the combination of the second terminal 200*b*, the second electric wire Wb, and the second terminal 20*b* form a differential pair. The first terminal 200*a* of the connector CO1, the first electric wire Wa of the cable CA connected thereto, and the first terminal 20*a* of the connector CO2 are used for one of power supply or grounding, and the fourth terminal 200*d* of the connector CO1, the fourth electric wire Wd of the cable CA connected thereto, and the fourth terminal 20*d* of the connector CO2 are used for the other.

Advantages of the connection structure SC will now be described, comparing the connection structure SC with a connection structure of a comparative example.

The connection structure of the comparative example includes the first conventional connector, the cable CA, a mating connector, and a circuit board. The four terminals of the first conventional connector are arranged in two rows. Therefore, the first projecting portion Wa2 of the first electric wire Wa, the second projecting portion Wb2 of the second electric wire Wb, the third projecting portion Wc2 of the third electric wire Wc, and the fourth projecting portion Wd2 of the fourth electric wire Wd of the cable CA are respectively connected to the connecting portions of the four terminals of the first conventional connector, in a state where the second portion Da2 of the first inner insulator Da of the cable CA and the second portion Wa4 of the first electric wire Wa therein, the second portion Db2 of the second inner insulator Db and the second portion Wb4 of the second electric wire Wb therein, the second portion Dc2 of the third inner insulator Dc and the second portion Wc4 of the third electric wire Wc therein, and the second portion Dd2 of the fourth inner insulator Dd and the second portion Wd4 of the fourth electric wire Wd therein remain in the two row arrangement. The mating connector includes four terminals, which are also arranged in two rows in accordance with the layout of the four terminals of the first connector of the conventional example. The distal portions of the four terminals of the first conventional connector are respectively in contact with, and electrically connected to, the four terminals of the mating connector. The four terminals of the mating connector are respectively mounted on four electrodes arranged in two rows on the circuit board.

Among the four terminals of the first conventional connector and the four terminals of the mating connector, two terminals located diagonally opposite in a first oblique direction form a differential pair, and the remaining two terminals located diagonally opposite in a second oblique direction are power supply terminals and GND terminals. Accordingly, among the four electrodes on the circuit board, the two electrodes located diagonally opposite in the first oblique direction form differential signal electrodes, so that it is often the case that two conductive lines extending respectively from the two electrodes to an electronic circuit, such as an IC, on the circuit board have sections that cannot not arranged in parallel. It is difficult to electrically couple the two conductive lines in such sections, leading to degraded EMC characteristics of the connection structure of the comparative example. It is also difficult to equalize the electrical lengths of the two conductive lines. Even if it is possible to equalize the electrical lengths of the two conductive lines, the two conductive lines would have unnecessarily large electrical lengths, increasing the possibility of transmission loss in differential signals.

In contrast, the connection structure SC is configured such that the first distal portion 22*a* of the first terminal 20*a*, the second distal portion 22*b* of the second terminal 20*b*, the third distal portion 22*c* of the third terminal 20*c*, and the fourth distal portion 22*d* of the fourth terminal 20*d* of the connector CO2 of the connection structure SC are arranged and spaced along the X-X' direction in accordance with the layout of the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1. This configuration allows the first electrode B1*a*, the second electrode B1*b*, the third electrode B1*c*, and the fourth electrode B1*d* of the circuit board B to also be arranged in a row and spaced in the X-X' direction. Where the combination of the fourth terminal 200*d*, the fourth electric wire Wd, and the fourth terminal 20*d* and the combination of the first terminal 200*a*, the first electric wire Wa, and the first terminal 20*a* form a differential pair, the fourth electrode B1*d* and the first electrode B1*a* of the circuit board B, on which the fourth terminal 20*d* and the first terminal 20*a* are mounted, are arranged next to each other in the X-X' direction. It is therefore possible to arrange two conductive lines (not illustrated), which respectively extend from the fourth electrode B1*d* and the first electrode B1*a* to an electronic circuit (not illustrated) on the circuit board B, substantially in parallel with each other. Where the combination of the third terminal 200*c*, the third electric wire Wc, and the third terminal 20*c* and the combination of the second terminal 200*b*, the second electric wire Wb, and the second terminal 20*b* form a differential pair, the third electrode B1*c* and the second electrode B1*b* of the circuit board B, on which the third terminal 20*c* and the second terminal 20*b* are mounted, are arranged next to each other in the X-X' direction. It is therefore possible to arrange two conductive lines (not illustrated), which respectively extend from the third electrode B1*c* and the second electrode B1*b* to an electronic circuit (not illustrated) on the circuit board B, substantially in parallel with each other. In either case, it is possible to electrically couple the two conductive lines over the entire length thereof, leading to improved EMC characteristics of the connection structure SC compared with the EMC characteristics of the connection structure of the comparative example. In addition, since the fourth electrode B1*d* and the first electrode B1*a* of the circuit board B are next to each other in the X-X' direction, or alternatively since the third electrode B1*c* and the second electrode B1*b* of the circuit board B are next to each other in the X-X' direction, it is easy to equalize and sufficiently shorten the electrical lengths of the two conductive lines extending from the two electrodes, decreasing the possibility of transmission loss in differential signals.

Note that the connection structure SC having any of the configurations described above is not limited to use in transmitting differential signals, by may be configured for transmitting therethrough signals other than differential signals (e.g., single-ended signals).

Second Embodiment

Figure 12A:
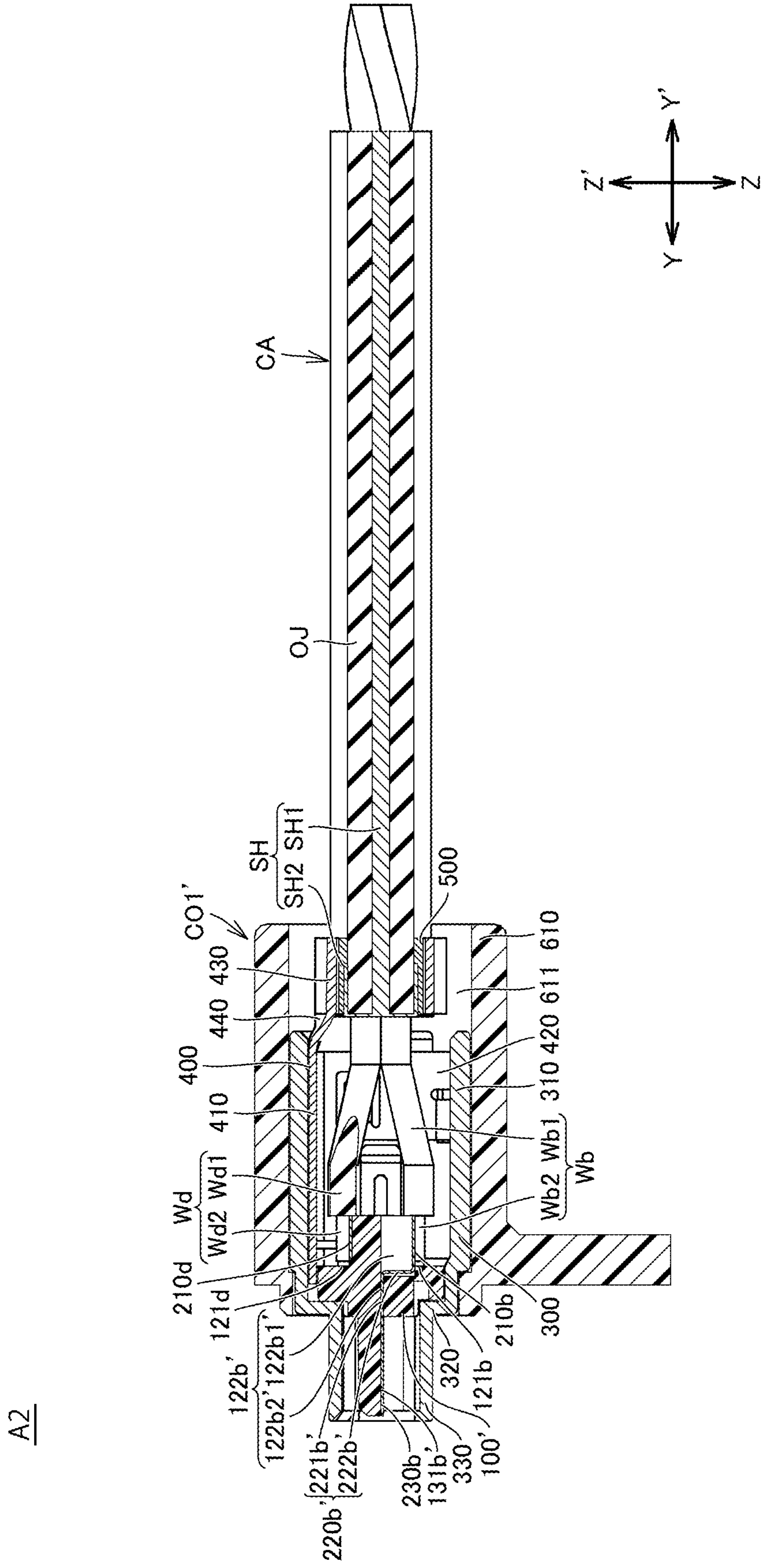
FIG. 12A is an enlarged cross-sectional view, corresponding to FIG. 2F, of a connector assembly according to a second embodiment of the invention.
Figure 12B:
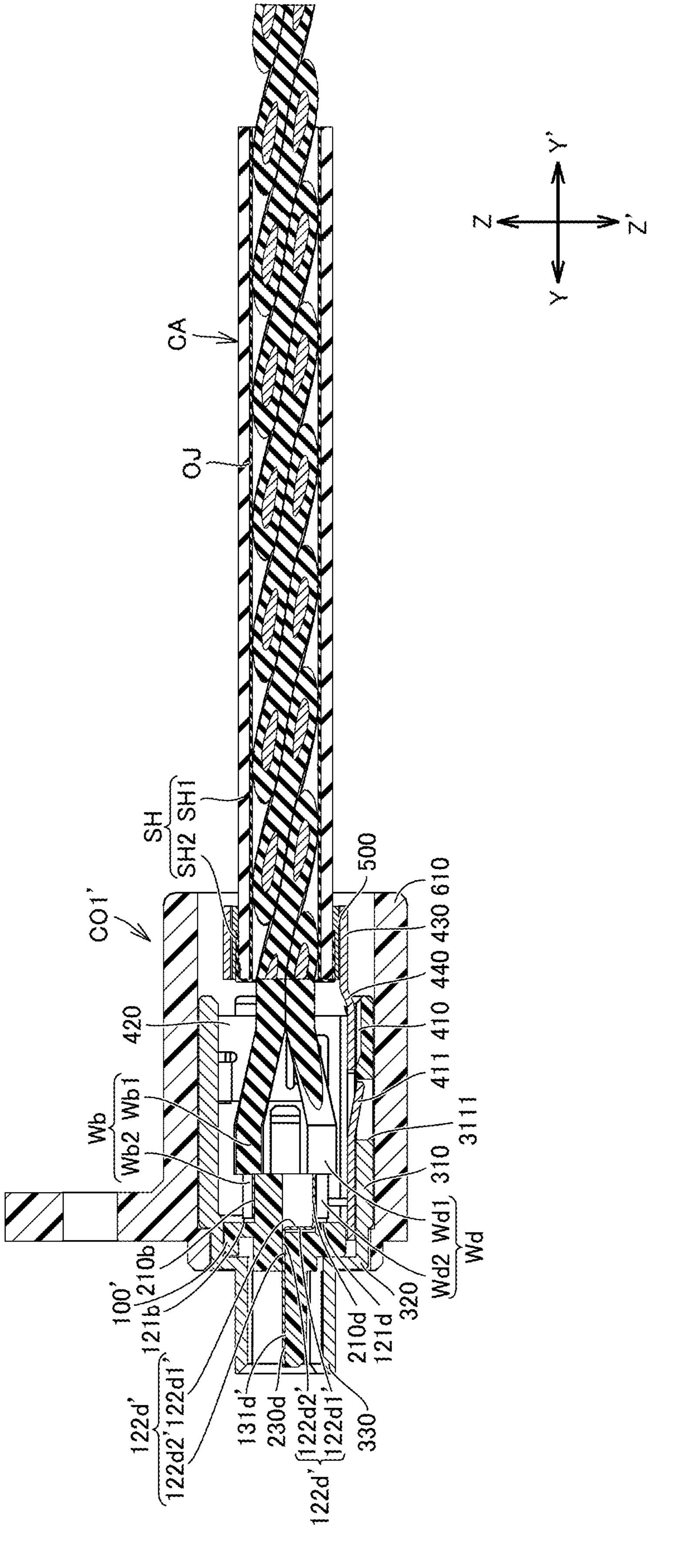
FIG. 12B is an enlarged cross-sectional view, corresponding to FIG. 2G, of the connector assembly of the second embodiment.
Figure 13:
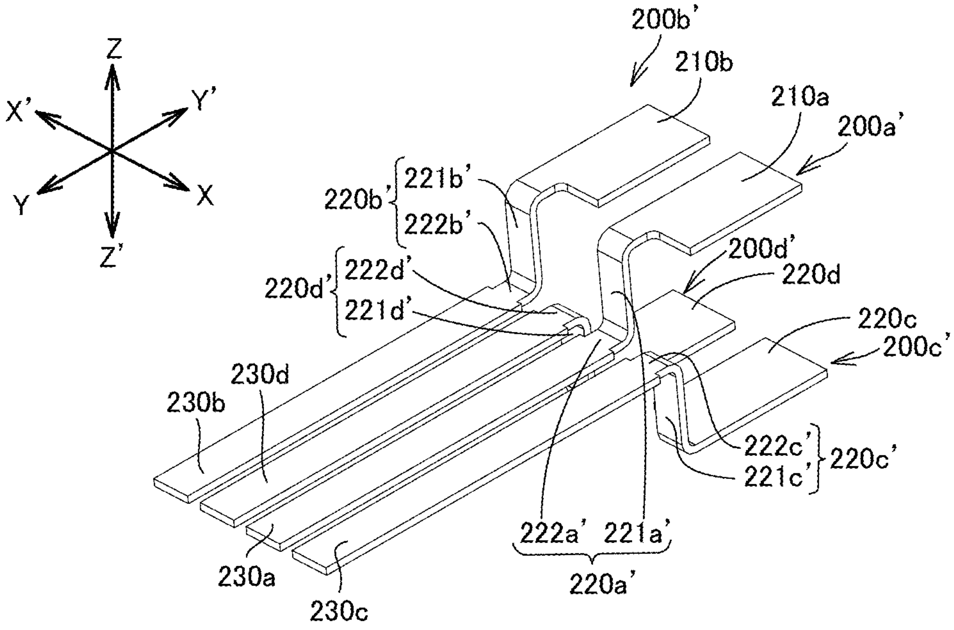
FIG. 13 is an enlarged, top, front, right side perspective view of the first to fourth terminals of the connector assembly of the second embodiment.

Hereinafter described is a connector assembly A2 (which may be referred to simply as an "assembly A2") according to a plurality of embodiments, including a second embodiment of the invention and modifications thereof, of the invention, with reference to FIGS. 12A to 13. FIGS. 12A to 13 illustrate the assembly A2 of the second embodiment. FIGS. 12A to 13 show the Y-Y' direction (first direction). FIG. 13 shows the X-X' direction (second direction). FIGS. 12A to 13 show the Z-Z' direction (third direction).

The assembly A2 has the same configuration as the assembly A1 except the following differences. A body 100' of a connector CO1' of the assembly A2 includes a first holding hole 122*a*', a second holding hole 122*b*', a third holding hole 122*c*', and a fourth holding hole 122*d*' that are different in configuration from the first holding hole 122*a*, the second holding hole 122*b*, the third holding hole 122*c*, and the fourth holding hole 122*d* of the body 100 of the connector CO1 of the assembly A1. Also, the connector CO1' of the assembly A2 includes a first main portion 220*a*' of a first terminal 200*a*', a second main portion 220*b*' of a second terminal 200*b*', a third main portion 220*c*' of a third terminal 200*c*', and a fourth main portion 220*d*' of a fourth terminal 200*d*' that are different in configuration from the first main portion 220*a* of the first terminal 200*a*, the second main portion 220*b* of the second terminal 200*b*, the third main portion 220*c* of the third terminal 200*c*, and the fourth main portion 220*d* of the fourth terminal 200*d* of the connector CO1 of the assembly A1. The assembly A2 will now be described focusing on the differences from the assembly A1 and omitting overlapping descriptions. Note that components of the assembly A2 that are different from those of the assembly A1 described above will be denoted by reference signs with a prime symbol (') added thereto for the sake of distinction from the components of the assembly A1, while components of the assembly A2 that are the same as those of the assembly A1 will be denoted by the same reference signs as those for the components of the assembly A1.

Where a rear portion 120 of the body 100' has configuration (1) above, a first housing recess 121*a*, a second housing recess 121*b*, a third housing recess 121*c*, and a fourth housing recess 121*d* of the rear portion 120 each includes a third end portion on the Y-direction side and a fourth end portion on the Y'-direction side.

Where the rear portion 120 of the body 100' has configuration (2) above, a first housing hole, a second housing hole, a third housing hole, and a fourth housing hole of the rear portion 120 each includes a third end portion on the Y-direction side and a fourth end portion on the Y'-direction side.

The first holding hole 122*a*' of the body 100' extends from the first housing recess 121*a* or the first housing hole, in a direction including a component of the Z' direction (e.g., in the Z' direction, the sixth oblique direction, or a ninth oblique direction), communicates with the first housing recess 121*a* or the first housing hole, and is open in the Y' direction. The ninth oblique direction is a direction including a component of the Y' direction and a component of the Z' direction.

For example, where the first holding hole 122*a*' includes a first hole 122*a*1' and a second hole 122*a*2', the first hole 122*a*1' of the first holding hole 122*a*' extends from the third end portion or the fourth end portion of the first housing recess 121*a*, or alternatively from the third end portion or the fourth end portion of the first housing hole, in the direction including the component of the Z' direction (e.g., in the Z' direction, the sixth oblique direction, or the ninth oblique direction), communicates with the first housing recess 121*a* or the first housing hole, and is open in the Y' direction. The second hole 122*a*2' of the first holding hole 122*a*' extends in the Y direction from the first hole 122*a*1' of the first holding hole 122*a*', is located on the Y-direction side relative to the first hole 122*a*1' of the first holding hole 122*a*', and communicates with the first hole **122*a*1' of the first holding hole 122*a*'. The second hole 122*a*2' of the first holding hole 122*a*'** can be omitted.

The third holding hole **122*c*' of the body 100' extends from the third housing recess 121*c* or the third housing hole, in a direction including a component of the Z direction (e.g., in the Z direction, the fifth oblique direction, or a tenth oblique direction), communicates with the third housing recess 121*c*** or the third housing hole, and is open in the Y' direction. The tenth oblique direction is a direction including a component of the Y' direction and a component of the Z direction.

For example, where the third holding hole **122*c*' includes a first hole 122*c*1' and a second hole 122*c*2', the first hole 122*c*1' of the third holding hole 122*c*' extends from the third end portion or the fourth end portion of the third housing recess 121*c*, or alternatively from the third end portion or the fourth end portion of the third housing hole, in the direction including the component of the Z direction (e.g., in the Z direction, the fifth oblique direction, or the tenth oblique direction), communicates with the third housing recess 121*c* or the third housing hole, and is open in the Y' direction. The second hole 122*c*2' of the third holding hole 122*c*' extends in the Y direction from the first hole 122*c*1' of the third holding hole 122*c*', is located on the Y-direction side relative to the first hole 122*c*1' of the third holding hole 122*c*', and communicates with the first hole 122*c*1' of the third holding hole 122*c*'. The second hole 122*c*2' of the third holding hole 122*c*'** can be omitted.

The first holding hole **122*a*' and the third holding hole 122*c*' are arranged and spaced along the X-X' direction. The first holding hole 122*a*' may be arranged on the X'-direction side relative to the third holding hole 122*c*', and the third holding hole 122*c*' may be arranged on the X-direction side relative to the first holding hole 122*a*'**, or vice versa.

The second holding hole **122*b*' of the body 100' extends from the second housing recess 121*b* or the second housing hole, in a direction including a component of the Z' direction (e.g., in the Z' direction, the sixth oblique direction, or the ninth oblique direction), communicates with the second housing recess 121*b*** or the second housing hole, and is open in the Y' direction.

For example, where the second holding hole **122*b*' includes a first hole 122*b*1' and a second hole 122*b*2', the first hole 122*b*1' of the second holding hole 122*b*' extends from the third end portion (see FIG. 12A) or the fourth end portion (not illustrated) of the second housing recess 121*b*, or alternatively from the third end portion or the fourth end portion of the second housing hole, in the direction including the component of the Z' direction (e.g., in the Z' direction, the sixth oblique direction, or the ninth oblique direction), communicates with the second housing recess 121*b* or the second housing hole, and is open in the Y' direction. The second hole 122*b*2' of the second holding hole 122*b*' extends in the Y direction from the first hole 122*b*1' of the second holding hole 122*b*', is located on the Y-direction side relative to the first hole 122*b*1' of the second holding hole 122*b*', and communicates with the first hole 122*b*1' of the second holding hole 122*b*' (see FIG. 12A). The second hole 122*b*2' of the second holding hole 122*b*'** can be omitted.

The fourth holding hole **122*d*' of the body 100' extends from the fourth housing recess 121*d* or the fourth housing hole, in a direction including a component of the Z direction (e.g., in the Z direction, the fifth oblique direction, or the tenth oblique direction), communicates with the fourth housing recess 121*d*** or the fourth housing hole, and is open in the Y' direction.

For example, where the fourth holding hole **122*d*' includes a first hole 122*d*1' and a second hole 122*d*2', the first hole 122*d*1' of the fourth holding hole 122*d*' extends from the third end portion (see FIG. 12B) or the fourth end portion (not illustrated) of the fourth housing recess 121*d*, or alternatively from the third end portion or the fourth end portion of the fourth housing hole, in the direction including the component of the Z direction (e.g., in the Z direction, the fifth oblique direction, or the tenth oblique direction), communicates with the fourth housing recess 121*d* or the fourth housing hole, and is open in the Y' direction. The second hole 122*d*2' of the fourth holding hole 122*d*' extends in the Y direction from the first hole 122*d*1' of the fourth holding hole 122*d*', is located on the Y-direction side relative to the first hole 122*d*1' of the fourth holding hole 122*d*', and communicates with the first hole 122*d*1' of the fourth holding hole 122*d*' (see FIG. 12B). The second hole 122*d*2' of the fourth holding hole 122*d*'** can be omitted.

The second holding hole **122*b*' and the fourth holding hole 122*d*' are arranged and spaced along the X-X' direction. The second holding hole 122*b*' may be arranged on the X'-direction side relative to the fourth holding hole 122*d*', and the fourth holding hole 122*d*' may be arranged on the X-direction side relative to the second holding hole 122*b*'**, or vice versa.

A distal portion 130 of the body 100' has configuration (3) (not illustrated) or configuration (4) (see FIGS. 12A to 12B) described above. FIG. 12A shows a second connecting groove **131*b*' of the distal portion 130 of the body 100', and FIG. 12B shows a fourth connecting groove 131*d*' of the distal portion 130 of the body 100'. For reference to a first connecting groove of the distal portion 130 of the body 100', which is not illustrated, see the second connecting groove 131*b*' of FIG. 12A. For reference to a second connecting groove of the distal portion 130 of the body 100', which is not illustrated, see the second connecting groove the fourth connecting groove 131*d*' of FIG. 12**B.

The first main portion **220*a*' of the first terminal 200*a*' extends from a first connecting portion 210*a* of the first terminal 200*a*' in a direction including a component of the Z' direction (e.g., in the Z' direction, the sixth oblique direction, or the ninth oblique direction). For example, where the first main portion 220*a*' includes a first plate 221*a*' and a second plate 222*a*', the first plate 221*a*' of the first main portion 220*a*' extends from a third end portion on Y-direction side (see FIG. 13) or a fourth end portion on Y'-direction side (not illustrated) of the first connecting portion 210*a* in the direction including the component of the Z' direction (e.g., in the Z' direction, the sixth oblique direction, or the ninth oblique direction). The second plate 222*a*' of the first main portion 220*a*' extends from an end on the Z'-direction side of the first plate 221*a*' of the first main portion 220*a*' in a direction including a component of the Y direction (e.g., in the Y direction, the fifth oblique direction, or the sixth oblique direction) (see FIG. 13). The second plate 222*a*' of the first main portion 220*a*'** can be omitted.

The first distal portion **230*a* of the first terminal 200*a*' extends from an end on the Y-direction side of the second plate 222*a*' of the first main portion 220*a*' or from the end on the Z'-direction side of the first plate 221*a*', in a direction including a component of the Y direction (e.g., in the Y direction, the fifth oblique direction, or the sixth oblique direction). For example, the first distal portion 230*a*** may have one of the following configurations (IX-1) to (IX-7).

(IX-1) The first distal portion includes a plate extending from the end on the Y-direction side of the second plate **222*a*' of the first main portion 220*a*' or from the end on the Z'-direction side of the first plate 221***a*', in the direction including the component of the Y direction (see FIG. 13). (IX-2) The first distal portion includes a rod extending from the end on the Y-direction side of the second plate 222*a*' of the first main portion 220*a*' or from the end on the Z'-direction side of the first plate 221*a*', in the direction including the component of the Y direction (not illustrated). (IX-3) The first distal portion includes a tube extending from the end on the Y-direction side of the second plate 222*a*' of the first main portion 220*a*' or from the end on the Z'-direction side of the first plate 221*a*', in the direction including the component of the Y direction (not illustrated). (IX-4) The first distal portion includes first and second arms extending from the end on the Y-direction side of the second plate 222*a*' of the first main portion 220*a*' or from the end on the Z'-direction side of the first plate 221*a*', in the direction including the component of the Y direction (not illustrated). (IX-5) The first distal portion includes a first arm extending from the end on the Y-direction side of the second plate 222*a*' of the first main portion 220*a*' or from the end on the Z'-direction side of the first plate 221*a*', in the direction including the component of the Y direction (not illustrated). (IX-6) The first distal portion includes a tube and first and second arms (not illustrated); the tube extends from the end on the Y-direction side of the second plate 222*a*' of the first main portion 220*a*' or from the end on the Z'-direction side of the first plate 221*a*', in the direction including the component of the Y direction; and the first and second arms extend from the tube in the Y direction. (IX-7) The first distal portion includes first and second arms and a coupling portion (not illustrated); the first arm extends from the end on the Y-direction side of the second plate 222*a*' of the first main portion 220*a*' or from the end on the Z'-direction side of the first plate 221*a*', in the direction including the component of the Y direction; the second arm extends in the direction including the component of the Y direction; and the coupling portion couples between the end portions on the Y'-direction side of the first and second arms. The first and second arms may face each other in the X-X' direction or may face each other in the Z-Z' direction.

Each of the plate, the rod, the first arm, and the second arm of the first distal portion 230*a* according to any of the above aspects may, but is not required to, includes a portion partly bent such as to project in the Z or Z' direction.

The second main portion 220*b*' of the second terminal 200*b*' extends from a second connecting portion 210*b* of the second terminal 200*b*' in a direction including a component of the Z' direction (e.g., in the Z' direction, the sixth oblique direction, or the ninth oblique direction). For example, where the second main portion 220*b*' includes a first plate 221*b*' and a second plate 222*b*', the first plate 221*b*' of the second main portion 220*b*' extends from a third end portion on Y-direction side (see FIG. 13) or a fourth end portion on Y'-direction side (not illustrated) of the second connecting portion 210*b* in the direction including the component of the Z' direction (e.g., in the Z' direction, the sixth oblique direction, or the ninth oblique direction). The second plate 222*b*' of the second main portion 220*b*' extends from an end on the Z'-direction side of the first plate 221*b*' of the second main portion 220*b*' in a direction including a component of the Y direction (e.g., in the Y direction, the fifth oblique direction, or the sixth oblique direction). The second plate 222*b*' of the second main portion 220*b*' can be omitted.

The second distal portion 230*b* of the second terminal 200*b*' may have the same configuration as the first distal portion 230*a* described above except the following difference. The second distal portion 230*b* extends from an end on the Y-direction side of the second plate 222*b*' of the second main portion 220*b*' or from the end on the Z'-direction side of the first plate 221*b*', in a direction including a component of the Y direction (e.g., in the Y direction, the fifth oblique direction, or the sixth oblique direction).

The third main portion 220*c*' of the third terminal 200*c*' extends from a third connecting portion 210*c* of the third terminal 200*c*' in a direction including a component of the Z direction (e.g., in the Z direction, the fifth oblique direction, or the tenth oblique direction). For example, where the third main portion 220*c*' includes a first plate 221*c*' and a second plate 222*c*', the first plate 221*c*' of the third main portion 220*c*' extends from a third end portion on Y-direction side (see FIG. 13) or a fourth end portion on Y'-direction side (not illustrated) of the third connecting portion 210*c* in the direction including the component of the Z direction (e.g., in the Z direction, the fifth oblique direction, or the tenth oblique direction). The second plate 222*c*' of the third main portion 220*c*' extends from an end on the Z-direction side of the first plate 221*c*' of the third main portion 220*c*' in a direction including a component of the Y direction (e.g., in the Y direction, the fifth oblique direction, or the sixth oblique direction). The second plate 222*c*' of the third main portion 220*c*' can be omitted.

The third distal portion 230*c* of the third terminal 200*c*' may have the same configuration as the first distal portion 230*a* described above except the following difference. The third distal portion 230*c* extends from an end on the Y-direction side of the second plate 222*c*' of the third main portion 220*c*' or from the end on the Z-direction side of the first plate 221*c*', in a direction including a component of the Y direction (e.g., in the Y direction, the fifth oblique direction, or the sixth oblique direction).

The fourth main portion 220*d*' of the fourth terminal 200*d*' extends from a fourth connecting portion 210*d* of the fourth terminal 200*d*' in a direction including a component of the Z direction (e.g., in the Z direction, the fifth oblique direction, or the tenth oblique direction). For example, where the fourth main portion 220*d*' includes a first plate 221*d*' and a second plate 222*d*', the first plate 221*d*' of the fourth main portion 220*d*' extends from a third end portion on Y-direction side (see FIG. 13) or a fourth end portion on Y'-direction side (not illustrated) of the fourth connecting portion 210*d* in the direction including the component of the Z direction (e.g., in the Z direction, the fifth oblique direction, or the tenth oblique direction). The second plate 222*d*' of the fourth main portion 220*d*' extends from an end on the Z-direction side of the first plate 221*d*' of the fourth main portion 220*d*' in a direction including a component of the Y direction (e.g., in the Y direction, the fifth oblique direction, or the sixth oblique direction). The second plate 222*d*' of the fourth main portion 220*d*' can be omitted.

The fourth distal portion 230*d* of the fourth terminal 200*d*' may have the same configuration as the first distal portion 230*a* described above except the following difference. The fourth distal portion 230*d* extends from an end on the Y-direction side of the second plate 222*d*' of the fourth main portion 220*d*' or from the end on the Z-direction side of the first plate 221*d*', in a direction including a component of the Y direction (e.g., in the Y direction, the fifth oblique direction, or the sixth oblique direction).

Where each of the first main portion 220*a*' of the first terminal 200*a*', the second main portion 220*b*' of the second terminal 200*b*', the third main portion 220*c*' of the third terminal 200*c*', and the fourth main portion 220*d*' of the fourth terminal 200*d*' includes the first plate and the second plate, the first plate 221*a*' and the second plate 222*a*' of the first main portion 220*a*' are securely housed respectively in the first hole 122*a*1' and the second hole 122*a*2' of the first holding hole 122*a*' of the body 100' from the Y'-direction side, the first plate 221*b*' and the second plate 222*b*' of the second main portion 220*b*' are securely housed respectively in the first hole 122*b*1' and the second hole 122*b*2' of the second holding hole 122*b*' of the body 100' from the Y'-direction side, the first plate 221*c*' and the second plate 222*c*' of the third main portion 220*c*' are securely housed respectively in the first hole 122*c*1' and the second hole 122*c*2' of the third holding hole 122*c*' of the body 100' from the Y'-direction side, and the first plate 221*d*' and the second plate 222*d*' of the fourth main portion 220*d*' of the fourth terminal 200*d*' are securely housed respectively in the first hole 122*d*1' and the second hole 122*d*2' of the fourth holding hole 122*d*' of the body 100' from the Y'-direction side.

The second plate 222*a*' of the first main portion 220*a*', the second plate 222*b*' of the second main portion 220*b*', the second plate 222*c*' of the third main portion 220*c*', and the second plate 222*d*' of the fourth main portion 220*d*' may be at the substantially same height position in the Z-Z' direction (see FIG. 13). In this case, the second hole 122*a*2' of the first holding hole 122*a*', the second hole 122*b*2' of the second holding hole 122*b*', the second hole 122*c*2' of the third holding hole 122*c*', and the second hole 122*d*2' of the fourth holding hole 122*d*' of the body 100' may be at the substantially same height position in the Z-Z' direction.

At least one second plate of the second plate 222*a*' of the first main portion 220*a*', the second plate 222*b*' of the second main portion 220*b*', the second plate 222*c*' of the third main portion 220*c*', and the second plate 222*d*' of the fourth main portion 220*d*' may be at a different position (different height position) in the Z-Z' direction from the position or positions in the Z-Z' direction of the remaining second plate or plates (not illustrated). In this case, among the second hole 122*a*2' of the first holding hole 122*a*', the second hole 122*b*2' of the second holding hole 122*b*', the second hole 122*c*2' of the third holding hole 122*c*', and the second hole 122*d*2' of the fourth holding hole 122*d*' of the body 100', at least one second hole may be at a position (height position) in the Z-Z' direction that is different from the position (height position) in the Z-Z' direction of the position or positions in the Z-Z' direction of the remaining second hole or holes.

The second plate 222*a*' of the first main portion 220*a*', the second plate 222*b*' of the second main portion 220*b*', the second plate 222*c*' of the third main portion 220*c*', and the second plate 222*d*' of the fourth main portion 220*d*' may be at mutually different positions (height positions) in the Z-Z' direction (not illustrated). In this case, the second hole 122*a*2' of the first holding hole 122*a*', the second hole 122*b*2' of the second holding hole 122*b*', the second hole 122*c*2' of the third holding hole 122*c*', and the second hole 122*d*2' of the fourth holding hole 122*d*' of the body 100' may be at mutually different positions (height positions) in the Z-Z' direction.

Where each of the first main portion 220*a*' of the first terminal 200*a*', the second main portion 220*b*' of the second terminal 200*b*', the third main portion 220*c*' of the third terminal 200*c*', and the fourth main portion 220*d*' of the fourth terminal 200*d*' does not include the second plate, the first plate 221*a*' of the first main portion 220*a*' is securely housed in the first hole 122*a*1' of the first holding hole 122*a*' of the body 100' from the Y'-direction side, the first plate 221*b*' of the second main portion 220*b*' is securely housed in the first hole 122*b*1' of the second holding hole 122*b*' of the body 100' from the Y'-direction side, the first plate 221*c*' of the third main portion 220*c*' is securely housed in the first hole 122*c*1' of the third holding hole 122*c*' of the body 100' from the Y'-direction side, and the first plate 221*d*' of the fourth main portion 220*d*' of the fourth terminal 200*d*' is securely housed in the first hole 122*d*1' of the fourth holding hole 122*d*' of the body 100' from the Y'-direction side.

In any of the above cases, the first main portion 220*a*' of the first terminal 200*a*', the second main portion 220*b*' of the second terminal 200*b*', the third main portion 220*c*' of the third terminal 200*c*', and the fourth main portion 220*d*' of the fourth terminal 200*d*' of the connector CO1' are arranged and spaced along the X-X' direction, similarly to any of arranging orders described above (e.g., any of arranging orders (a4) to (d4) described above) of the first main portion 220*a* of the first terminal 200*a*, the second main portion 220*b* of the second terminal 200*b*, the third main portion 220*c* of the third terminal 200*c*, and the fourth main portion 220*d* of the fourth terminal 200*d* of the connector CO1.

In the case of arranging order (a4) above, the first plate 221*b*' of the second main portion 220*b*' may extend from a portion on the X'-direction side of the third end portion (see FIG. 13) or the fourth end portion (not illustrated) of the second connecting portion 210*b*, in a direction including a component of the Z' direction (e.g., in the Z' direction, the sixth oblique direction, or the ninth oblique direction); the first plate 221*d*' of the fourth main portion 220*d*' may extend from a portion on the X-direction side of the third end portion (see FIG. 13) or the fourth end portion (not illustrated) of the fourth connecting portion 210*d*, in a direction including a component of the Z direction (e.g., in the Z direction, the fifth oblique direction, or the tenth oblique direction); the first plate 221*a*' of the first main portion 220*a*' may extend from a portion on the X'-direction side of the third end portion (see FIG. 13) or the fourth end portion (not illustrated) of the first connecting portion 210*a*, in a direction including a component of the Z' direction (e.g., in the Z' direction, the sixth oblique direction, or the ninth oblique direction); and the first plate 221*c*' of the third main portion 220*c*' may extend from a portion on the X-direction side of the third end portion (see FIG. 13) or the fourth end portion (not illustrated) of the third connecting portion 210*c*, in a direction including a component of the Z direction (e.g., in the Z direction, the fifth oblique direction, or the tenth oblique direction).

In the case of arranging order (b4) above (not illustrated), the first plate 221*d*' of the fourth main portion 220*d*' may extend from a portion on the X'-direction side of the third end portion or the fourth end portion of the fourth connecting portion 210*d*, in a direction including a component of the Z direction (e.g., in the Z direction, the fifth oblique direction, or the tenth oblique direction); the first plate 221*b*' of the second main portion 220*b*' may extend from a portion on the X-direction side of the third end portion or the fourth end portion of the second connecting portion 210*b*, in a direction including a component of the Z' direction (e.g., in the Z' direction, the sixth oblique direction, or the ninth oblique direction); the first plate 221*c*' of the third main portion 220*c*' may extend from a portion on the X'-direction side of the third end portion or the fourth end portion of the third connecting portion 210*c*, in a direction including a component of the Z direction (e.g., in the Z direction, the fifth oblique direction, or the tenth oblique direction); and the first plate 221*a*' of the first main portion 220*a*' may extend from a portion on the X-direction side of the third end portion or the fourth end portion of the first connecting portion 210*a*, in a direction including a component of the Z' direction (e.g., in the Z' direction, the sixth oblique direction, or the ninth oblique direction).

In the case of arranging order (c4) above (not illustrated), the first plate 221*d*' of the fourth main portion 220*d*' may extend from a portion on the X'-direction side of the third end portion or the fourth end portion of the fourth connecting portion 210*d*, in a direction including a component of the Z direction (e.g., in the Z direction, the fifth oblique direction, or the tenth oblique direction); the first plate 221*b*' of the second main portion 220*b*' may extend from a portion on the X-direction side of the third end portion or the fourth end portion of the second connecting portion 210*b*, in a direction including a component of the Z' direction (e.g., in the Z' direction, the sixth oblique direction, or the ninth oblique direction); the first plate 221*a*' of the first main portion 220*a*' may extend from a portion on the X'-direction side of the third end portion or the fourth end portion of the first connecting portion 210*a*, in a direction including a component of the Z' direction (e.g., in the Z' direction, the sixth oblique direction, or the ninth oblique direction); and the first plate 221*c*' of the third main portion 220*c*' may extend from a portion on the X-direction side of the third end portion or the fourth end portion of the third connecting portion 210*c*, in a direction including a component of the Z direction (e.g., in the Z direction, the fifth oblique direction, or the tenth oblique direction).

In the case of arranging order (d4) above (not illustrated), the first plate 221*b*' of the second main portion 220*b*' may extend from a portion on the X'-direction side of the third end portion or the fourth end portion of the second connecting portion 210*b*, in a direction including a component of the Z' direction (e.g., in the Z' direction, the sixth oblique direction, or the ninth oblique direction); the first plate 221*d*' of the fourth main portion 220*d*' may extend from a portion on the X-direction side of the third end portion or the fourth end portion of the fourth connecting portion 210*d*, in a direction including a component of the Z direction (e.g., in the Z direction, the fifth oblique direction, or the tenth oblique direction); the first plate 221*c*' of the third main portion 220*c*' may extend from a portion on the X'-direction side of the third end portion or the fourth end portion of the third connecting portion 210*c*, in a direction including a component of the Z direction (e.g., in the Z direction, the fifth oblique direction, or the tenth oblique direction); and the first plate 221*a*' of the first main portion 220*a*' may extend from a portion on the X-direction side of the third end portion or the fourth end portion of the first connecting portion 210*a*, in a direction including a component of the Z' direction (e.g., in the Z' direction, the sixth oblique direction, or the ninth oblique direction).

The first distal portion 230*a* of the first terminal 200*a*', the second distal portion 230*b* of the second terminal 200*b*', the third distal portion 230*c* of the third terminal 200*c*', and the fourth distal portion 230*d* of the fourth terminal 200*d*' of the connector CO1' are also arranged and spaced along the X-X' direction, similarly to any of the arranging orders described above (e.g., any of arranging orders (a5) to (d5) described above) of the first distal portion 230*a* of the first terminal 200*a*, the second distal portion 230*b* of the second terminal 200*b*, the third distal portion 230*c* of the third terminal 200*c*, and the fourth distal portion 230*d* of the fourth terminal 200*d* of the connector CO1. In any arrangement, the first distal portion 230*a*, the second distal portion 230*b*, the third distal portion 230*c*, and the fourth distal portion 230*d* may be at height positions in the Z-Z' direction as described for one of configurations (VI) to (VIII) described above.

Where the first main portion 220*a*' extends from the third end portion (see FIG. 13) or the fourth end portion (not illustrated) of the first connecting portion 210*a* in the direction including the component of the Z' direction, the central axis of the first distal portion 230*a* is displaced in the Z-Z' direction relative to the central axis of the first projecting portion Wa2 of the first electric wire Wa. The central axis of the first distal portion 230*a* may, but is not required to, be displaced also in the X-X' direction relative to the central axis of the first projecting portion Wa2 of the first electric wire Wa. Where the second main portion 220*b*' extends from the third end portion (see FIG. 13) or the fourth end portion (not illustrated) of the second connecting portion 210*b* in the direction including the component of the Z' direction, the central axis of the second distal portion 230*b* is displaced in the Z-Z' direction relative to the central axis of the second projecting portion Wb2 of the second electric wire Wb. The central axis of the second distal portion 230*b* may, but is not required to, be displaced also in the X-X' direction relative to the central axis of the second projecting portion Wb2 of the second electric wire Wb. Where the third main portion 220*c*' extends from the third end portion (see FIG. 13) or the fourth end portion (not illustrated) of the third connecting portion 210*c* in the direction including the component of the Z direction, the central axis of the third distal portion 230*c* is displaced in the Z-Z' direction relative to the central axis of the third projecting portion Wc2 of the third electric wire Wc. The central axis of the third distal portion 230*c* may, but is not required to, be displaced also in the X-X' direction relative to the central axis of the third projecting portion Wc2 of the third electric wire Wc. Where the fourth main portion 220*d*' extends from the third end portion (see FIG. 13) or the fourth end portion (not illustrated) of the fourth connecting portion 210*d* in the direction including the component of the Z direction, the central axis of the fourth distal portion 230*d* is displaced in the Z-Z' direction relative to the central axis of the fourth projecting portion Wd2 of the fourth electric wire Wd. The central axis of the fourth distal portion 230*d* may, but is not required to, be displaced also in the X-X' direction relative to the central axis of the fourth projecting portion Wd2 of the fourth electric wire Wd.

The first terminal 200*a*', the second terminal 200*b*', the third terminal 200*c*', and the fourth terminal 200*d*' may have an identical shape and size selected from the configurations described above (see FIG. 13). That is, commonality is achieved between the first terminal 200*a*', the second terminal 200*b*', the third terminal 200*c*', and the fourth terminal 200*d*' as terminals of a single type.

The first terminal 200*a*' and the second terminal 200*b*' may have an identical shape and size selected from the configurations described above, and the third terminal 200*c*' and the fourth terminal 200*d*' may have another identical shape and size selected from the configurations described above (not illustrated). In this case, commonality is achieved between the first terminal 200*a*' and the second terminal 200*b*' as a first type of terminals, and commonality is achieved between the third terminal 200*c*' and the fourth terminal 200*d*' as a second type of terminals, but the first type of terminals and the second type of terminals have different shapes and/or different sizes. Alternatively, the first terminal 200*a*' and the third terminal 200*c*' may have an identical shape and size selected from the configurations described above, and the second terminal 200*b*' and the fourth terminal 200*d*' may have another identical shape and size selected from the configurations described above. In this case, commonality is achieved between the first terminal 200*a*' and the third terminal 200*c*' as a first type of terminals, and commonality is achieved between the second terminal 200*b*' and the fourth terminal 200*d*' as a second type of terminals, but the first type of terminals and the second type of terminals have different shapes and/or different sizes. The first terminal 200*a*', the second terminal 200*b*', the third terminal 200*c*', and the fourth terminal 200*d*' may have different shapes and/or different sizes selected from the configurations described above.

The assembly A2 having the above configuration is assembled similarly to the assembly A1.

The assembly A2 provides the same technical features and effects as those of the assembly A1.

Where the connector CO1' of the assembly A2 has the configurations (a1) to (a5) described above or configurations (b1) to (b5) described above, the assembly A2 may be configured for transmitting therethrough differential signals similarly to the assembly A1.

The connection structure SC according to any of the above aspects may include the assembly A2 in place of the assembly A1.

Note that the first connector, the second connector, the connector assembly, and the connection structure of connectors described above are not limited to the embodiments described above, and may be modified in any manner within the described scope of the claims. Some examples of modification will now be described.

The first connecting portion 210*a* of the first terminal 200*a*, 200*a*', the second connecting portion 210*b* of the second terminal 200*b*, 200*b*', the third connecting portion 210*c* of the third terminal 200*c*, 200*c*', and the fourth connecting portion 210*d* of the fourth terminal 200*d*, 200*d*' of the first connector CO1, CO1' according to any of the above aspects are only required to be exposed or projected from the body 100, 100'.

For example, each of the first connecting portion 210*a*, the second connecting portion 210*b*, the third connecting portion 210*c*, and the fourth connecting portion 210*d* may be configured such that a portion on the Y-direction side is disposed inside the body 100 or the body 100', and a portion on the Y'-direction side partly projects in the Y' direction from the rear portion 120 of the body 100 or the body 100'. In this case, the portion on the Y-direction side of the first connecting portion 210*a* is housed in the first housing recess 121*a* or the first housing hole of the rear portion 120, the portion on the Y-direction side of the second connecting portion 210*b* is housed in the second housing recess 121*b* or the second housing hole of the rear portion 120, the portion on the Y-direction side of the third connecting portion 210*c* is housed in the third housing recess 121*c* or the third housing hole of the rear portion 120, and the portion on the Y-direction side of the fourth connecting portion 210*d* is housed in the fourth housing recess 121*d* or the fourth housing hole of the rear portion 120. Also, the first main portion 220*a* of the first terminal 200*a* extends from the portion on the Y-direction side of the first connecting portion 210*a* in a direction including a component of the Z direction, the second main portion 220*b* of the second terminal 200*b* extends from the portion on the Y-direction side of the second connecting portion 210*b* of the second terminal 200*b* in a direction including a component of the Z direction, the third main portion 220*c* of the third terminal 200*c* extends from the portion on the Y-direction side of the third connecting portion 210*c* of the third terminal 200*c* in a direction including a component of the Z direction, and the fourth main portion 220*d* of the fourth terminal 200*d* extends from the portion on the Y-direction side of the fourth connecting portion 210*d* of the fourth terminal 200*d* in a direction including a component of the Z direction. In other respects, the first terminal 200*a*, the second terminal 200*b*, the third terminal 200*c*, and the fourth terminal 200*d* may be configured as described above.

The first terminal 200*a*, 200*a*', the second terminal 200*b*, 200*b*', the third terminal 200*c*, 200*c*', and the fourth terminal 200*d*, 200*d*' of the first connector CO1, CO1' according to any of the above aspects may be partly insert-molded, and thereby held, in the body 100 or 100'. The first terminal 20*a*, the second terminal 20*b*, the third terminal 20*c*, and the fourth terminal 20*d* of the second connector CO2 according to any of the above aspects may be insert-molded, and thereby held, in the body 10.

The first connector CO1, CO1' according to any of the above aspects may include a plurality of sets of terminals, and each set includes the first terminal 200*a*, 200*a*', the second terminal 200*b*, 200*b*', the third terminal 200*c*, 200*c*', and the fourth terminal 200*d*, 200*d*'. In this case, the assembly A1, A2 of any of the above aspects may include a plurality of cables CA corresponding in number to the number of sets of the terminals of the first connector CO1, CO1'. Alternatively, the assembly A1, A2 of any of the above aspects may include a single cable CA including a plurality of sets of terminals, and each set includes the first inner insulator Da, the first electric wire Wa, the second inner insulator Db, the second electric wire Wb, the third inner insulator Dc, the third electric wire W, the fourth inner insulator Dd, and the fourth electric wire Wd. Likewise, the second connector CO2 according to any of the above aspects may include a plurality of sets of terminals, and each set includes the first terminal 20*a*, the second terminal 20*b*, the third terminal 20*c*, and the fourth terminal 20*d*, and the number of the set may correspond to the number of sets of the terminals of the first connector CO1.

The first connector CO1, CO1' of any of the above aspects may include one or more terminals that are different from the first terminal 200*a*, 200*a*', the second terminal 200*b*, 200*b*', the third terminal 200*c*, 200*c*', and the fourth terminal 200*d*, 200*d*'. In this case, the assembly A1, A2 according to any of the above aspects may be configured such that the cable CA includes one or more inner insulators and one or more electric wires corresponding to the one or more different terminals. Or alternatively, the assembly A1, A2 according to any of the above aspects may include a different cable including one or more inner insulators and one or more electric wires corresponding to the one or more different terminals. In either case, such one or more inner insulators and the one or more electric wires can be omitted. Likewise, the second connector CO2 according to any of the above aspects may include one or more terminals that are different from the first terminal 20*a*, the second terminal 20*b*, the third terminal 20*c*, and the fourth terminal 20*d*. The connection structure SC according to any of the above aspects may include a plurality of the connectors CO1 or CO1' according to any of the above aspects and a plurality of the connectors CO2 according to any of the above aspects. In this case, the connectors CO1 or CO1' are connected to the respective connectors CO2. The connection structure SC of any of the above aspects may further include the plurality of cables CA or the single cable CA of any of the above aspects. Where the housing H is provided, the housing H may include a plurality of connection ports H1 corresponding in number to the number of the connectors CO2.

The connection structure SC of any of the above aspects may not include the cable or cables CA of any of the above aspects and/or may not include the circuit board B of any of the above aspects.

REFERENCE SIGNS LIST

SC: connection structure for connector

A1, A2: assembly

CO1, CO1': connector (first connector)

100, 100': body; 110: middle portion of body; 120: rear portion of body; 130: distal portion of body; 121*a*: first housing recess; 121*b*: second housing recess; 121*c*: third housing recess; 121*d*: fourth housing recess; 122*a*, 122*a*': first holding hole; 122*b*, 122*b*': second holding hole; 122*c*, 122*c*': third holding hole; 122*d*, 122*d*': fourth holding hole; 131*a*: first connecting hole; 131*b*: second connecting hole; 131*c*: third connecting hole; 131*d*: fourth connecting hole; 131*b*': second connecting groove; 131*d*': fourth connecting groove

200*a*, 200*a*': first terminal; 200*b*, 200*b*': second terminal; 200*c*, 200*c*': third terminal; 200*d*, 200*d*': fourth terminal; 210*a*: first connecting portion of first terminal; 210*b*: second connecting portion of second terminal; 210*c*: third connecting portion of third terminal; 210*d*: fourth connecting portion of fourth terminal; 220*a*, 220*a*': first main portion of first terminal; 220*b*, 220*b*': second main portion of second terminal; 220*c*, 220*c*': third main portion of third terminal; 220*d*, 220*d*': fourth main portion of fourth terminal; 230*a*: first distal portion of first terminal; 230*b*: second distal portion of second terminal; 230*c*: third distal portion of third terminal; 230*d*: fourth distal portion of fourth terminal

300: shell; 310: shell body; 320: holding portion; 330: connecting portion

400: shield plate; 410: main plate; 420: first side plate and second side plate; 430: first ring; 440: coupling portion

500: second ring

600: holder; 620: holder body; 620: fixing portion

CA: cable; OJ: outer insulator; SH: outer conductor; SH1: first portion of outer conductor; SH2: second portion of outer conductor; Da: first inner insulator; Db: second inner insulator; Dc: third inner insulator; Dd: fourth inner insulator; Da1: first portion of first inner insulator; Da2: second portion of first inner insulator; Db1: first portion of second inner insulator; Db2: second portion of second inner insulator; Dc1: first portion of third inner insulator; Dc2: second portion of third inner insulator; Dd1: first portion of fourth inner insulator; Dd2: second portion of fourth inner insulator; Wa: first electric wire; Wb: second electric wire; Wc: third electric wire; Wd: fourth electric wire; Wa1: first covered portion; Wa2: first projecting portion; Wb1: second covered portion; Wb2: second projecting portion; Wc1: third covered portion; Wc2: third projecting portion; Wd1: fourth covered portion; Wd2: fourth projecting portion CO2: connector (second connector)

10: body

20*a*: first terminal; 20*b*: second terminal; 20*c*: third terminal; 20*d*: fourth terminal

30: shell

B: circuit board

The invention claimed is:

1. A connector comprising:

a body having an insulating property; and a first terminal including a first connecting portion, a first main portion, and a first distal portion;

a second terminal including a second connecting portion, a second main portion, and a second distal portion;

a third terminal including a third connecting portion, a third main portion, and a third distal portion; and a fourth terminal including a fourth connecting portion, a fourth main portion, and a fourth distal portion, wherein the first, second, third, and fourth terminals extend in a first direction and are partly held in the body, and the first direction is an extending direction of the first to fourth terminals, the first connecting portion of the first terminal, the second connecting portion of the second terminal, the third connecting portion of the third terminal, and the fourth connecting portion of the fourth terminal are each exposed or projected from the body, the first connecting portion of the first terminal and the second connecting portion of the second terminal are arranged and spaced along a second direction, the third connecting portion of the third terminal and the fourth connecting portion of the fourth terminal are arranged and spaced along the second direction, the first connecting portion of the first terminal and the third connecting portion of the third terminal are arranged and spaced along a third direction, the second connecting portion of the second terminal and the fourth connecting portion of the fourth terminal are arranged and spaced along the third direction, the second direction is substantially orthogonal to the first direction, and the third direction is substantially orthogonal to the first and second directions, the first main portion of the first terminal extends from the first connecting portion of the first terminal in a direction including a component of one side in the third direction, the second main portion of the second terminal extends from the second connecting portion of the second terminal in a direction including a component of the one side in the third direction, the third main portion of the third terminal extends from the third connecting portion of the third terminal in a direction including a component of the other side in the third direction, and the fourth main portion of the fourth terminal extends from the fourth connecting portion of the fourth terminal in a direction including a component of the other side in the third direction, the first distal portion of the first terminal extends from the first main portion of the first terminal in a direction including a component of one side in the first direction and is exposed or projected from the body, the second distal portion of the second terminal extends from the second main portion of the second terminal in a direction including a component of the one side in the first direction and is exposed or projected from the body, the third distal portion of the third terminal extends from the third main portion of the third terminal in a direction including a component of the one side in the first direction and is exposed or projected from the body, and the fourth distal portion of the fourth terminal extends from the fourth main portion of the fourth terminal in a direction including a component of the one side in the first direction and is exposed or projected from the body, and the first distal portion, the second distal portion, the third distal portion, and the fourth distal portion are arranged and spaced along the second direction.

2. The connector according to claim 1, wherein the second main portion, the fourth main portion, the first main portion, and the third main portion are arranged in this order and at spaced intervals along the second direction, and the second distal portion, the fourth distal portion, the first distal portion, and the third distal portion are arranged in this order and at spaced intervals along the second direction.

3. The connector according to claim 2, wherein the first connecting portion of the first terminal includes a first end portion on one side in the second direction and a second end portion on the other side in the second direction, the second connecting portion of the second terminal includes a first end portion on one side in the second direction and a second end portion on the other side in the second direction, the third connecting portion of the third terminal includes a first end portion on one side in the second direction and a second end portion on the other side in the second direction, and the fourth connecting portion of the fourth terminal includes a first end portion on one side in the second direction and a second end portion on the other side in the second direction, the first main portion of the first terminal extends from the second end portion of the first connecting portion of the first terminal in a direction including a component of the one side in the third direction, the second main portion of the second terminal extends from the second end portion of the second connecting portion of the second terminal in a direction including a component of the one side in the third direction, the third main portion of the third terminal extends from the first end portion of the third connecting portion of the third terminal in a direction including a component of the other side in the third direction, and the fourth main portion of the fourth terminal extends from the first end portion of the fourth connecting portion of the fourth terminal in a direction including a component of the other side in the third direction.

4. The connector according to claim 2, wherein the first connecting portion of the first terminal includes a third end portion on the one side in the first direction and a fourth end portion on the other side in the first direction, the second connecting portion of the second terminal includes a third end portion on the one side in the first direction and a fourth end portion on the other side in the first direction, the third connecting portion of the third terminal includes a third end portion on the one side in the first direction and a fourth end portion on the other side in the first direction, and the fourth connecting portion of the fourth terminal includes a third end portion on the one side in the first direction and a fourth end portion on the other side in the first direction, the first main portion of the first terminal extends from the third end portion of the first connecting portion of the first terminal in a direction including a component of the one side in the third direction, the second main portion of the second terminal extends from the third end portion of the second connecting portion of the second terminal in a direction including a component of the one side in the third direction, the third main portion of the third terminal extends from the third end portion of the third connecting portion of the third terminal in a direction including a component of the other side in the third direction, and the fourth main portion of the fourth terminal extends from the third end portion of the fourth connecting portion of the fourth terminal in a direction including a component of the other side in the third direction.

5. The connector according to claim 3, wherein the first terminal, the second terminal, the third terminal, and the fourth terminal have an identical shape and size.

6. The connector according to claim 4, wherein the first terminal, the second terminal, the third terminal, and the fourth terminal have an identical shape and size.

7. A cable and connector assembly comprising:

the connector according to claim 1; and a cable including an outer insulator of tubular shape having an insulating property, an outer conductor of tubular shape having electrical conductivity, a first inner insulator of tubular shape having an insulating property, a second inner insulator of tubular shape having an insulating property, a third inner insulator of tubular shape having an insulating property, a fourth inner insulator of tubular shape having an insulating property, a first electric wire, a second electric wire, a third electric wire, and a fourth electric wire, wherein the outer conductor is disposed inside the outer insulator, the first inner insulator, the second inner insulator, the third inner insulator, and the fourth inner insulator each include a first portion inside the outer conductor and a second portion outside the outer conductor, the first electric wire includes a first covered portion inside the first inner insulator and a first projecting portion projecting from the second portion of the first inner insulator, the second electric wire includes a second covered portion inside the second inner insulator and a second projecting portion projecting from the second portion of the second inner insulator, the third electric wire includes a third covered portion inside the third inner insulator and a third projecting portion projecting from the second portion of the third inner insulator, the fourth electric wire includes a fourth covered portion inside the fourth inner insulator and a fourth projecting portion projecting from the second portion of the fourth inner insulator, the first projecting portion of the first electric wire and the second projecting portion of the second electric wire are arranged side by side in the second direction, the third projecting portion of the third electric wire and the fourth projecting portion of the fourth electric wire are arranged side by side in the second direction, the first projecting portion of the first electric wire and the third projecting portion of the third electric wire are arranged side by side in the third direction, and the second projecting portion of the second electric wire and the fourth projecting portion of the fourth electric wire are arranged side by side in the third direction, and the first projecting portion of the first electric wire is connected to the first connecting portion of the first terminal, the second projecting portion of the second electric wire is connected to the second connecting portion of the second terminal, the third projecting portion of the third electric wire is connected to the third connecting portion of the third terminal, and the fourth projecting portion of the fourth electric wire is connected to the fourth connecting portion of the fourth terminal.

8. A cable and connector assembly comprising:

the connector according to claim 2; and a cable including an outer insulator of tubular shape having an insulating property, an outer conductor of tubular shape having electrical conductivity, a first inner insulator of tubular shape having an insulating property, a second inner insulator of tubular shape having an insulating property, a third inner insulator of tubular shape having an insulating property, a fourth inner insulator of tubular shape having an insulating property, a first electric wire, a second electric wire, a third electric wire, and a fourth electric wire, wherein the outer conductor is disposed inside the outer insulator, the first inner insulator, the second inner insulator, the third inner insulator, and the fourth inner insulator each include a first portion inside the outer conductor and a second portion outside the outer conductor, the first electric wire includes a first covered portion inside the first inner insulator and a first projecting portion projecting from the second portion of the first inner insulator, the second electric wire includes a second covered portion inside the second inner insulator and a second projecting portion projecting from the second portion of the second inner insulator, the third electric wire includes a third covered portion inside the third inner insulator and a third projecting portion projecting from the second portion of the third inner insulator, the fourth electric wire includes a fourth covered portion inside the fourth inner insulator and a fourth projecting portion projecting from the second portion of the fourth inner insulator, the first projecting portion of the first electric wire and the second projecting portion of the second electric wire are arranged side by side in the second direction, the third projecting portion of the third electric wire and the fourth projecting portion of the fourth electric wire are arranged side by side in the second direction, the first projecting portion of the first electric wire and the third projecting portion of the third electric wire are arranged side by side in the third direction, and the second projecting portion of the second electric wire and the fourth projecting portion of the fourth electric wire are arranged side by side in the third direction, and the first projecting portion of the first electric wire is connected to the first connecting portion of the first terminal, the second projecting portion of the second electric wire is connected to the second connecting portion of the second terminal, the third projecting portion of the third electric wire is connected to the third connecting portion of the third terminal, and the fourth projecting portion of the fourth electric wire is connected to the fourth connecting portion of the fourth terminal.

9. A cable and connector assembly comprising:

the connector according to claim 3; and a cable including an outer insulator of tubular shape having an insulating property, an outer conductor of tubular shape having electrical conductivity, a first inner insulator of tubular shape having an insulating property, a second inner insulator of tubular shape having an insulating property, a third inner insulator of tubular shape having an insulating property, a fourth inner insulator of tubular shape having an insulating property, a first electric wire, a second electric wire, a third electric wire, and a fourth electric wire, wherein the outer conductor is disposed inside the outer insulator, the first inner insulator, the second inner insulator, the third inner insulator, and the fourth inner insulator each include a first portion inside the outer conductor and a second portion outside the outer conductor, the first electric wire includes a first covered portion inside the first inner insulator and a first projecting portion projecting from the second portion of the first inner insulator, the second electric wire includes a second covered portion inside the second inner insulator and a second projecting portion projecting from the second portion of the second inner insulator, the third electric wire includes a third covered portion inside the third inner insulator and a third projecting portion projecting from the second portion of the third inner insulator, the fourth electric wire includes a fourth covered portion inside the fourth inner insulator and a fourth projecting portion projecting from the second portion of the fourth inner insulator, the first projecting portion of the first electric wire and the second projecting portion of the second electric wire are arranged side by side in the second direction, the third projecting portion of the third electric wire and the fourth projecting portion of the fourth electric wire are arranged side by side in the second direction, the first projecting portion of the first electric wire and the third projecting portion of the third electric wire are arranged side by side in the third direction, and the second projecting portion of the second electric wire and the fourth projecting portion of the fourth electric wire are arranged side by side in the third direction, and the first projecting portion of the first electric wire is connected to the first connecting portion of the first terminal, the second projecting portion of the second electric wire is connected to the second connecting portion of the second terminal, the third projecting portion of the third electric wire is connected to the third connecting portion of the third terminal, and the fourth projecting portion of the fourth electric wire is connected to the fourth connecting portion of the fourth terminal.

10. A cable and connector assembly comprising:

the connector according to claim 4; and a cable including an outer insulator of tubular shape having an insulating property, an outer conductor of tubular shape having electrical conductivity, a first inner insulator of tubular shape having an insulating property, a second inner insulator of tubular shape having an insulating property, a third inner insulator of tubular shape having an insulating property, a fourth inner insulator of tubular shape having an insulating property, a first electric wire, a second electric wire, a third electric wire, and a fourth electric wire, wherein the outer conductor is disposed inside the outer insulator, the first inner insulator, the second inner insulator, the third inner insulator, and the fourth inner insulator each include a first portion inside the outer conductor and a second portion outside the outer conductor, the first electric wire includes a first covered portion inside the first inner insulator and a first projecting portion projecting from the second portion of the first inner insulator, the second electric wire includes a second covered portion inside the second inner insulator and a second projecting portion projecting from the second portion of the second inner insulator, the third electric wire includes a third covered portion inside the third inner insulator and a third projecting portion projecting from the second portion of the third inner insulator, the fourth electric wire includes a fourth covered portion inside the fourth inner insulator and a fourth projecting portion projecting from the second portion of the fourth inner insulator, the first projecting portion of the first electric wire and the second projecting portion of the second electric wire are arranged side by side in the second direction, the third projecting portion of the third electric wire and the fourth projecting portion of the fourth electric wire are arranged side by side in the second direction, the first projecting portion of the first electric wire and the third projecting portion of the third electric wire are arranged side by side in the third direction, and the second projecting portion of the second electric wire and the fourth projecting portion of the fourth electric wire are arranged side by side in the third direction, and the first projecting portion of the first electric wire is connected to the first connecting portion of the first terminal, the second projecting portion of the second electric wire is connected to the second connecting portion of the second terminal, the third projecting portion of the third electric wire is connected to the third connecting portion of the third terminal, and the fourth projecting portion of the fourth electric wire is connected to the fourth connecting portion of the fourth terminal.

11. The cable and connector assembly according to claim 7, wherein a layout of the first connecting portion of the first terminal, the second connecting portion of the second terminal, the third connecting portion of the third terminal, and the fourth connecting portion of the fourth terminal in cross-sectional view of a first cross section of the connector corresponds to a layout of the first covered portion of the first electric wire, the second covered portion of the second electric wire, the third covered portion of the third electric wire, and the fourth covered portion of the fourth electric wire in cross-sectional view of a second cross section of the cable, where the first cross section is a cross section along the second and third directions of the connector, and the second cross section is a cross section along the second and third directions of the cable as extended in the first direction.

12. The cable and connector assembly according to claim 7, wherein the first projecting portion of the first electric wire is soldered onto the first connecting portion of the first terminal, the second projecting portion of the second electric wire is soldered onto the second connecting portion of the second terminal, the third projecting portion of the third electric wire is soldered onto the third connecting portion of the third terminal, and the fourth projecting portion of the fourth electric wire is soldered onto the fourth connecting portion of the fourth terminal.

13. The cable and connector assembly according to claim 7, wherein the fourth terminal and the fourth electric wire are configured for transmitting therethrough one signal of a positive signal or a negative signal of differential signals, and the first terminal and the first electric wire are configured for transmitting therethrough the other signal.

14. A connection structure of connectors, comprising:

a first connector being the connector according to claim 1; and a second connector connected to the first connector, the second connector includes a body having an insulating property, a first terminal, a second terminal, a third terminal, and a fourth terminal, wherein the body of the second connector partly holds the first, second, third, and fourth terminals of the second connector, the first terminal of the second connector includes a first mounting portion, a first main portion, and a first distal portion, the second terminal of the second connector includes a second mounting portion, a second main portion, and a second distal portion, the third terminal of the second connector includes a third mounting portion, a third main portion, and a third distal portion, the fourth terminal of the second connector includes a fourth mounting portion, a fourth main portion, and a fourth distal portion, the first distal portion of the first terminal, the second distal portion of the second terminal, the third distal portion of the third terminal, and the fourth distal portion of the fourth terminal of the second connector are arranged and spaced along the second direction in accordance with a layout of the first distal portion of the first terminal, the second distal portion of the second terminal, the third distal portion of the third terminal, and the fourth distal portion of the fourth terminal of the first connector, and are respectively in contact with, and in electrical connection with, the first distal portion of the first terminal, the second distal portion of the second terminal, the third distal portion of the third terminal, and the fourth distal portion of the fourth terminal of the first connector, and the first mounting portion of the first terminal, the second mounting portion of the second terminal, the third mounting portion of the third terminal, and the fourth mounting portion of the fourth terminal of the second connector are arranged and spaced along the second direction.

15. A connection structure of connectors, comprising:

a first connector being the connector according to claim 2; and a second connector connected to the first connector, the second connector includes a body having an insulating property, a first terminal, a second terminal, a third terminal, and a fourth terminal, wherein the body of the second connector partly holds the first, second, third, and fourth terminals of the second connector, the first terminal of the second connector includes a first mounting portion, a first main portion, and a first distal portion, the second terminal of the second connector includes a second mounting portion, a second main portion, and a second distal portion, the third terminal of the second connector includes a third mounting portion, a third main portion, and a third distal portion, the fourth terminal of the second connector includes a fourth mounting portion, a fourth main portion, and a fourth distal portion, the first distal portion of the first terminal, the second distal portion of the second terminal, the third distal portion of the third terminal, and the fourth distal portion of the fourth terminal of the second connector are arranged and spaced along the second direction in accordance with a layout of the first distal portion of the first terminal, the second distal portion of the second terminal, the third distal portion of the third terminal, and the fourth distal portion of the fourth terminal of the first connector, and are respectively in contact with, and in electrical connection with, the first distal portion of the first terminal, the second distal portion of the second terminal, the third distal portion of the third terminal, and the fourth distal portion of the fourth terminal of the first connector, and the first mounting portion of the first terminal, the second mounting portion of the second terminal, the third mounting portion of the third terminal, and the fourth mounting portion of the fourth terminal of the second connector are arranged and spaced along the second direction.

16. A connection structure of connectors, comprising:

a first connector being the connector according to claim 3; and a second connector connected to the first connector, the second connector includes a body having an insulating property, a first terminal, a second terminal, a third terminal, and a fourth terminal, wherein the body of the second connector partly holds the first, second, third, and fourth terminals of the second connector, the first terminal of the second connector includes a first mounting portion, a first main portion, and a first distal portion, the second terminal of the second connector includes a second mounting portion, a second main portion, and a second distal portion, the third terminal of the second connector includes a third mounting portion, a third main portion, and a third distal portion, the fourth terminal of the second connector includes a fourth mounting portion, a fourth main portion, and a fourth distal portion, the first distal portion of the first terminal, the second distal portion of the second terminal, the third distal portion of the third terminal, and the fourth distal portion of the fourth terminal of the second connector are arranged and spaced along the second direction in accordance with a layout of the first distal portion of the first terminal, the second distal portion of the second terminal, the third distal portion of the third terminal, and the fourth distal portion of the fourth terminal of the first connector, and are respectively in contact with, and in electrical connection with, the first distal portion of the first terminal, the second distal portion of the second terminal, the third distal portion of the third terminal, and the fourth distal portion of the fourth terminal of the first connector, and the first mounting portion of the first terminal, the second mounting portion of the second terminal, the third mounting portion of the third terminal, and the fourth mounting portion of the fourth terminal of the second connector are arranged and spaced along the second direction.

17. A connection structure of connectors, comprising:

a first connector being the connector according to claim 4; and a second connector connected to the first connector, the second connector includes a body having an insulating property, a first terminal, a second terminal, a third terminal, and a fourth terminal, wherein the body of the second connector partly holds the first, second, third, and fourth terminals of the second connector, the first terminal of the second connector includes a first mounting portion, a first main portion, and a first distal portion, the second terminal of the second connector includes a second mounting portion, a second main portion, and a second distal portion, the third terminal of the second connector includes a third mounting portion, a third main portion, and a third distal portion, the fourth terminal of the second connector includes a fourth mounting portion, a fourth main portion, and a fourth distal portion, the first distal portion of the first terminal, the second distal portion of the second terminal, the third distal portion of the third terminal, and the fourth distal portion of the fourth terminal of the second connector are arranged and spaced along the second direction in accordance with a layout of the first distal portion of the first terminal, the second distal portion of the second terminal, the third distal portion of the third terminal, and the fourth distal portion of the fourth terminal of the first connector, and are respectively in contact with, and in electrical connection with, the first distal portion of the first terminal, the second distal portion of the second terminal, the third distal portion of the third terminal, and the fourth distal portion of the fourth terminal of the first connector, and the first mounting portion of the first terminal, the second mounting portion of the second terminal, the third mounting portion of the third terminal, and the fourth mounting portion of the fourth terminal of the second connector are arranged and spaced along the second direction.

18. The connection structure according to claim 14, further comprising a cable, wherein the cable includes an outer insulator of tubular shape having an insulating property, an outer conductor of tubular shape having electrical conductivity, a first inner insulator of tubular shape having an insulating property, a second inner insulator of tubular shape having an insulating property, a third inner insulator of tubular shape having an insulating property, a fourth inner insulator of tubular shape having an insulating property, a first electric wire, a second electric wire, a third electric wire, and a fourth electric wire, the outer conductor is disposed inside the outer insulator, the first inner insulator, the second inner insulator, the third inner insulator, and the fourth inner insulator each include a first portion inside the outer conductor and a second portion outside the outer conductor, the first electric wire includes a first covered portion inside the first inner insulator and a first projecting portion projecting from the second portion of the first inner insulator, the second electric wire includes a second covered portion inside the second inner insulator and a second projecting portion projecting from the second portion of the second inner insulator, the third electric wire includes a third covered portion inside the third inner insulator and a third projecting portion projecting from the second portion of the third inner insulator, the fourth electric wire includes a fourth covered portion inside the fourth inner insulator and a fourth projecting portion projecting from the second portion of the fourth inner insulator, the first projecting portion of the first electric wire and the second projecting portion of the second electric wire are arranged side by side in the second direction, the third projecting portion of the third electric wire and the fourth projecting portion of the fourth electric wire are arranged side by side in the second direction, the first projecting portion of the first electric wire and the third projecting portion of the third electric wire are arranged side by side in the third direction, and the second projecting portion of the second electric wire and the fourth projecting portion of the fourth electric wire are arranged side by side in the third direction, and the first projecting portion of the first electric wire is connected to the first connecting portion of the first terminal, the second projecting portion of the second electric wire is connected to the second connecting portion of the second terminal, the third projecting portion of the third electric wire is connected to the third connecting portion of the third terminal, and the fourth projecting portion of the fourth electric wire is connected to the fourth connecting portion of the fourth terminal.

* * * * *